(12) United States Patent
Söllner et al.

(10) Patent No.: US 11,327,195 B2
(45) Date of Patent: May 10, 2022

(54) CORRECTION OF SOURCE MOTION EFFECTS IN SEISMIC DATA RECORDED IN A MARINE SURVEY USING A MOVING SOURCE

(71) Applicant: PGS Geophysical AS, Oslo (NO)

(72) Inventors: Walter Söllner, Oslo (NO); Endrias G. Asgedom, Oslo (NO); Mickael Bastard, Oslo (NO); Okwudili Orji, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 417 days.

(21) Appl. No.: 16/577,182

(22) Filed: Sep. 20, 2019

(65) Prior Publication Data

US 2020/0124755 A1  Apr. 23, 2020

Related U.S. Application Data

(60) Provisional application No. 62/748,815, filed on Oct. 22, 2018.

(51) Int. Cl.
*G01V 1/36* (2006.01)
*G01V 1/34* (2006.01)

(52) U.S. Cl.
CPC .............. *G01V 1/362* (2013.01); *G01V 1/345* (2013.01); *G01V 2210/1293* (2013.01);
(Continued)

(58) Field of Classification Search
CPC .................. G01V 1/362; G01V 1/345; G01V 2210/1293; G01V 2210/44;
(Continued)

(56) References Cited

U.S. PATENT DOCUMENTS 10,107,929 B2 * 10/2018 Kluever .................. G01V 1/38

OTHER PUBLICATIONS

Ordonez et al., Imaging the total wavefields by reflectivity inversion using amplitude-normalized wavefield decomposition: field data example (Year: 2016).*

(Continued)

*Primary Examiner* — Mohammad K Islam

(57) ABSTRACT

Processes and systems are described for generating an image of a subterranean formation from seismic data recorded during a marine survey that employed a moving vibrational source. Processes and systems compute an up-going pressure wavefield from pressure data and vertical velocity data recorded in the marine survey. A direct incident downgoing vertical velocity wavefield that includes Doppler effects created by the moving vibrational source and characterizes a source wavefield and source ghost of the moving vibrational source is computed and deconvolved from the upgoing pressure wavefield to generate a subsurface reflectivity wavefield. The subsurface reflectivity wavefield is effectively free of contamination from the source wavefield, the source ghost, and the Doppler related effects. Processes and systems generate an image of the subterranean formation based on the subsurface reflectivity wavefield, thereby enhancing resolution of the image by attenuating the source-motion effects, source signature, and source ghost of the moving vibration source.

29 Claims, 35 Drawing Sheets

(52) U.S. Cl.
CPC ...... *G01V 2210/44* (2013.01); *G01V 2210/56* (2013.01); *G01V 2210/59* (2013.01)

(58) Field of Classification Search
CPC ........... G01V 2210/56; G01V 2210/59; G01V 1/303; G01V 1/364; G01V 2210/1423
See application file for complete search history.

(56) References Cited

OTHER PUBLICATIONS

Weglein, Arthur B., and Secrest, Bruce G., "Wavelet estimation for a multidimensional acoustic or elastic earth," Geophysics, vol. 55, No. 7 (Jul. 1990); pp. 902-913.

Osen, Are et al., "Wavelet estimation from marine pressure measurements," Geophysics, Vo;. 63, No. 6 (Nov.-Dec. 1998); pp. 2108-2119.

Weglein, Arthur B., et al. "New approaches to deghosting fowed-streamerand ocan-bottom pressure measurements," SEG Int'l Exposition and 72nd Annual Meeting; Salt Lake City, Utah; Oct. 6-11, 2002.

Wapenaar, Kees, et al., "Seismic and electromagnetic controlled-source interferometry in dissipative media," Geophysical Prospecting vol. 56 (3); May 2008.

* cited by examiner

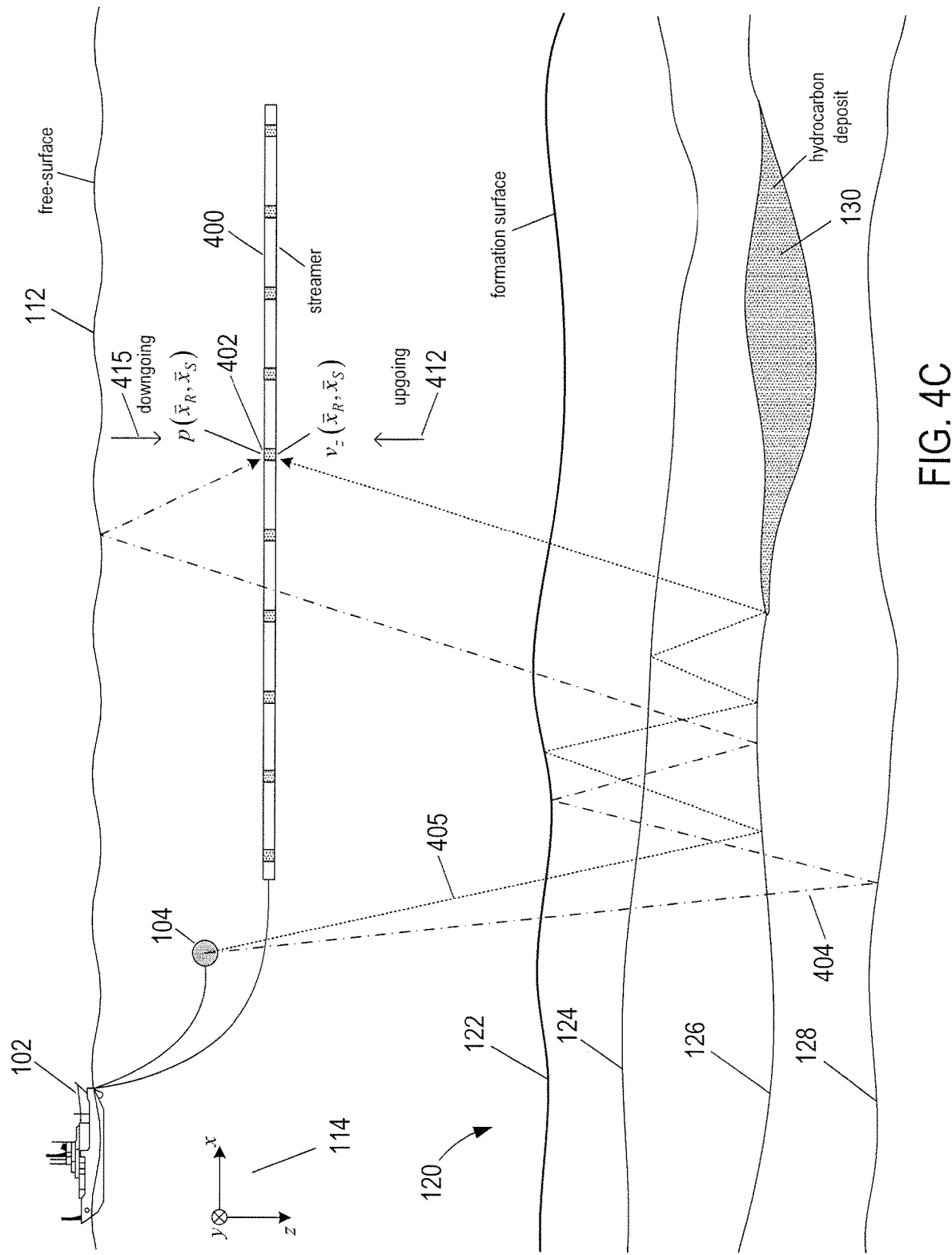

$$\begin{bmatrix} P^-(\bar{x}_{R1},\bar{x}_{S1},\omega) & \cdots & P^-(\bar{x}_{R1},\bar{x}_{Sn},\omega) & \cdots & P^-(\bar{x}_{R1},\bar{x}_{SN},\omega) \\ \vdots & \ddots & \vdots & \ddots & \vdots \\ P^-(\bar{x}_{Rm},\bar{x}_{S1},\omega) & \cdots & P^-(\bar{x}_{Rm},\bar{x}_{Sn},\omega) & \cdots & P^-(\bar{x}_{Rm},\bar{x}_{SN},\omega) \\ \vdots & \ddots & \vdots & \ddots & \vdots \\ P^-(\bar{x}_{RM},\bar{x}_{S1},\omega) & \cdots & P^-(\bar{x}_{RM},\bar{x}_{Sn},\omega) & \cdots & P^-(\bar{x}_{RM},\bar{x}_{SN},\omega) \end{bmatrix}_{M\times N} \overset{902}{\phantom{=}}$$

$$\approx \begin{bmatrix} P^{-+}(\bar{x}_{R1}|\bar{\chi}_1,z',\omega) & \cdots & P^{-+}(\bar{x}_{R1}|\bar{\chi}_k,z',\omega) & \cdots & P^{-+}(\bar{x}_{R1}|\bar{\chi}_K,z',\omega) \\ \vdots & \ddots & \vdots & \ddots & \vdots \\ P^{-+}(\bar{x}_{Rm}|\bar{\chi}_1,z',\omega) & \cdots & P^{-+}(\bar{x}_{Rm}|\bar{\chi}_k,z',\omega) & \cdots & P^{-+}(\bar{x}_{Rm}|\bar{\chi}_K,z',\omega) \\ \vdots & \ddots & \vdots & \ddots & \vdots \\ P^{-+}(\bar{x}_{RM}|\bar{\chi}_1,z',\omega) & \cdots & P^{-+}(\bar{x}_{RM}|\bar{\chi}_k,z',\omega) & \cdots & P^{-+}(\bar{x}_{RM}|\bar{\chi}_K,z',\omega) \end{bmatrix}_{M\times K} \overset{906}{\phantom{=}}$$

$$\begin{bmatrix} -2j\omega\rho V_{z,Inc}^+(\bar{\chi}_1,z'|\bar{x}_{S1},\omega) & \cdots & -2j\omega\rho V_{z,Inc}^+(\bar{\chi}_1,z'|\bar{x}_{Sn},\omega) & \cdots & -2j\omega\rho V_{z,Inc}^+(\bar{\chi}_1,z'|\bar{x}_{SN},\omega) \\ \vdots & \ddots & \vdots & \ddots & \vdots \\ -2j\omega\rho V_{z,Inc}^+(\bar{\chi}_K,z'|\bar{x}_{S1},\omega) & \cdots & -2j\omega\rho V_{z,Inc}^+(\bar{\chi}_K,z'|\bar{x}_{Sn},\omega) & \cdots & -2j\omega\rho V_{z,Inc}^+(\bar{\chi}_K,z'|\bar{x}_{SN},\omega) \end{bmatrix}_{K\times N} \overset{904}{\phantom{=}}$$

FIG. 9

$$\mathbf{p} = \begin{bmatrix} p(\vec{x}_{R1}, \vec{x}_{S1}, t) & \cdots & p(\vec{x}_{R1}, \vec{x}_{SN}, t) \\ & \ddots & \\ \vdots & p(\vec{x}_{Rm}, \vec{x}_{Sn}, t) & \vdots \\ & & \ddots \\ p(\vec{x}_{RM}, \vec{x}_{S1}, t) & \cdots & p(\vec{x}_{RM}, \vec{x}_{SN}, t) \end{bmatrix}$$

FIG. 10A $$\mathbf{v}_z = \begin{bmatrix} v_z(\vec{x}_{R1}, \vec{x}_{S1}, t) & \cdots & v_z(\vec{x}_{R1}, \vec{x}_{SN}, t) \\ & \ddots & \\ \vdots & v_z(\vec{x}_{Rm}, \vec{x}_{Sn}, t) & \vdots \\ & & \ddots \\ v_z(\vec{x}_{RM}, \vec{x}_{S1}, t) & \cdots & v_z(\vec{x}_{RM}, \vec{x}_{SN}, t) \end{bmatrix}$$

FIG. 10B $$\mathbf{p} = \begin{bmatrix} p(\bar{x}_{R1}, \bar{x}_{S1}, t) & \cdots & p(\bar{x}_{R1}, \bar{x}_{SN}, t) \\ \vdots & \ddots & \vdots \\ p(\bar{x}_{Rm}, \bar{x}_{Sn}, t) & & \\ \vdots & \ddots & \vdots \\ p(\bar{x}_{RM}, \bar{x}_{S1}, t) & \cdots & p(\bar{x}_{RM}, \bar{x}_{SN}, t) \end{bmatrix} \xleftarrow{1002} \xrightarrow{FT} \mathbf{P} = \begin{bmatrix} P(k_x, k_y, \omega | z_{R1}, \bar{x}_{S1}) & \cdots & P(k_x, k_y, \omega | z_{R1}, \bar{x}_{SN}) \\ \vdots & \ddots & \vdots \\ P(k_x, k_y, \omega | z_{Rm}, \bar{x}_{Sn}) & & \\ \vdots & \ddots & \vdots \\ P(k_x, k_y, \omega | z_{RM}, \bar{x}_{S1}) & \cdots & P(k_x, k_y, \omega | z_{RM}, \bar{x}_{SN}) \end{bmatrix} \xleftarrow{1102}$$

FIG. 11A $$\mathbf{v}_z = \begin{bmatrix} v_z(\bar{x}_{R1}, \bar{x}_{S1}, t) & \cdots & v_z(\bar{x}_{R1}, \bar{x}_{SN}, t) \\ \vdots & \ddots & \vdots \\ v_z(\bar{x}_{Rm}, \bar{x}_{Sn}, t) & & \\ \vdots & \ddots & \vdots \\ v_z(\bar{x}_{RM}, \bar{x}_{S1}, t) & \cdots & v_z(\bar{x}_{RM}, \bar{x}_{SN}, t) \end{bmatrix} \xleftarrow{1006} \xrightarrow{FT} \mathbf{V}_z = \begin{bmatrix} V_z(k_x, k_y, \omega | z_{R1}, \bar{x}_{S1}) & \cdots & V_z(k_x, k_y, \omega | z_{R1}, \bar{x}_{SN}) \\ \vdots & \ddots & \vdots \\ V_z(k_x, k_y, \omega | z_{Rm}, \bar{x}_{Sn}) & & \\ \vdots & \ddots & \vdots \\ V_z(k_x, k_y, \omega | z_{RM}, \bar{x}_{S1}) & \cdots & V_z(k_x, k_y, \omega | z_{RM}, \bar{x}_{SN}) \end{bmatrix} \xleftarrow{1106}$$

FIG. 11B $$\mathbf{P} = \begin{bmatrix} P(k_x, k_y, \omega | z_{R1}, \bar{x}_{S1}) & \cdots & P(k_x, k_y, \omega | z_{R1}, \bar{x}_{SN}) \\ \vdots & P(k_x, k_y, \omega | z_{Rm}, \bar{x}_{Sn}) & \vdots \\ P(k_x, k_y, \omega | z_{RM}, \bar{x}_{S1}) & \cdots & P(k_x, k_y, \omega | z_{RM}, \bar{x}_{SN}) \end{bmatrix}$$

1102, 1104

$$\hat{\mathbf{P}}^- = \begin{bmatrix} P^-(k_x, k_y, \omega | z_{R1}, \bar{x}_{S1}) & \cdots & P^-(k_x, k_y, \omega | z_{R1}, \bar{x}_{SN}) \\ \vdots & P^-(k_x, k_y, \omega | z_{Rm}, \bar{x}_{Sn}) & \vdots \\ P^-(k_x, k_y, \omega | z_{RM}, \bar{x}_{S1}) & \cdots & P^-(k_x, k_y, \omega | z_{RM}, \bar{x}_{SN}) \end{bmatrix}$$

1206, 1208

$$\mathbf{V}_z = \begin{bmatrix} V_z(k_x, k_y, \omega | z_{R1}, \bar{x}_{S1}) & \cdots & V_z(k_x, k_y, \omega | z_{R1}, \bar{x}_{SN}) \\ \vdots & V_z(k_x, k_y, \omega | z_{Rm}, \bar{x}_{Sn}) & \vdots \\ V_z(k_x, k_y, \omega | z_{RM}, \bar{x}_{S1}) & \cdots & V_z(k_x, k_y, \omega | z_{RM}, \bar{x}_{SN}) \end{bmatrix}$$

1106, 1108

$\xrightarrow{IFT}$ $$\mathbf{P}^- = \begin{bmatrix} P^-(\bar{x}_{R1}, \bar{x}_{S1}, \omega) & \cdots & P^-(\bar{x}_{R1}, \bar{x}_{SN}, \omega) \\ \vdots & P^-(\bar{x}_{Rm}, \bar{x}_{Sn}, \omega) & \vdots \\ P^-(\bar{x}_{RM}, \bar{x}_{S1}, \omega) & \cdots & P^-(\bar{x}_{RM}, \bar{x}_{SN}, \omega) \end{bmatrix}$$

$$\mathbf{p} = \begin{bmatrix} p(\bar{x}_{R1}, \bar{x}_{S1}, t) & \cdots & p(\bar{x}_{R1}, \bar{x}_{SN}, t) \\ & \ddots & \\ \vdots & p(\bar{x}_{Rm}, \bar{x}_{Sn}, t) & \vdots \\ & & \ddots \\ p(\bar{x}_{RM}, \bar{x}_{S1}, t) & \cdots & p(\bar{x}_{RM}, \bar{x}_{SN}, t) \end{bmatrix}$$

FIG. 14A $$\mathbf{v} = \begin{bmatrix} v_z(\bar{x}_{R1}, \bar{x}_{S1}, t) & \cdots & v_z(\bar{x}_{R1}, \bar{x}_{SN}, t) \\ & \ddots & \\ \vdots & v_z(\bar{x}_{Rm}, \bar{x}_{Sn}, t) & \vdots \\ & & \ddots \\ v_z(\bar{x}_{RM}, \bar{x}_{S1}, t) & \cdots & v_z(\bar{x}_{RM}, \bar{x}_{SN}, t) \end{bmatrix}$$

FIG. 14B $$\mathbf{p} = \begin{bmatrix} p(\bar{x}_{R1}, \bar{x}_{S1}, t) & \cdots & p(\bar{x}_{R1}, \bar{x}_{SN}, t) \\ \vdots & \ddots & \vdots \\ p(\bar{x}_{Rm}, \bar{x}_{Sn}, t) & & \\ \vdots & \ddots & \vdots \\ p(\bar{x}_{RM}, \bar{x}_{S1}, t) & \cdots & p(\bar{x}_{RM}, \bar{x}_{SN}, t) \end{bmatrix} \xleftarrow{1402}$$

1404

$$\xrightarrow{FT} \mathbf{P} = \begin{bmatrix} P(k_x, k_y, \omega | z_{R1}, \bar{x}_{S1}) & \cdots & P(k_x, k_y, \omega | z_{R1}, \bar{x}_{SN}) \\ \vdots & \ddots & \vdots \\ P(k_x, k_y, \omega | z_{Rm}, \bar{x}_{Sn}) & & \\ \vdots & \ddots & \vdots \\ P(k_x, k_y, \omega | z_{RM}, \bar{x}_{S1}) & \cdots & P(k_x, k_y, \omega | z_{RM}, \bar{x}_{SN}) \end{bmatrix} \xleftarrow{1502}$$

1504

FIG. 15A $$\mathbf{v} = \begin{bmatrix} v_z(\bar{x}_{R1}, \bar{x}_{S1}, t) & \cdots & v_z(\bar{x}_{R1}, \bar{x}_{SN}, t) \\ \vdots & \ddots & \vdots \\ v_z(\bar{x}_{Rm}, \bar{x}_{Sn}, t) & & \\ \vdots & \ddots & \vdots \\ v_z(\bar{x}_{RM}, \bar{x}_{S1}, t) & \cdots & v_z(\bar{x}_{RM}, \bar{x}_{SN}, t) \end{bmatrix} \xleftarrow{1406}$$

1408

$$\xrightarrow{FT} \mathbf{V} = \begin{bmatrix} V_z(k_x, k_y, \omega | z_{R1}, \bar{x}_{S1}) & \cdots & V_z(k_x, k_y, \omega | z_{R1}, \bar{x}_{SN}) \\ \vdots & \ddots & \vdots \\ V_z(k_x, k_y, \omega | z_{Rm}, \bar{x}_{Sn}) & & \\ \vdots & \ddots & \vdots \\ V_z(k_x, k_y, \omega | z_{RM}, \bar{x}_{S1}) & \cdots & V_z(k_x, k_y, \omega | z_{RM}, \bar{x}_{SN}) \end{bmatrix} \xleftarrow{1506}$$

1508

FIG. 15B $$\hat{\mathbf{V}}^+ = \begin{bmatrix} V_z^+(k_x,k_y,\omega|z_{R1},\bar{x}_{S1}) & \cdots & V_z^+(k_x,k_y,\omega|z_{R1},\bar{x}_{SN}) \\ \vdots & V_z^+(k_x,k_y,\omega|z_{Rm},\bar{x}_{Sn}) & \vdots \\ V_z^+(k_x,k_y,\omega|z_{RM},\bar{x}_{S1}) & \cdots & V_z^+(k_x,k_y,\omega|z_{RM},\bar{x}_{SN}) \end{bmatrix}$$ ← 1606, 1608

$$\mathbf{V}_{Inc}^+ = \begin{bmatrix} -2j\omega\rho V_{z,Inc}^+(\bar{\chi}_1,z^I|\bar{x}_{S1},\omega) & \cdots & -2j\omega\rho V_{z,Inc}^+(\bar{\chi}_1,z^I|\bar{x}_{SN},\omega) \\ \vdots & -2j\omega\rho V_{z,Inc}^+(\bar{\chi}_k,z^I|\bar{x}_{Sn},\omega) & \vdots \\ -2j\omega\rho V_{z,Inc}^+(\bar{\chi}_K,z^I|\bar{x}_{S1},\omega) & \cdots & -2j\omega\rho V_{z,Inc}^+(\bar{\chi}_K,z^I|\bar{x}_{SN},\omega) \end{bmatrix}$$ ← 804

$$\mathbf{P} = \begin{bmatrix} P(k_x,k_y,\omega|z_{R1},\bar{x}_{S1}) & \cdots & P(k_x,k_y,\omega|z_{R1},\bar{x}_{SN}) \\ \vdots & P(k_x,k_y,\omega|z_{Rm},\bar{x}_{Sn}) & \vdots \\ P(k_x,k_y,\omega|z_{RM},\bar{x}_{S1}) & \cdots & P(k_x,k_y,\omega|z_{RM},\bar{x}_{SN}) \end{bmatrix}$$ ← 1502, 1504

$$\mathbf{V} = \begin{bmatrix} V_z(k_x,k_y,\omega|z_{R1},\bar{x}_{S1}) & \cdots & V_z(k_x,k_y,\omega|z_{R1},\bar{x}_{SN}) \\ \vdots & V_z(k_x,k_y,\omega|z_{Rm},\bar{x}_{Sn}) & \vdots \\ V_z(k_x,k_y,\omega|z_{RM},\bar{x}_{S1}) & \cdots & V_z(k_x,k_y,\omega|z_{RM},\bar{x}_{SN}) \end{bmatrix}$$ ← 1506

# CORRECTION OF SOURCE MOTION EFFECTS IN SEISMIC DATA RECORDED IN A MARINE SURVEY USING A MOVING SOURCE

CROSS-REFERENCE TO RELATED APPLICATION

This application claims the benefit of Provisional Application 62/748,815, filed Oct. 22, 2018, which application is hereby incorporated by reference entirely as if fully set forth herein.

BACKGROUND

Marine seismology companies invest heavily in the development of marine seismic surveying equipment and seismic data processing techniques in order to obtain accurate, high-resolution images of subterranean formations located beneath a body of water. High-resolution images of a subterranean formation are used to determine the structure of subterranean formations, discover petroleum reservoirs, and monitor petroleum reservoirs during production. A typical marine seismic survey is performed with one or more survey vessels that tow a seismic source and many streamers through the body of water. The survey vessel contains seismic acquisition equipment, such as navigation control, seismic source control, seismic receiver control, and recording equipment. A seismic source control controls activation of the one or more seismic sources at selected times or locations. A seismic source may be an impulsive source, such as an array of air guns, that are activated to produce acoustic energy with an impulsive signature. Alternatively, a seismic source may be a marine vibrator that emits acoustic energy with a substantially constant signature over a longer time period. The acoustic energy generated by a seismic source spreads out in all directions. A portion of the acoustic energy travels down through the water and into a subterranean formation to propagate as sound waves within the subterranean formation. At each interface between different types of liquid, rock and sediment, a portion of the sound wave is refracted, a portion is transmitted, and another portion is reflected into the body of water to propagate as a reflected wavefield toward the water surface. The streamers are elongated spaced apart cable-like structures towed behind a survey vessel in the direction the survey vessel is traveling and are typically arranged substantially parallel to one another. Each streamer contains many seismic receivers or sensors that detect pressure and/or particle motion wavefields of the sound waves. The streamers collectively form a seismic data acquisition surface that records wavefields as seismic data in the recording equipment. The recorded pressure and/or particle motion wavefields are processed to generate images of the subterranean formation.

DESCRIPTION OF THE DRAWINGS

FIGS. 4A-4C show different ways in which acoustic energy emitted from a vibrational source reverberates between a free surface and a subterranean formation before reaching a receiver.

FIG. 9 shows a matrix representation of a system of equations that relates the upgoing pressure wavefield to a scaled direct incident downgoing vertical velocity wavefield and a subsurface reflectivity wavefield.

FIG. 10A shows pressure wavefield data represented by a pressure wavefield matrix.

FIG. 10B shows vertical velocity wavefield data represented by a vertical velocity wavefield matrix.

FIG. 11A shows an example transformation of a pressure wavefield matrix in the space-time ("s-t") domain to a pressure wavefield matrix in the wavenumber-frequency ("w-f") domain.

FIG. 11B shows an example transformation of a vertical velocity wavefield matrix in the s-t domain to a vertical velocity wavefield matrix in the w-f domain.

FIG. 12 shows an example calculation of an up-going pressure wavefield matrix from a pressure wavefield matrix and a vertical velocity wavefield matrix in the w-f domain.

FIG. 14A shows direct incident pressure wavefield data represented as a direct incident pressure wavefield matrix formed from direct incident pressure wavefield data.

FIG. 14B shows direct incident velocity wavefield data represented as a direct incident velocity wavefield matrix formed from direct incident velocity wavefield data.

FIG. 15A shows an example transformation of a direct incident pressure wavefield matrix from the s-t domain to a direct incident pressure wavefield matrix in the w-f domain.

FIG. 15B shows an example transformation of direct incident velocity wavefield matrix from the s-t domain to a direct incident velocity wavefield matrix in the w-f domain.

FIG. 16 shows calculation of a scaled direct incident downgoing velocity wavefield matrix from a direct incident pressure wavefield matrix and a direct incident velocity wavefield matrix.

DETAILED DESCRIPTION

Figure 1A:
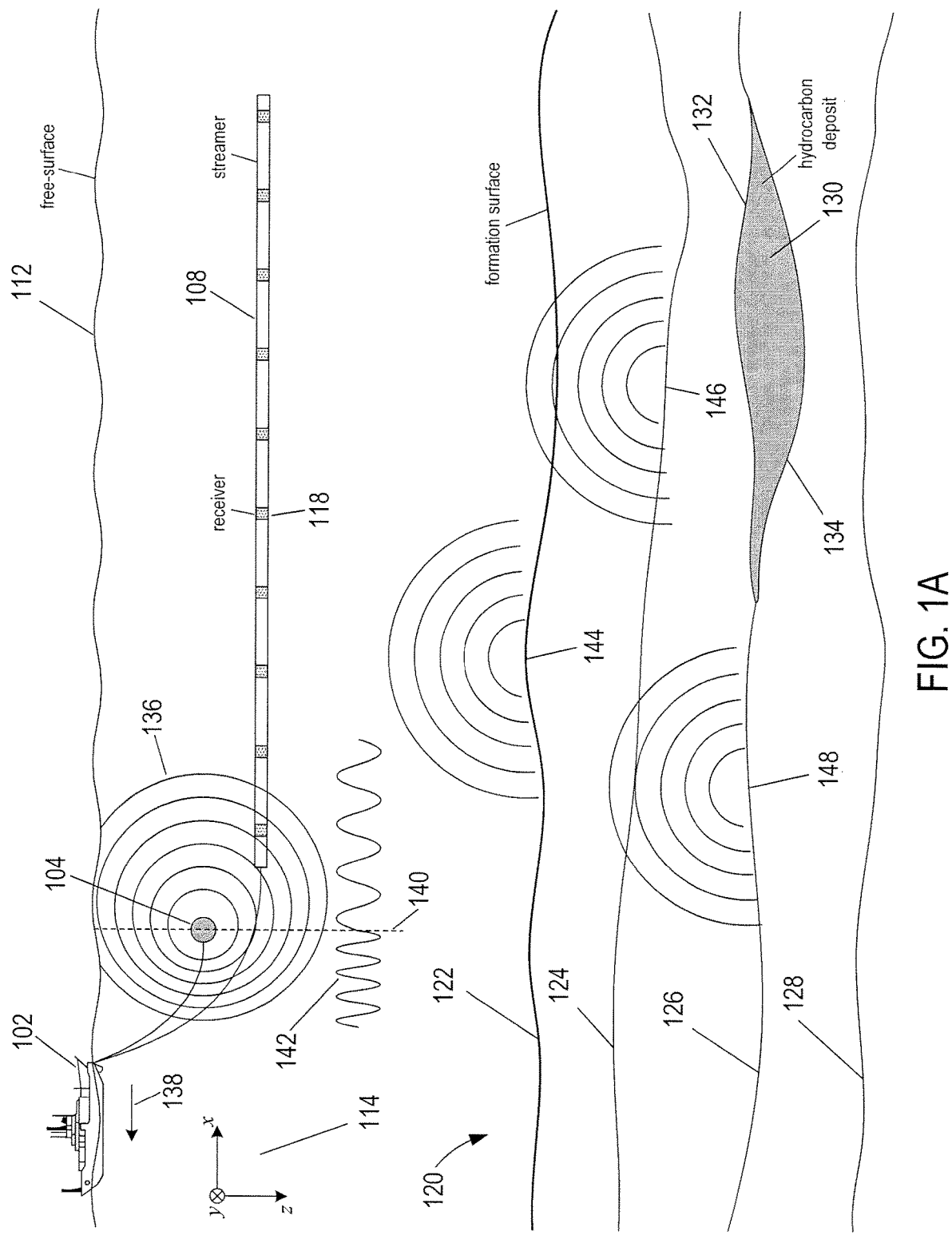
FIGS. 1A-1B show side-elevation and top views of an example marine seismic data acquisition system.

In recent years, interest in using vibrational sources in place of impulsive sources in marine surveys of offshore areas has increased. A typical impulsive source comprises air guns that are activated by rapidly releasing compressed gasses into the surrounding water, producing an instantaneous burst of acoustic energy. An impulsive source signature is characterized by a pulse with a rise time of only a few milliseconds between the ambient background noise level and the maximum acoustic amplitude with about 99% of the acoustic energy released into the water in about 30 milliseconds (0.03 seconds). By contrast, a typical vibrational source comprises an array of marine vibrators. Each marine vibrator emits vibrational acoustic energy with a substantially constant amplitude over a time period of about 5 to 30 seconds or longer. A vibrational source signature is characterized by a rise time of several seconds between the ambient background noise level and the maximum acoustic amplitude. Vibrational sources have potential advantages over impulsive sources. For example, vibrational sources produce lower sound pressure levels and sound exposure levels (i.e., lower maximum acoustic amplitude) than impulsive sources, which may have less of an environmental impact on marine animals in offshore areas than impulsive sources. Unlike impulsive sources, vibrational sources can generate acoustic energy in an ultra-low frequency range of 2-6 Hz, which penetrates deeper into a subterranean formation than higher frequency acoustic energy.

However, moving vibrational sources create adverse Doppler-related effects, rendering recorded seismic data unsuitable for imaging that employ traditional seismic-data processing techniques. For example, a moving vibrational source emits Doppler shifted acoustic energy that penetrates a subterranean formation. Modelling techniques reveal that synthetic seismic data produced with Doppler shifted acoustic energy record phase dispersions as large as several hundred degrees, which cannot be corrected using traditional techniques for processing seismic data recorded using an impulsive source. A moving vibrational source also converts the source signature from single-channel convolution in time to multichannel convolution in time and space, which is consistent with Doppler theory and suggests that Doppler shifts introduce distortions into recorded seismic data at relatively slow vessel speeds. Current industry approaches for correcting adverse Doppler effects created by moving vibrational sources are based on spatiotemporal filtering or frequency-wavenumber domain division (See e.g., "Marine vibrators and the Doppler effect," W. H. Dragoset, *Geophysics*, vol. 53, pp. 1388-1398, (1988); "The effects of source receiver motion on seismic data," G. Hampson and H. Jakubowicz, *Geophysical Prospecting, vol.* 43, pp. 221-244, 1995; and "Removal of Doppler effects from marine vibrator OBN seismic," C. Qi and F. Hilteiinan, *SEG International Exposition and 86$^{th}$ Annual Meeting*, (2016)). These approaches use convolutional models that assume vibrational source signatures are the same from source-to-source and the acoustic medium and free surface of the body of water are temporally and spatially invariant (e.g., a flat free surface model).

Processes and systems described herein are directed to generating images of a subterranean formation from seismic data recorded during a marine survey that employs a moving vibrational source. Processes and systems described herein use generalized expressions for modelling seismic data recorded in a marine survey using a moving vibrational source. The expressions represent source motion correction, receiver-side deghosting, and designaturing of the recorded seismic data without restrictions on variations in the signature of the vibrational source. Traditional convolutional model-based methods perform deconvolution by applying division in the frequency-wavenumber domain. By contrast, processes and systems described herein apply frequency-space domain inversion.

Marine Seismic Surveying

Figure 1B:
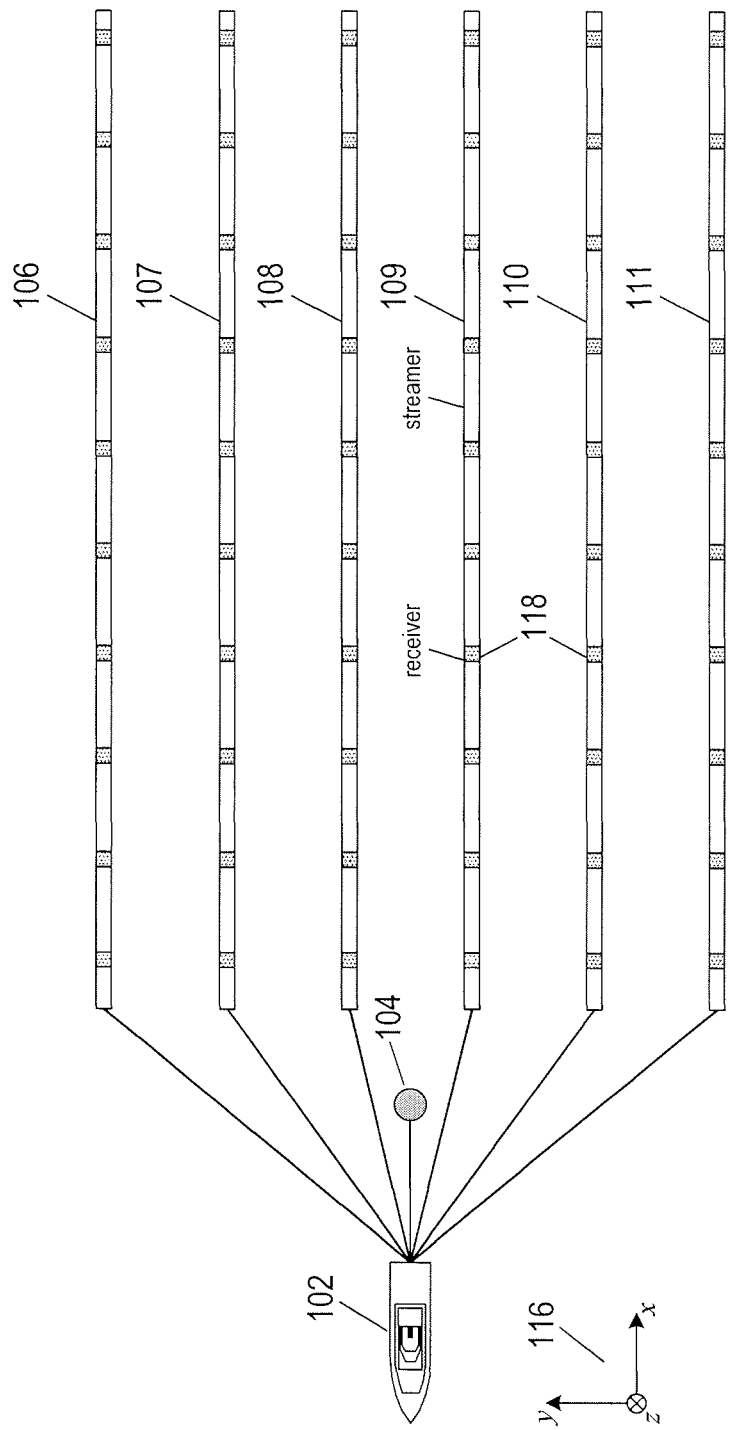

FIGS. 1A-1B show a side-elevation view and a top view, respectively, of an example marine seismic data acquisition system comprising an exploration seismology survey vessel 102 and a vibrational source 104. A seismic data acquisition system is not limited to one source as shown in FIGS. 1A-1B. In practice, the number of sources can range from as few as a single source towed by a survey vessel to as many as six or more sources towed by different survey vessels. The body of water can be, for example, an ocean, a sea, a lake, a river, or any portion thereof. In this example, the survey vessel 102 tows six streamers 106-111 below the free surface of a body of water. Each streamer is attached at one end to the survey vessel 102 via a streamer-data-transmission cable. The illustrated streamers 106-111 form an ideally planar horizontal seismic data acquisition surface of the marine seismic data acquisition system with respect to the free surface 112 of the body of water. However, in practice, the streamers may be smoothly varying due to active sea currents and weather conditions. In other words, although the streamers 106-111 are illustrated in FIGS. 1A and 1B to form a planar data acquisition surface, in practice, the towed streamers may undulate because of dynamic conditions of the body of water in which the streamers are submerged. A data acquisition surface is not limited to a planar horizontal orientation with respect to the free surface 112. The data acquisition surface may be angled with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers.

FIG. 1A includes an xz-plane 114, and FIG. 1B includes an xy-plane 116, of the same Cartesian coordinate system having three orthogonal, spatial coordinate axes labeled x, y and z. The coordinate system specifies orientations and coordinate locations within the body of water. The x-direction specifies the position of a point in a direction parallel to the length of the streamers or in the direction the survey vessel is traveling and is referred to as the "in-line" direction. They-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112.

The vibrational source 104 may comprise an array of marine vibrators. The streamers 106-111 are long cables containing power and data-transmission lines that connect receivers represented by shaded rectangles, such as receiver 118, spaced-apart along the length of each streamer to seismic data acquisition equipment, computers, and data-storage devices located onboard the survey vessel 102. Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

Figure 2:
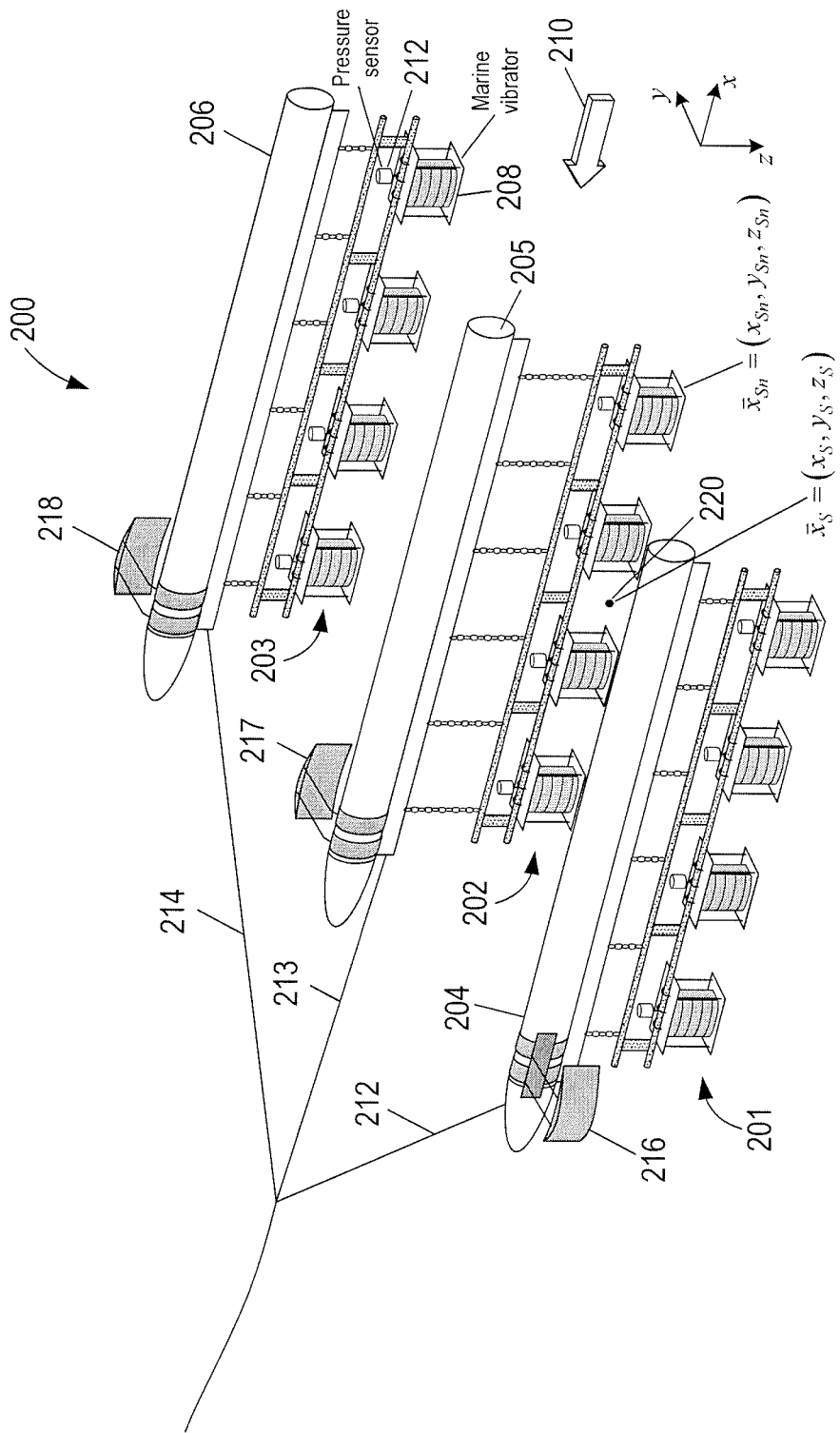
FIG. 2 shows an isometric view of an example vibrational source.

FIG. 2 shows an isometric view of an example vibrational source 200 comprising an array of marine vibrators. The array of marine vibrators comprises three sub-arrays 201-203 of marine vibrators. Each marine vibrator is suspected from one of three floats 204-206. For example, sub-array 203 includes a float 206 with four marine vibrators, such as marine vibrator 208, suspended below the float 206 in the body of water. The marine vibrators may be configured to generate different vibration frequencies ranging from about 2 to about 100 Hz. Each sub-array also includes pressure sensors. Each marine vibrator has a corresponding pressure sensor that measures a pressure disturbance created by the corresponding marine vibrator as the source 200 moves in the direction represented by directional arrow 210. For example, pressure sensor 212 may be located approximately 1 m from corresponding marine vibrator 208. Each marine vibrator may also have a motion sensor mounted on the vibrating plates to record the vibrational signature of the marine vibrator and estimate the unperturbed pressure signal. The sub-arrays are connected to cables 212-214 that include electrical wires that transmit electrical activation signals to each marine vibrator and transmit electrical signals generated by each pressure sensor back to the survey vessel. The vibrational source 200 includes steering devices 216-218 that may be used to steer and control the direction of the vibrational source 200 while being towed through the body of water. Point 220 represents the geometrical center of the marine vibrators comprising the vibrational source 200 with Cartesian coordinates denoted by $\vec{x}_S = (x_S, y_S, x_S)$. The Cartesian coordinates of each marine vibrator are denoted by $\vec{x}_{Sn} = (x_{Sn}, y_{Sn}, x_{Sn})$, where subscript "n" is a marine vibrator index. Note that vibrational sources are not intended to be limited to the example of twelve marine vibrators shown in FIG. 2. For example, a vibrational source may have as few as one marine vibrator or as many as ten or more marine vibrators.

In FIG. 1A, curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the vibrational source 104 produces acoustic energy over time that spreads out in all directions away from the vibrational source 104. For the sake of simplicity, FIG. 1A shows acoustic energy expanding outward from the vibrational source 104 as a pressure wavefield 136 represented by semicircles of increasing radius centered at the vibrational source 104. The outwardly expanding wavefronts from the source may be spherical but are shown in vertical plane cross section in FIG. 1A. The outward and downward expanding portion of the pressure wavefield 136 is called the "source wavefield" and any portion of the pressure wavefield 136 reflected downward from the free-surface 112 is called the "ghost source wavefield." Because the vibrational source 104 is moving in the direction indicated by directional arrow 138, the source wavefield emitted from the vibrational source 104 is Doppler shifted, as represented by concentric circles shifted in the direction 138. Dashed line 140 separates the portion of the source wavefield traveling in the direction 138 from the portion of the source wavefield traveling in the opposite direction. Curve 142 represents a change in the wavelength (i.e., frequency) in the source wavefield due to the Doppler effect. Portions of the source wavefield traveling in the forward direction have a decreased wavelength (i.e., increased frequency). By contrast, portions of the source wavefield traveling in the aft direction have an increased wavelength (i.e., decreased frequency). The source wavefields eventually reach the formation surface 122 of the subterranean formation 120, at which point the wavefields may be partially reflected from the formation surface 122 and partially refracted downward into the subterranean formation 120, becoming elastic waves within the subterranean formation 120. In the body of water, the source wavefield primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signals generated by the vibrational source 104. As shown in FIG. 1A, waves of significant amplitude may be generally reflected from points on or close to the formation surface 122, such as point 144, and from points on or very close to interfaces in the subterranean formation 120, such as points 146 and 148.

The waves comprising the reflected wavefield may be generally reflected at different times within a range of times following the source wavefield. A point on the formation surface 122, such as the point 144, may receive a pressure disturbance from the source wavefield more quickly than a point within the subterranean formation 120, such as points 146 and 148. Similarly, a point on the formation surface 122 directly beneath the vibrational source 104 may receive the pressure disturbance sooner than a more distant-lying point on the formation surface 122. Thus, the times at which waves are reflected from various points within the subterranean formation 120 may be related to the distance, in three-dimensional space, of the points from the activated source.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 3:
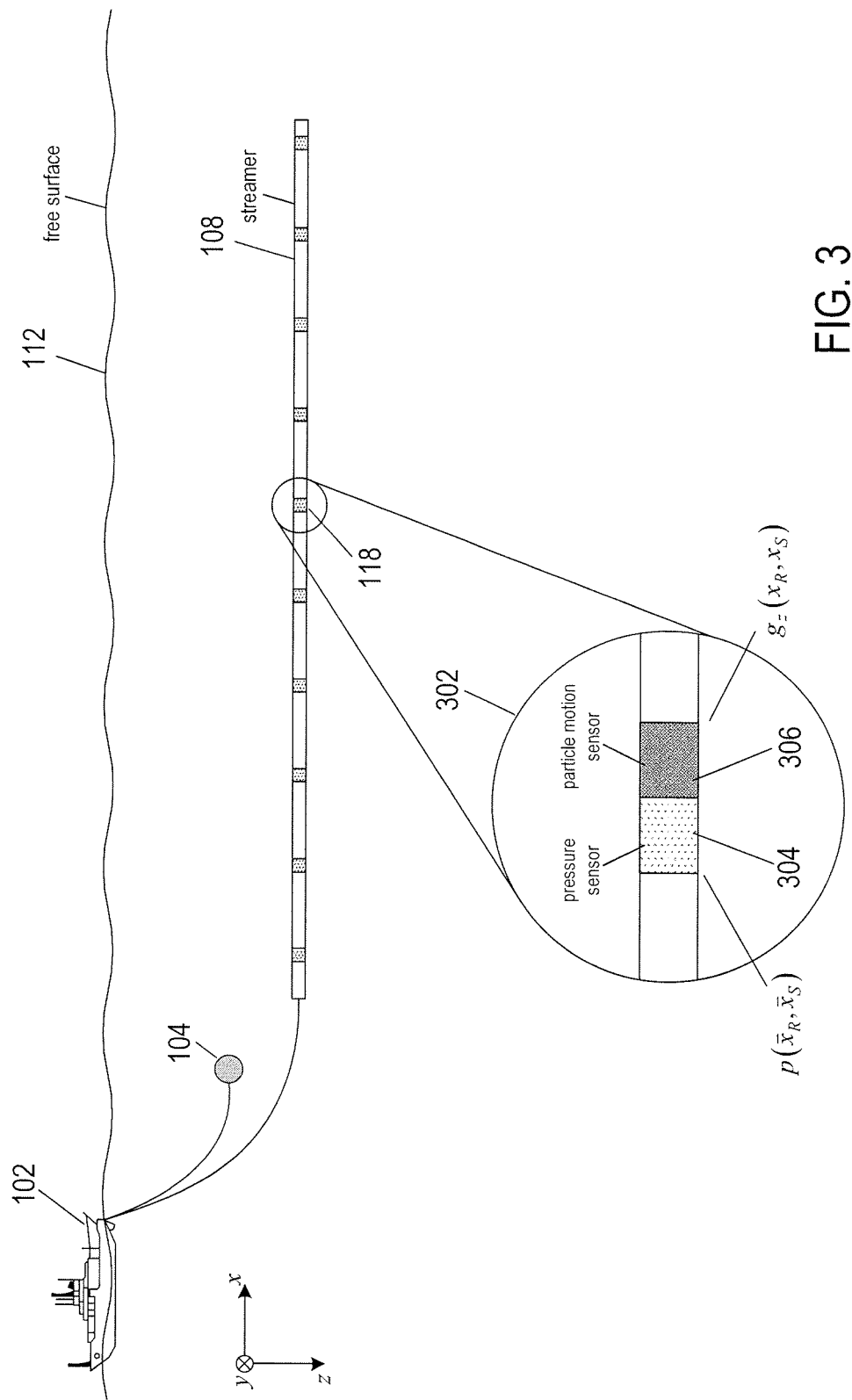
FIG. 3 shows a side-elevation view of a marine seismic data acquisition system with a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 3 shows a side-elevation view of the marine seismic data acquisition system with a magnified view 302 of the receiver 118. In this example, the magnified view 302 reveals that the receiver 118 is a multicomponent sensor comprising a pressure sensor 304 and a particle motion sensor 306. The pressure sensor may be, for example, a hydrophone. Each pressure sensor is a non-directional sensor that measures changes in a hydrostatic pressure wavefield over time to produce pressure wavefield data denoted by $p(\vec{x}_R, \vec{x}_S, t)$, where t represents time, and $\vec{x}_r$ represents the Cartesian coordinates $(x_R, y_R, z_R)$ of a receiver. The particle motion sensors are directional sensors that are responsive to water motion in a direction. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g_{\vec{n}}(\vec{x}_R, \vec{x}_S, t)$, where the vector $\vec{n}$ represents the direction along which particle displacement is measured. A particle motion sensor that measures particle velocity (i.e., particle velocity sensor) generates particle velocity wavefield data denoted by $v_{\vec{n}}(\vec{x}_R, \vec{x}_S, t)$. A particle motion sensor that measures particle acceleration (i.e., accelerometer) generates particle acceleration data denoted by $a_{\vec{n}}(\vec{x}_R, \vec{x}_S, t)$. The data generated by one type of particle motion sensor may be converted to another type. For example, particle displacement data may be differentiated to obtain particle velocity wavefield data, and particle acceleration data may be integrated to obtain particle velocity wavefield data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n} = (0,0, z)$) in which case $g_z(\vec{x}_R, \vec{x}_S, t)$ is called vertical wavefield displacement data, $v_z(\vec{x}_R, \vec{x}_S, t)$ is called vertical velocity wavefield, and $a_z(\vec{x}_R, \vec{x}_S, t)$ is called vertical acceleration wavefield. The vertical downward direction of the particle motion sensors in a horizontal streamer may be achieved by employing gimbaling devices that enable the particle motion sensors to remain effectively horizontal to the water surface even as the streamer undulates in the body of water. In other words, the gimbaling devices enable the particle motion sensors to measure particle motion in the normal direction to the water surface even though the streamers may be tilted or curved (e.g., $g_n(\vec{x}_R, \vec{x}_S, t)$). Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_R, \vec{x}_S, t)$, each receiver may include a particle motion sensor that measures the wavefield in the in-line direction in order to obtain the in-line velocity wavefield, $v_x(\vec{x}_R, \vec{x}_S, t)$, and a particle motion sensor that measures the wavefield in the cross-line direction in order to obtain the cross-line velocity wavefield, $v_y(\vec{x}_R, \vec{x}_S, t)$. In certain implementations, the receivers may be only pressure sensors, and in other implementations, the receivers may be only particle motion sensors. The three orthogonal velocity wavefields form a velocity wavefield vector $\vec{v} = (v_x, v_y, v_z)$.

The streamers 106-111 and the survey vessel 102 may include sensing electronics and data-processing facilities that allow seismic data generated by each receiver to be correlated with the time each source is activated, absolute positions on the free surface 112, and absolute three-dimensional positions with respect to an arbitrary three-dimensional coordinate system. The pressure wavefield and particle motion wavefield may be stored at the receiver and/or may be sent along the streamers and data transmission cables to the survey vessel 102, where the data may be stored electronically, magnetically, or optically on data-storage devices located onboard the survey vessel 102 and/or transmitted onshore to data-storage devices located in a seismic data-processing facility.

Each pressure sensor and particle motion sensor may include an analog-to-digital converter that converts time-dependent analog signals into discrete time series data that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace includes a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by:

$$tr(\vec{x}_R, \vec{x}_S, t) = \{A(\vec{x}_R, \vec{x}_S, t_l)\}_{l=0}^{L-1} \quad (1)$$

where tr represents pressure, particle displacement, particle velocity, or particle acceleration amplitude;

A represents amplitude;

$t_l$ is the l-th sample time; and

L is the number of time samples in the trace.

The coordinate location $\vec{x}_R$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and source locations varies with time and may also be denoted by $\vec{x}_R = \vec{x}_R(t) = (x_R(t), y_R(t), z_R(t))$ and $\vec{x}_S = \vec{x}_S(t) = (x_S(t), y_S(t), z_S(t))$. Each trace also includes a trace header not represented in Equation (1) that identifies the specific receiver that generated the trace, receiver and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to faun a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather. The portion of the acoustic signal that is reflected into the body of water from the subterranean formation and that travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 4A:
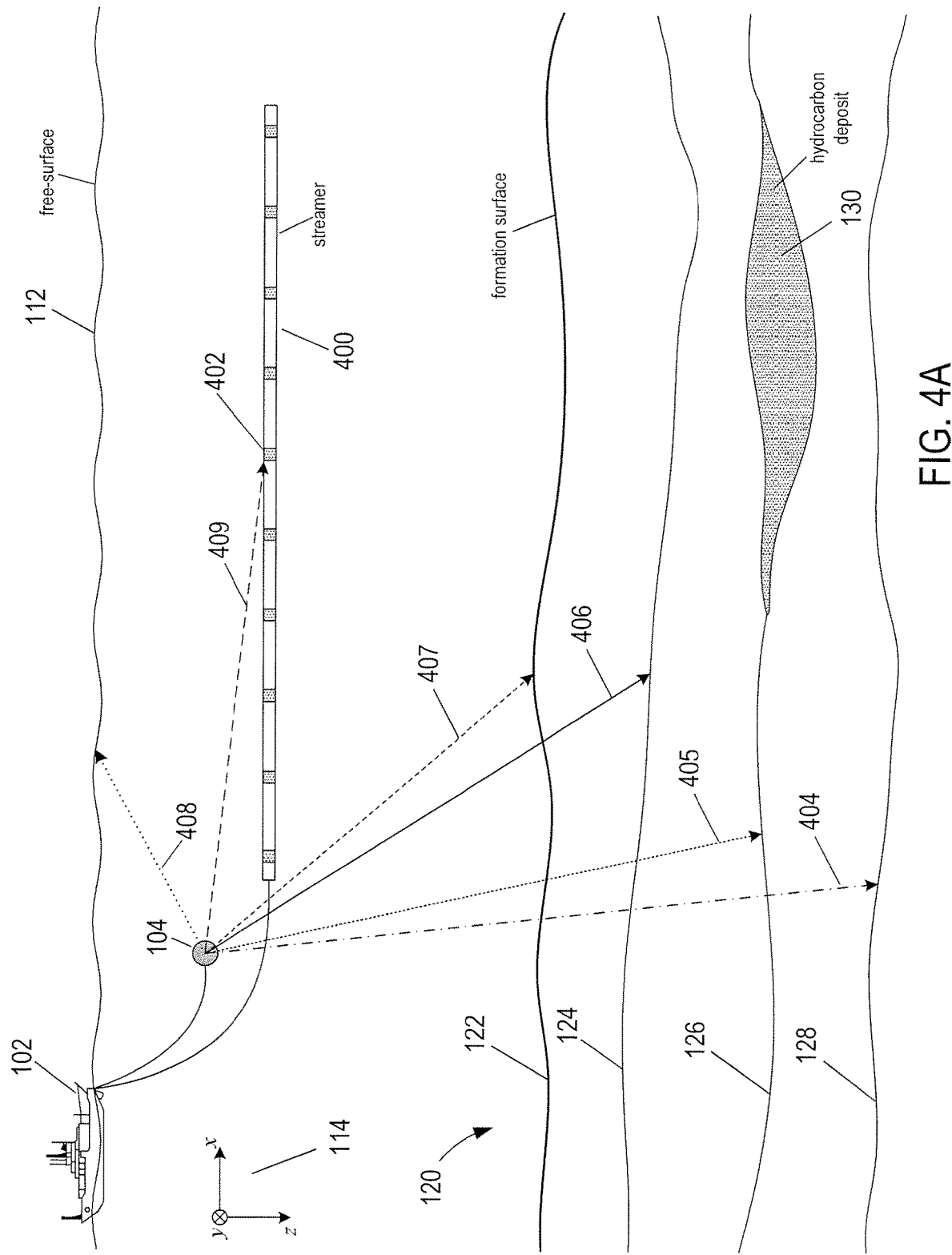
Figure 4B:
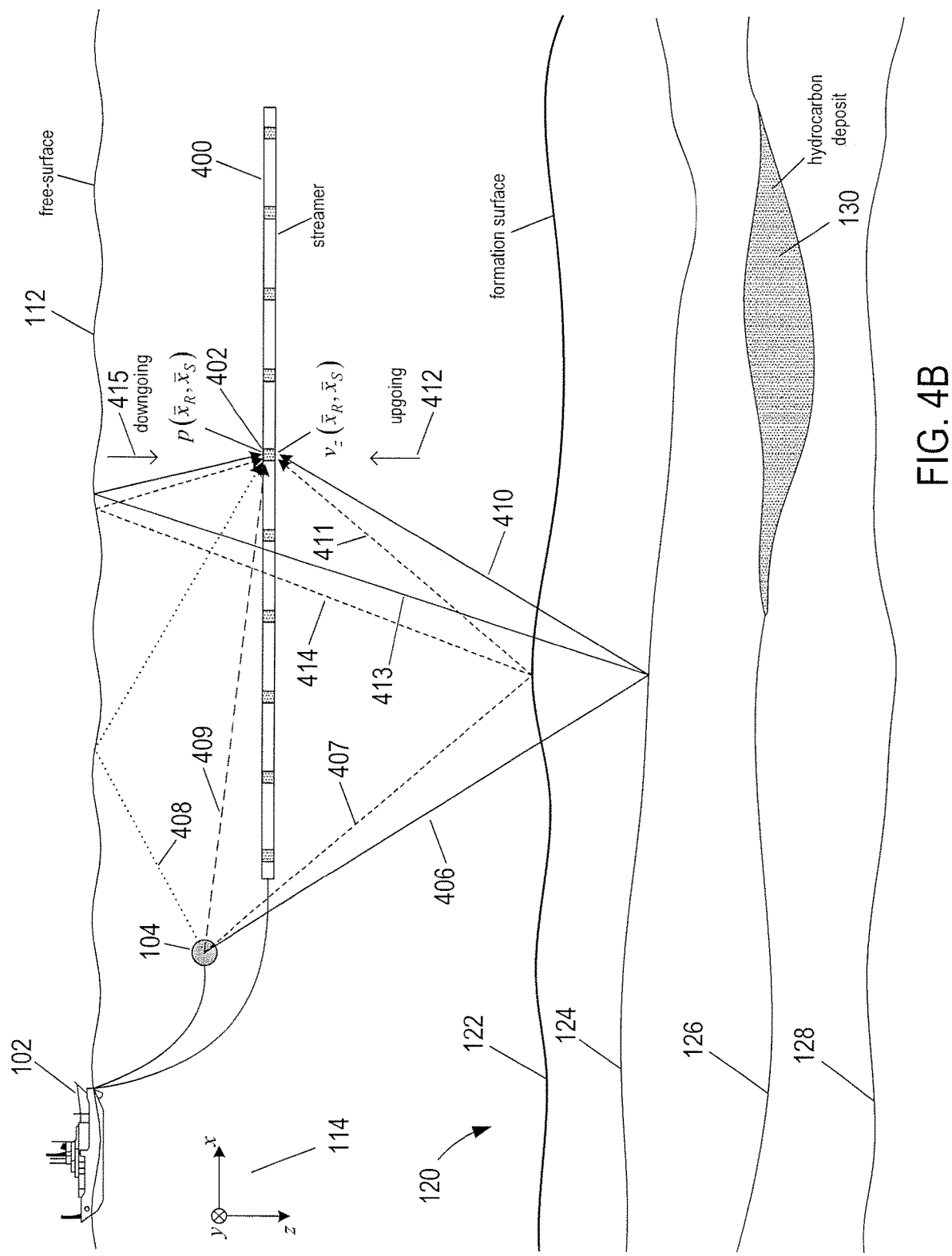

FIGS. 4A-4C show snapshots of different ways in which acoustic energy emitted from the vibrational source 104 reverberates between the free surface 112 and the subterranean formation 120 before reaching the receiver 402. For the sake of simplicity, FIGS. 4A-4C illustrate only a few of many possible ray paths acoustic energy of an acoustic signal created by the vibrational source 104 may travel before reaching the receiver 402. In FIG. 4A, directional arrows 404-409 represent ray paths of different portions of the acoustic signal generated by the vibrational source 104. For example, ray paths 404-407 represent portions of the acoustic signal that penetrate to different interfaces of the subterranean formation 102 and ray path 408 represents a portion of the acoustic signal that reaches the free surface 112. Ray path 409 represents the source signature, which is a portion of the acoustic signal that travels directly to the receiver 402. In FIG. 4B, ray path 408 is extended to present a downward reflection from the free surface 112 (i.e., source ghost). Ray paths 410 and 411 represent reflections from the interface 124 and the formation surface 122 that travel directly to the receiver 402, which are called "upgoing primary reflections" or "primaries," as indicated by upgoing directional arrow 412. Ray paths 413 and 414 represent reflections from the interface 124 and the formation surface 122 followed by downward reflections from the free surface 112 before traveling directly to the receiver 402, which are called "downgoing reflections" as indicated by directional arrow 415. In FIG. 4C, ray paths 404 and 405 are extended to represent examples of multiple reflections between interfaces within the subterranean formation 120 and the free surface 112. Extended ray path 404 represents a downgoing free-surface multiple. Extended ray path 405 represents an upgoing multiple. In FIGS. 4B-4C, wavefields that are reflected downward from the free surface 112 before reaching the receivers, as represented by ray paths 413, 414, and 404, are examples of "downgoing wavefields" that may also be called "ghost wavefields." In FIGS. 4B-4C, wavefields that are reflected upward from the subterranean formation 120, before reaching the receivers, as represented by ray paths 410, 411, and 405, are examples of "upgoing wavefields." Seismic data may also include acoustic energy that propagated along interfaces as head waves (not shown) before being reflected upward to the surface 122 and acoustic energy that propagated into layers with velocity gradients that increase with depth due to compression, creating diving waves (not shown) that are gradually turned upward to the surface 122.

Each trace records the source signature, source ghost, primaries, and various types of free surface and subsurface multiples. For example, pressure wavefield $p(\vec{x}_R, \vec{x}_S, t)$ generated at the receiver 402 records hydrostatic pressure changes due to the source signature, source ghost, primaries, and multiples. The vertical velocity wavefield $v_z(\vec{x}_R, \vec{x}_S, t)$, also generated at the receiver 402, records the particle velocity changes due to the direct source wavefield, source ghost, primaries, and multiples. The pressure wavefield $p(\vec{x}_R, \vec{x}_S, t)$ and the vertical velocity wavefield $v_z(\vec{x}_R, \vec{x}_S, t)$ record both upgoing and downgoing pressure and vertical velocity wavefields, respectively, that reach the receiver 402.

Figure 5:
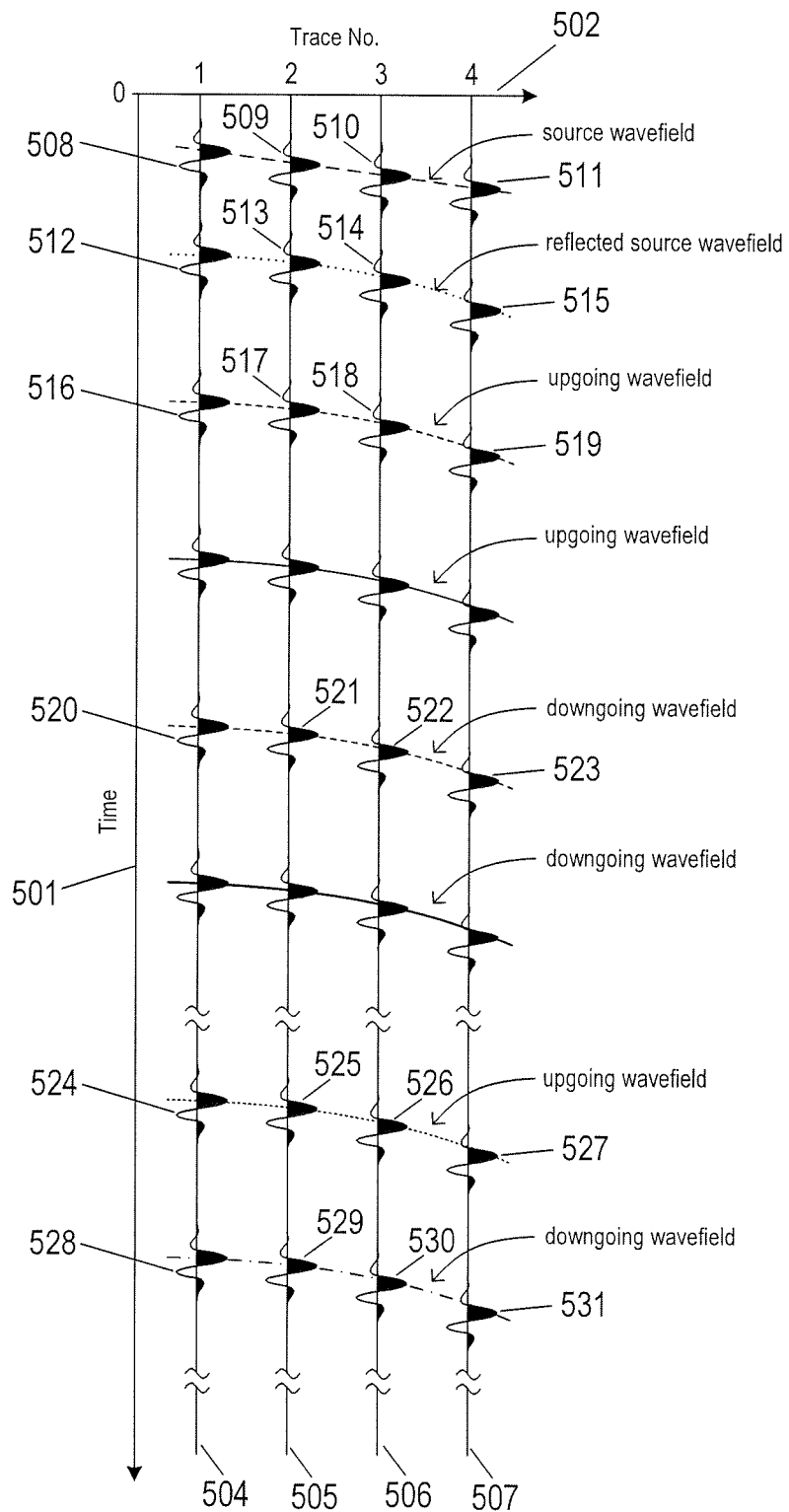
FIG. 5 shows a common-shot gather of source-related wavefields and reflected wavefields measured by receivers located along a streamer.

FIG. 5 shows an example common-shot gather of four example traces of wavefields measured by four adjacent receivers located along the streamer 400 shown in FIGS. 4A-4C. Vertical axis 501 represents time. Horizontal axis 502 represents trace numbers (i.e., channels) with trace "1" representing the seismic data generated by a receiver located closer to the vibrational source 104 than trace "4" representing the seismic data generated by a receiver located farther away from the vibrational source 104. The vibrational source 104 is activated at time zero. The distances along the traces 504-507 from time zero to the locations of the wavelets represent travel times of the acoustic energy that is output from the vibrational source 104 and eventually reaches the receivers located along the streamer 400. The traces 504-507 may represent variations in the amplitude of either the pressure wavefield or the particle motion wavefield measured by four adjacent receivers of the streamer 400. The example traces record events, such as an impulse wavefield and a reflected wavefield from a surface or interface, as wavelets located along patterned curves that correspond to the example ray paths that reach the receiver 402 in FIGS. 4A-4C. For example, wavelets 508-511 record the source wavefield of the vibrational source 104 that travels directly to the receivers as represented by dashed ray path 409 in FIG. 4A. Wavelets 512-515 record the reflected source wavefield (i.e., source ghost) as represented by dotted ray path 408 in FIG. 4B. Wavelets 516-519 record the primary reflected wavefield as represented by dashed-line ray path 411 in FIG. 4B. Wavelets 520-523 record the downgoing reflected wavefield as represented by dashed-line ray path 414 in FIG. 4B. Wavelets 524-527 record the subsurface multiple wavefield as represented by dotted-line ray path 405 in FIG. 4C. Wavelets 528-531 record the free-surface multiple wavefield as represented by dot-dashed-line ray path 404 in FIG. 4C. In FIG. 5, the events are identified as upgoing and downgoing wavefields as represented by the upgoing and downgoing ray paths that reach the receiver 402 in FIGS. 4B and 4C.

The vibrational source 104 may be activated for a duration of about 5 to 30 seconds or longer while seismic data is continuously recorded. Seismic data may be recorded for an additional 8-12 seconds following inactivation of the vibrational source 104. For example, if the vibrational source is activated for about 5 seconds, seismic data may be recorded when activation of the vibrational source begins and continue after the vibrational source has been inactivated for a total recording time of about 13 to 17 seconds or longer.

In other implementations, subterranean formations may be investigated using ocean bottom cables ("OBCs"). The OBCs are similar to the towed streamer cables described above in that the OBCs include a number of spaced-apart receivers described above that are laid on or near the formation surface 122. The OBCs may be electronically connected to an anchored recording vessel that provides power, instrument command and control, and data telemetry of the sensor data to the recording equipment on board the vessel. In still other implementations, the signals may be recorded by sensors in ocean bottom nodes, which are typically arranged in a grid pattern on the formation surface 122

Seismic Imaging

Figure 6:
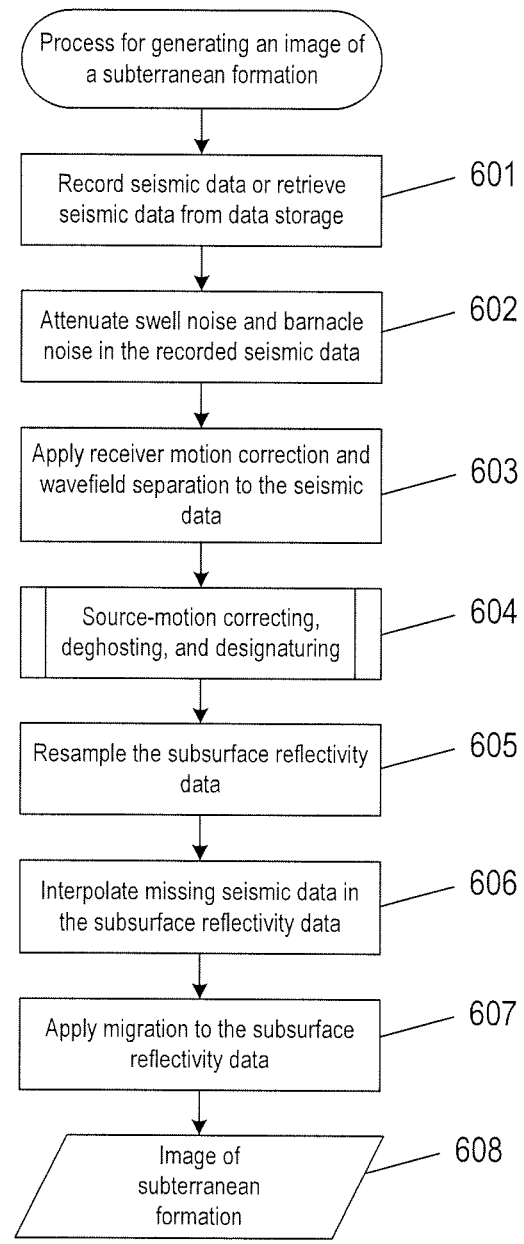
FIG. 6 shows a process for generating an image of a subterranean formation from seismic data recorded in a marine seismic survey of the subterranean formation using a vibrational source.

FIG. 6 shows a computational process for generating an image of a subterranean formation from recorded seismic data collected during a marine seismic survey using a vibrational source. Each block represents a different module of computer implemented machine-readable instructions stored in one or more data-storage devices and executed using one or more processors of a computer system. It should be noted that the series of modules represented in FIG. 6 is not an exhaustive list of the modules that may be used to compute an image of a subterranean formation from recorded seismic data. Computational processes may include additional modules or computer-implemented routines or certain modules may be omitted or placed in a different ordering, depending on, for example, how the seismic data is collected, conditions under which the seismic data is collected, and depth of the body of water above the subterranean formation.

In FIG. 6, block 601 represents seismic data recorded using the moving vibrational source 140 as described above. The recorded seismic data may be pressure and vertical velocity wavefields recorded using receivers configured with collocated pressure and particle motion sensors as described above with reference to FIG. 3. In block 602, swell noise and barnacle noise in the recorded seismic data are attenuated. In block 603, a "source-motion correcting, deghosting, and designaturing" procedure is performed on the recorded seismic data to generate a subsurface reflectivity wavefield, which is pressure wavefield that has been corrected for Doppler effects created by a moving vibrational source (i.e., source-motion corrected) and has attenuated receiver ghosts (i.e., deghosted) and source signatures (i.e., designatured). An example implementation of the "source-motion correcting, deghosting, and designaturing" procedure is described below with reference to FIGS. 19-24. In block 604, traces of subsurface reflectivity wavefield data may be resampled. For example, a gather formed from traces of the subsurface reflectivity wavefield data may be resampled to have the same sampling rate of 1 data point every 4 milliseconds. Because the receivers undulate during seismic data recording, the in-line and cross-line receiver locations of the traces may be irregularly spaced during recording of the seismic data. In block 605, interpolation may be applied to replace corrupted traces or fill in traces of missing subsurface reflectivity data, such as interpolating traces in the cross-line direction where receivers are spaced farther apart than in the in-line direction. In block 606, migration is applied to the gathers of subsurface reflectivity data in either the space-time coordinate system (i.e., time migration) or Cartesian coordinate system (i.e., depth migration) to obtain an image of the subterranean formation 607.

Computing a Subsurface Reflectivity Wavefield from Seismic Data Obtained in a Marine Survey with a Moving Vibrational Source Processes and systems for source-motion correcting, deghosting, and designaturing seismic data in step 604 of FIG. 6 are described below. The following integral equation relates an up-going pressure wavefield to a direct incident downgoing vertical velocity wavefield, such as a vertical velocity wavefield for a flat measurement surface, and a subsurface reflectivity wavefield in the space-frequency domain:

$$P^-(\vec{x}_R,\vec{x}_S,\omega) = -2j\omega\rho \int_{-\infty}^{\infty} P^+(\vec{x}_R|\vec{x}',z',\omega) V_{z,Inc}^+(\vec{x}',z'|\vec{x}_S,\omega)d\vec{x}' \quad (2)$$

where
ρ is the density of the body of water;
ω is the angular frequency;

$j=\sqrt{-1}$ is the complex constant;

$\vec{x} = (x, y)$ represents a coordinate location on a virtual planar separation level;

$z^l$ is the depth of the virtual planar separation level located between the depth of the source, denoted by $z_S$, and the depth of the receiver, denoted by $z_R$ (i.e., $z_S < z^l < z_R$);

$P^-(\vec{x}_R, \vec{x}_S, \omega)$ is the upgoing pressure wavefield;

$V_{z,Inc}^+(\vec{x}, z^l|\vec{x}_S, \omega)$ is the direct incident downgoing vertical velocity wavefield; and $P^{-+}(\vec{x}_R|\vec{x}, z^l, \omega)$ is the subsurface impulse response or reflectivity wavefield with source-motion correction, attenuated source ghost (i.e., source deghosted), and attenuated source signatures (i.e., designatured).

The sign '−' denotes an upgoing wavefield. The sign '+' denotes a downgoing wavefield. The combination of signs '−+' denotes a receiver-side upgoing wavefield and a source-side downgoing wavefield. The upgoing pressure wavefield $P^-(\vec{x}_R, \vec{x}_S, \omega)$ on the left-hand side of Equation (2) is expressed in the space-frequency domain as a surface integral of the direct incident downgoing vertical velocity wavefield $V_{z,Inc}^+(\vec{x}, z^l|\vec{x}_S, \omega)$ multiplied by the subsurface reflectivity wavefield $P^{-+}(\vec{x}_R|\vec{x}, z^l, \omega)$ over the surface of the virtual planar separation level. The upgoing pressure wavefield $P^-(\vec{x}_R, \vec{x}_S, \omega)$ is receiver deghosted and is obtained from wavefield separation of the recorded pressure in step 603 of FIG. 3 in accordance with techniques described further below. The direct incident downgoing vertical velocity wavefield $V_{z,Inc}^+(\vec{x}, z^l|\vec{x}_S, \omega)$ is the z-component of a three-dimensional velocity wavefield vector represented by $(V_{x,Inc}^+(\vec{x}, z^l|\vec{x}_S, \omega), V_{y,Inc}^+(\vec{x}, z^l|\vec{x}_S, \omega), V_{z,Inc}^+(\vec{x}, z^l|\vec{x}_S, \omega))$ and is obtained as described below. The relationship in Equation (2) is a basis for different implementations described below for obtaining the desired subsurface reflectivity wavefield $P^{-+}(\vec{x}_R, |\vec{x}, z^l, \omega)$. A derivation of Equation (2) is provided below in the APPENDIX.

Figure 7A:
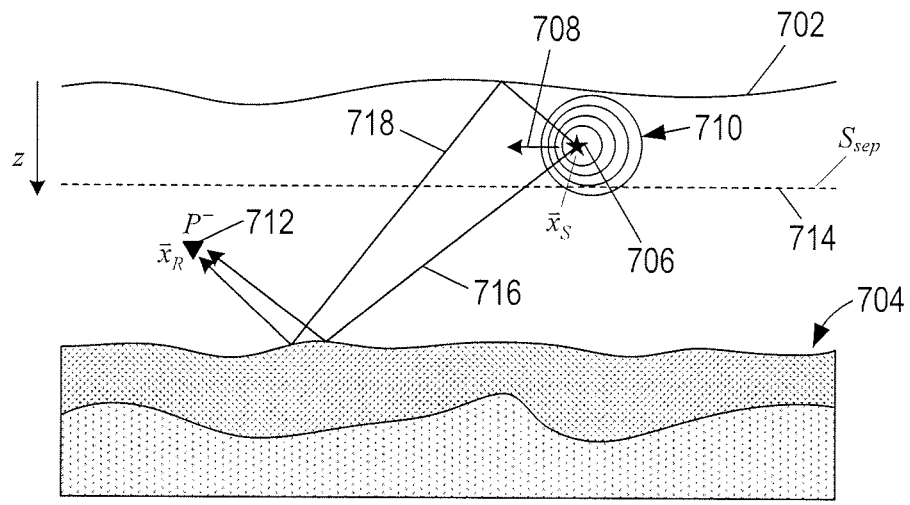
FIGS. 7A-7C show a depth-plane view of ray paths of an upgoing pressure wavefield, a direct incident downgoing velocity wavefield, and a subsurface reflectivity wavefield, respectively.
Figure 7B:
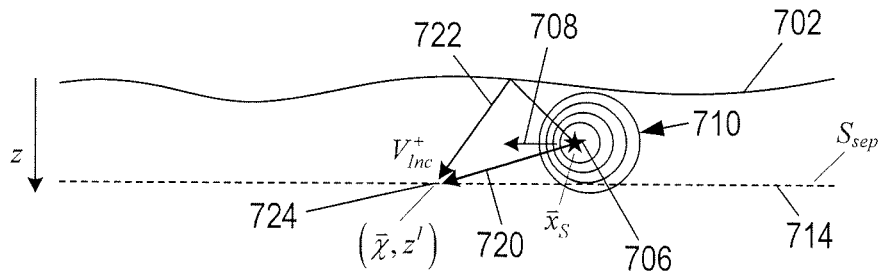
Figure 7C:
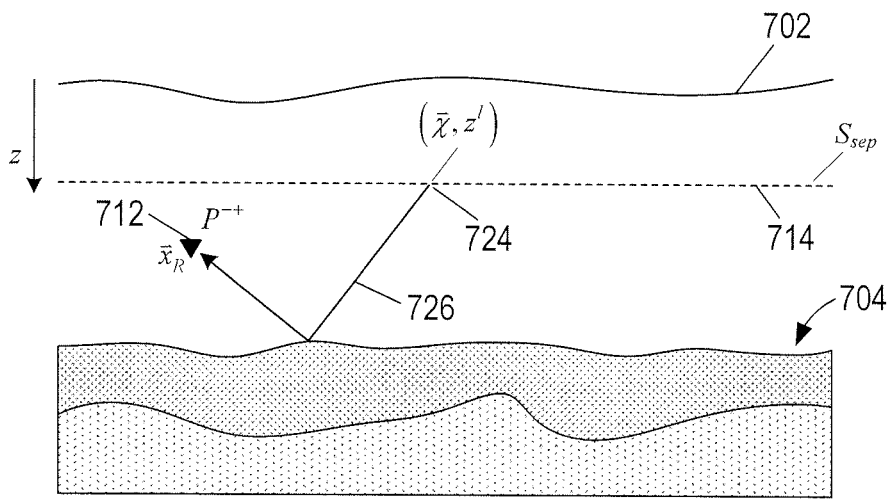

FIGS. 7A-7C show a depth-plane view of ray paths that represent paths of the wavefields in Equation (2). In FIGS. 7A-7C, curve 702 represents the free surface of a body of water located above a subterranean formation 704. A vibrational source 706 is depicted as moving within the body of water in a direction indicated by directional arrow 708. Shifted circles 710 represent a Doppler shifted source wavefield emitted from the vibrational source 706. A receiver 712 comprising pressure and particle motion sensors is located deeper within the body of water than the vibrational source 706. Dashed line 714 represents a virtual planar separation level, $S_{sep}$, that extends in the xy-plane parallel to the free surface 702 and is located at depth, $z^l$, between the depth, $z_S$, of the vibrational source 706 and the depth, $z_R$, of the receiver 712. In FIG. 7A, ray paths 716 and 718 represent portions of the upgoing pressure wavefield $P^-(\vec{x}_R, \vec{x}_S, \omega)$ that reach the receiver 712. Ray path 716 represents a portion of the upgoing reflection that travels from the subterranean formation directly to the receiver 712. Ray path 718 represents a portion of the upgoing pressure wavefield created by a downgoing reflection from the free surface 702 followed by an upgoing reflection from the subterranean formation to the receiver 712. In FIG. 7B, the direct incident downgoing vertical velocity wavefield $V_{z,Inc}^+(\vec{x}, z^l|\vec{x}_S, \omega)$ is represented by ray paths 720 and 722. Ray path 720 represents a portion of the direct incident downgoing vertical velocity wavefield that travels directly to a virtual receiver at a location $(\vec{x}, z^l)$ 724 on the planar separation level $S_{sep}$. Ray path 722 represents a portion of the direct incident downgoing vertical velocity wavefield that is first reflected from the free surface 702 before reaching the virtual receiver at the location 724. In FIG. 7C, the subsurface reflectivity wavefield $P^{-+}(\vec{x}_R|\vec{x}, z^l, \omega)$ is represented by a ray path 726 of a downgoing pressure wavefield created by the virtual source at the location $(\vec{x}, z^l)$ 724 followed by an upgoing pressure wavefield reflected upward from the subterranean formation 704 to the receiver 712. The subsurface reflectivity wavefield $P^{-+}(\vec{x}_R|\vec{x}, z^l, \omega)$ is an up-going pressure wavefield at the receiver 712 (i.e., receiver deghosted) with a source signature of the downgoing wavefield created at the location $(\vec{x}, z^l)$ 724 (i.e., source deghosted) characterized by a Dirac impulse output from a monopole source at the location $(\vec{x}, z^l)$ 724.

The upgoing pressure wavefield $P^-(\vec{x}_R, \vec{x}_S, \omega)$ records the pressure wavefield reflected from the subterranean formation without receiver ghosts created by downgoing pressure wavefields reflected downward from the free surface. The direct incident downgoing vertical velocity wavefield $V_{z,Inc}^+(\vec{x}, z^l|\vec{x}_S, \omega)$ records source motion effects (e.g., Doppler effects) and the source signature and source ghost of the moving vibrational source. Processes and systems described below compute the direct incident downgoing vertical velocity wavefield $V_{z,Inc}^+(\vec{x}, z^l|\vec{x}_S, \omega)$ and use the direct incident downgoing vertical velocity wavefield $V_{z,Inc}^+(\vec{x}, z^l|\vec{x}_S, \omega)$ to remove source-motion effects, attenuate source ghost, and attenuate the source signature recorded in the upgoing pressure wavefield $P^-(\vec{x}_R, \vec{x}_S, \omega)$, leaving the desired subsurface reflectivity wavefield $P^{-+}(\vec{x}_R, \vec{x}, z^l, \omega)$, which is an upgoing pressure wavefield at the receiver side (i.e., receiver deghosted), downgoing pressure wavefield at the source side (i.e., source deghosted), and without source-motion effects and the source signature of the moving vibrational source. In one implementation described below, the subsurface reflectivity wavefield $P^{-+}(\vec{x}_R, \vec{x}, z^l, \omega)$ may be computed for a rough free surface based on multidimensional deconvolution of the direct incident downgoing vertical velocity wavefield from the upgoing pressure wavefield. In an alternative implementation described below, the subsurface reflectively wavefield $P^{-+}(\vec{x}_R, \vec{x}, z^l, \omega)$ may be computed for a flat free surface approximation using plane wave spectral division in which the upgoing pressure wavefield is divided by the direct incident downgoing vertical velocity wavefield.

Computing the Subsurface Reflectivity Wavefield Using Multidimensional Deconvolution The integral relationship of Equation (2) may be numerically approximated by:

$$P^-(\vec{x}_R, \vec{x}_S, \omega) \approx \qquad (3)$$

$$-2j\omega\rho \sum_{\vec{x}_k \in S_{sep}} P^{-+}(\vec{x}_R|\vec{x}_k, z^l, \omega) V_{z,Inc}^+(\vec{x}_k, z^l|\vec{x}_S, \omega) \Delta\vec{x}$$

where $\vec{x}_k \in S_{sep}$ represents coordinate locations $(x_k, y_k)$ on the virtual planar separation level $S_{sep}$;

subscript $k=1, \ldots, K$ is an index for discrete locations in the virtual planar separation level; and $\Delta\vec{x} = \Delta x \Delta y$ with $\Delta x$ and $\Delta y$ representing distances between locations on the virtual planar separation level in the x- and y-directions, respectively.

Figure 8A:
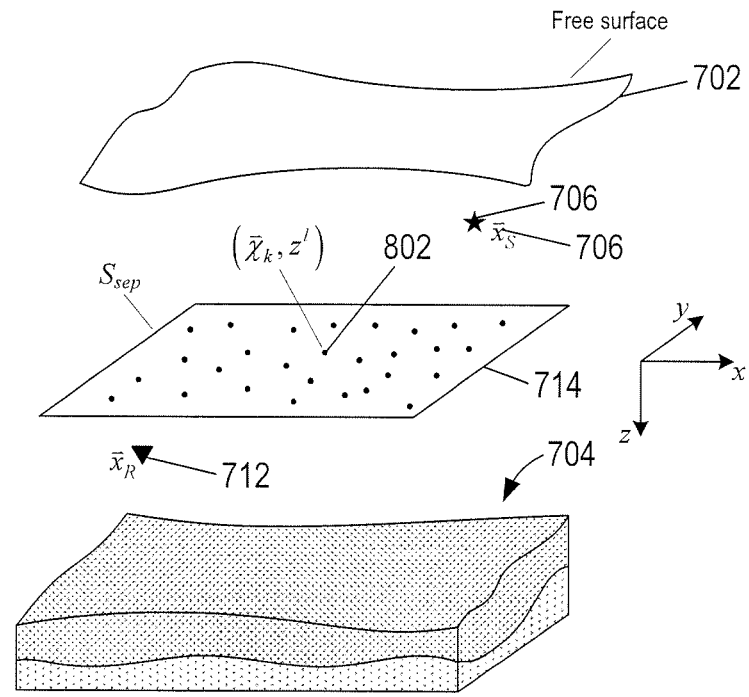
FIG. 8A shows an isometric view of an example virtual planar separation level located at a depth between the depth of a vibrational source and the depth of a receiver.

FIG. 8A shows an isometric view of the virtual planar separation level 714 located at a depth between the depth of the vibrational source 706 and the depth of the receiver 712. Points, such as point 802, represent discrete coordinate locations on the virtual planar separation level 714.

For a vibrational source comprising an array of N marine vibrators, a seismic data acquisition surface comprising M receivers, and a virtual planar separation level with K locations, a numerical approximation of the integral relationship between an up-going pressure wavefield at each receiver, a direct incident downgoing vertical velocity wavefield created by each marine vibrator, and a subsurface reflectivity wavefield is given by:

$$P^-(\vec{x}_R, \vec{x}_{Sn}, \omega) \approx -2j\omega\rho \sum_{\vec{x}_k \in S_{sep}} P^{-+}(\vec{x}_R | \vec{x}_k, z^l, \omega) V^+_{z,Inc}(\vec{x}_k, z^l | \vec{x}_{Sn}, \omega) \Delta \vec{x} \quad (4)$$

where
subscript n=1, ..., N is a marine vibrator index;
subscript m=1, ..., M is a receiver index;
$P^-(\vec{x}_{Rm}, \vec{x}_{Sn}, \omega)$ is the upgoing pressure wavefield created by a marine vibrator of the vibrational source at the location $\vec{x}_{Sn}$ and recorded at the receiver location $\vec{x}_{Rm}$; and
$V_{z,Inc}^+(\vec{x}_k, z^l | \vec{x}_{Sn}, \omega)$ is the direct incident downgoing vertical velocity wavefield created by the n-th marine vibrator of the vibrational source at the location $\vec{x}_{Sn}$ and reaching the location $(\vec{x}_k, z^l)$ at the virtual planar separation level.

Figure 8B:
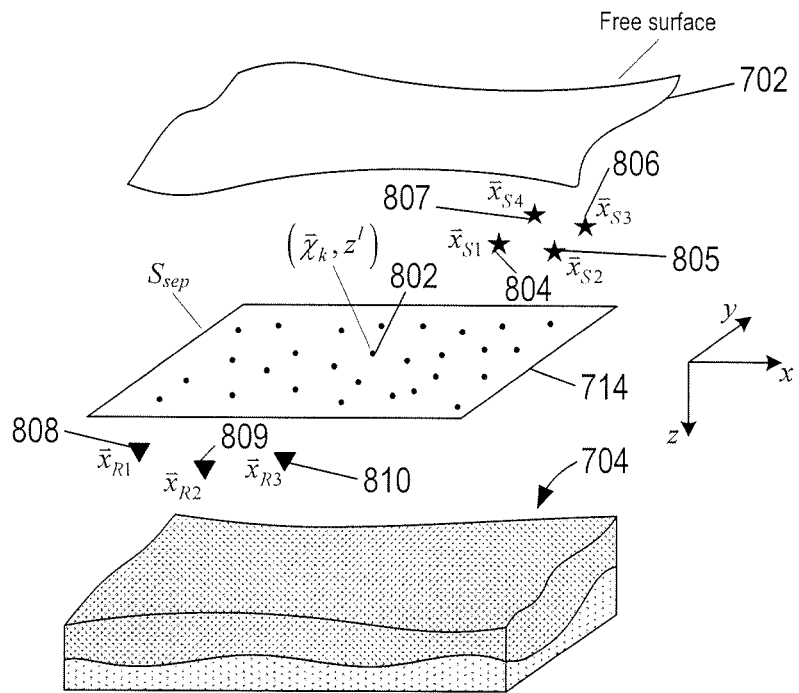
FIG. 8B shows an isometric view of an example virtual planar separation level located at a depth between the depths of an array of marine vibrators and the depths of three receivers.

FIG. 8B shows an isometric view of the virtual planar separation level 714 located at a depth between the depths of an array of four marine vibrators and the depths of three receivers. The marine vibrators 804-807 of a vibrational source are located at coordinate locations $\vec{x}_{S1}$, $\vec{x}_{S2}$, $\vec{x}_{S3}$, and $\vec{x}_{S4}$, respectively. The receivers 808-810 of a seismic data acquisition surface are located at coordinate locations $\vec{x}_{R1}$, $\vec{x}_{R2}$, and $\vec{x}_{R3}$, respectively.

The numerical approximation of the integral relationships between the up-going pressure wavefields, the direct incident downgoing vertical velocity wavefields, and the subsurface reflectivity wavefields given by Equation (4) for N marine vibrators, M receivers, and K locations in the virtual planar separation level can be expressed as a system of equations:

$$P^- \approx P^{-+} V_{Inc}^+ \quad (5)$$

where
$P^-$ is an M×N upgoing pressure wavefield matrix;
$V_{Inc}^+$ is a K×N scaled direct incident downgoing vertical velocity wavefield matrix; and
$P^{-+}$ is an M×K subsurface reflectivity wavefield matrix.

FIG. 9 shows a matrix representation of the system of equations in Equations (5). Elements of the M×N upgoing pressure wavefield matrix $P^-$ 902 are given by $P^-(\vec{x}_{Rm}, \vec{x}_{Sn}, \omega)$ Elements of the K×N scaled direct incident downgoing vertical velocity wavefield matrix $V_{Inc}^+$, 904 are given by $-2j\omega\rho V_{z,Inc}^+(\vec{x}_k, z^l | \vec{x}_{Sn}, \omega)$, where $-2j\omega\rho$ is a scale factor. Elements of the M×K subsurface reflectivity wavefield matrix $P^{-+}$ 906 are given by $P^{-+}(\vec{x}_{Rm} | \vec{x}_k, z^l, \omega)$.

Rows of the matrices $P^-$, $P^{-+}$ and $V_{Inc}^+$ in the system of equations in Equation (5) correspond to fixed receivers and variable marine vibrators (i.e., different marine vibrators located at different lateral (and depth) locations of the upgoing pressure wavefield $P^-(\vec{x}_{Rm}; \vec{x}_{Sn}, \omega)$, the scaled direct incident downgoing velocity wavefield $-2j\omega\rho V_{z,Inc}^+(\vec{x}_{Sn}, z^l | \vec{x}_{Sn}, \omega)$, and the subsurface reflectivity wavefield $P^{-+}(\vec{x}_{Rm} | \vec{x}_k, z^l, \omega)$. The subsurface reflectivity wavefield matrix may be computed by applying a least squares optimization to the system of equations in Equation (5) to obtain:

$$P^{-+} \approx P^-(\overline{V_{Inc}^+})^T [V_{Inc}^+(\overline{V_{Inc}^+})^T + I\varepsilon]^{-1} \quad (6)$$

where
$(\overline{V_{Inc}^+})^T$ is the conjugate transpose of the scaled direct incident downgoing velocity vertical wavefield matrix $V_{Inc}^+$;
I is the identity matrix; and
$\varepsilon$ is a user selected positive-valued stabilization constant.

The matrix $(\overline{V_{Inc}^+})^T[V_{Inc}^+(\overline{V_{Inc}^+})^T + I\varepsilon]^{-1}$ is the pseudo inverse of the scaled direct incident downgoing vertical velocity wavefield matrix $V_{Inc}^+$. Matrix Equation (6) represents multidimensional deconvolution of the upgoing pressure wavefield by the direct incident downgoing vertical velocity wavefield. Each element $P^{-+}(\vec{x}_{Rm} | \vec{x}_k, z^l, \omega)$ of the subsurface reflectivity wavefield matrix $P^{-+}$ may be transformed to the space-time domain using an inverse fast or discrete Fourier transform to obtain a trace of upgoing pressure wavefield data, denoted by $p^{-+}(\vec{x}_{Rm}, \vec{x}_k, z^l, t)$. Each subsurface reflectivity wavefield trace, $p^{-+}(\vec{x}_{Rm}, \vec{x}_k, z^l, t)$, is source-motion corrected, source deghosted, and designatured.

Traces of the subsurface reflectivity wavefield in the space-time domain may be selected to form gathers of subsurface reflectivity wavefield data in different domains with source-motion correction, attenuated source ghosts, and attenuated source signatures. The gathers may be further processed according to steps 605-607 of FIG. 6 to obtain high-resolution images of the subterranean formation without receiver ghosts and without Doppler shifting due to vibrational source motion and without contamination from source ghosts and source signatures.

Computing the Upgoing Pressure Wavefield

The upgoing pressure wavefield elements of the upgoing pressure wavefield matrix $P^-$ of Equations (5) (6) may be determined by applying receiver motion correction and wavefield separation in block 603 of FIG. 6 based on the pressure wavefield and vertical velocity wavefield recorded by the M receivers. The resulting upgoing pressure wavefield elements do not include free surface reflections (i.e., do not include the downgoing pressure wavefield) and therefore receiver deghosted. The recorded pressure wavefield data and vertical velocity wavefield data may be organized into corresponding pressure and vertical velocity matrices.

FIG. 10A shows an M×N pressure wavefield matrix p 1002 formed from M traces of pressure wavefield data recorded while activating N marine vibrators of the moving vibrational source. For example, a trace of pressure wavefield data recorded by a pressure sensor at receiver location $\vec{x}_{Rm}$ for activation of the marine vibrator at the source location $\vec{x}_{Sn}$ is represented by an element $p(\vec{x}_{Rm}, \vec{x}_{Sn}, t)$ 1004.

FIG. 10B shows an M×N vertical velocity wavefield matrix $v_z$ 1006 formed from M traces of vertical velocity wavefield data recorded while activating N marine vibrators of the vibrational source. For example, a trace of vertical velocity wavefield data recorded by a particle motion sensor at receiver location $\vec{x}_{Rm}$ for activation of the marine vibrator at the source location $\vec{x}_{Sn}$ is represented by an element $v_z(\vec{x}_{Rm}, \vec{x}_{Sn}, t)$ 1008. The pressure wavefield data $p(\vec{x}_{Rm}, \vec{x}_{Sn}, t)$ and the vertical velocity wavefield data $v_z(\vec{x}_{Rm}, \vec{x}_{Sn}, t)$ are recorded by collocated pressure and particle motion sensors of a streamer for m=1, ..., M and n=1, ..., N.

The pressure wavefield matrix p 1002 and the vertical velocity wavefield matrix $v_z$ 1006 may be used to calculate the upgoing pressure wavefield matrix $P^-$ of Equations (5)-(6). Elements of the pressure wavefield matrix p 1002 and traces of the vertical velocity wavefield matrix $v_z$ 1006 may be transformed from the space-time ("s-t") domain to the wavenumber-frequency ("w-f") domain. The transformation may be carried out using a fast Fourier transform ("FFT") or a discrete Fourier transform ("DFT") with respect to time and the horizontal receiver coordinates ($x_R$, $y_R$).

FIG. 11A shows an example transformation of the pressure wavefield matrix p 1002 to a pressure wavefield matrix P 1102 in the w-f domain. Each pressure wavefield element of the pressure wavefield matrix p 1002 is transformed from the s-t domain to the w-f domain to obtain a corresponding pressure wavefield spectrum represented by an element of the pressure wavefield matrix P 1002 as follows:

$$p(\vec{x}_{Rm}, \vec{x}_{Sn}, t) \rightarrow P(k_x, k_y, \omega | z_{Rm}, \vec{x}_{Sn}) \quad (7)$$

where $k_x$ and $k_y$ are x- and y-direction horizontal wavenumber numbers.

For example, $P(k_x, k_y, \omega | z_{Rm}, \vec{x}_{Sn})$ 1104 is the pressure wavefield spectrum of the pressure wavefield $p(\vec{x}_{Rm}, \vec{x}_{Sn}, t)$ 1004.

FIG. 11B shows an example transformation of the vertical velocity wavefield matrix $v_z$ 1006 to a vertical velocity wavefield matrix $V_z$ 1104 in the w-f domain. Each vertical velocity wavefield element of the vertical velocity wavefield matrix $v_z$ 1006 is transformed from the s-t domain to the w-f domain to obtain a corresponding vertical velocity wavefield spectrum represented by an element of the vertical velocity wavefield matrix $V_z$ 1106 as follows:

$$v_z(\vec{x}_{Rm}, \vec{x}_{Sn}, t) \rightarrow V_z(k_x, k_y, \omega | z_{Rm}, \vec{x}_{Sn}) \quad (8)$$

For example, $V_z(k_x, k_y, \omega | z_{Rm}, \vec{x}_{Sm})$ 1008 is the vertical velocity wavefield spectrum of the vertical velocity wavefield $v_z(\vec{x}_{Rm}, \vec{x}_{Sn}, t)$ 908.

The pressure wavefield matrix P 1102 and the vertical velocity wavefield matrix $V_z$ 1104 may be used to calculate the up-going pressure wavefield matrix $P^-$ 802 in the s-f domain. An up-going pressure wavefield matrix $\hat{P}^-$ in the w-f domain may be calculated from the pressure wavefield matrix P 1102 and the vertical velocity wavefield matrix $V_z$ 1104. The up-going pressure wavefield matrix $\hat{P}^-$ can then be transformed from the w-f domain to the s-f domain to obtain the up-going pressure wavefield matrix $P^-$ 802.

FIG. 12 shows an example calculation of the up-going pressure wavefield matrix $\hat{P}^-$ 802 from the pressure wavefield matrix P 1102 and the vertical velocity wavefield matrix $V_z$ 1106. Each up-going pressure wavefield element of the upgoing pressure wavefield matrix $\hat{P}^-$ 1206 is computed from corresponding pressure wavefield and vertical velocity wavefield elements of the pressure wavefield matrix P 1102 and the vertical velocity wavefield matrix $V_z$ 1104. For example, dashed-line directional arrows 1202 and 1204 represent calculating an upgoing pressure wavefield element 1208 of the upgoing pressure wavefield matrix $\hat{P}^-$ 1206 as follows:

$$\hat{P}^-(k_x, k_y, \omega | z_{Rm}, \vec{x}_{Sn}) = \quad (9)$$
$$\frac{1}{2}\left[P(k_x, k_y, \omega | z_{Rm}, \vec{x}_{Sn}) - \frac{\omega\rho}{k_z}V_z(k_x, k_y, \omega | z_{Rm}, \vec{x}_{Sn})\right]$$
$$e^{-j(k_x \Delta x + k_y \Delta y)}$$

where $j = \sqrt{-1}$;

$\rho$ is the density of water;

$(x_0, y_0)$ are coordinates of the receiver at the start of the marine survey;

$(x_R, x_R)$ are coordinates of the receiver;

$\Delta x = x_R - x_0$;

$\Delta y = y_R - y_0$;

$e^{-j(k_x \Delta x + k_y \Delta y)}$ is a receiver motion correction operator; and $k_z = \sqrt{\left(\frac{\omega}{c}\right)^2 - k_x^2 - k_y^2}$ is the vertical *wavenumber*.

The upgoing pressure wavefield $\hat{P}^-(k_x, k_y, \omega | z_{Rm}, \vec{x}_{Sn})$ is receiver deghosted and corrected for receiver motion. In FIG. 12, the upgoing pressure wavefield elements of the upgoing pressure wavefield matrix $\hat{P}^-$ 1206 are inverse transformed from the w-f domain to the s-f domain to obtain the upgoing pressure wavefield elements of the up-going pressure wavefield $P^-$ 802. The inverse transformation may be carried out using an inverse FFT ("IFFT") or an inverse DFT ("IDFT") with respect to horizontal wavenumbers ($k_x, k_y$). For example, upgoing pressure wavefield element 1210 of the upgoing pressure wavefield matrix $P^-$ 802 may be computed as follows:

$$\hat{P}^-(k_x, k_y, \omega | z_{Rm}, \vec{x}_{Sn}) \rightarrow P^-(\vec{x}_{Rm}, \vec{x}_{Sn}, \omega) \quad (10)$$

In the cases of a depth varying measurement surface, wavefield separation may be used to obtain pressure and normal velocity wavefields in the s-f domain.

Determining the Direct Incident Downgoing Vertical Velocity Wavefield

Elements of the scaled direct incident downgoing vertical velocity wavefield matrix $V_{Inc}^+$ of Equations (5)-(6) may be obtained in different ways. In one implementation, the direct incident downgoing vertical velocity wavefield matrix may be obtained from near field pressure and vertical velocity wavefield measurements obtained by towing a source acquisition surface comprising one or more short streamers within the near field of the moving vibrational source. Each streamer may include collocated pressure and particle motion sensors that measure direct incident downgoing pressure and vertical velocity wavefields emitted in the near field from the moving vibrational source. Each sensor measures the direct incident downgoing pressure or vertical velocity wavefield and the source ghost. The dynamic range of the particle motion sensors may be adjusted to measure the direct incident downgoing vertical velocity wavefield because scattering from a subterranean formation is largely suppressed due to spreading.

Figure 13A:
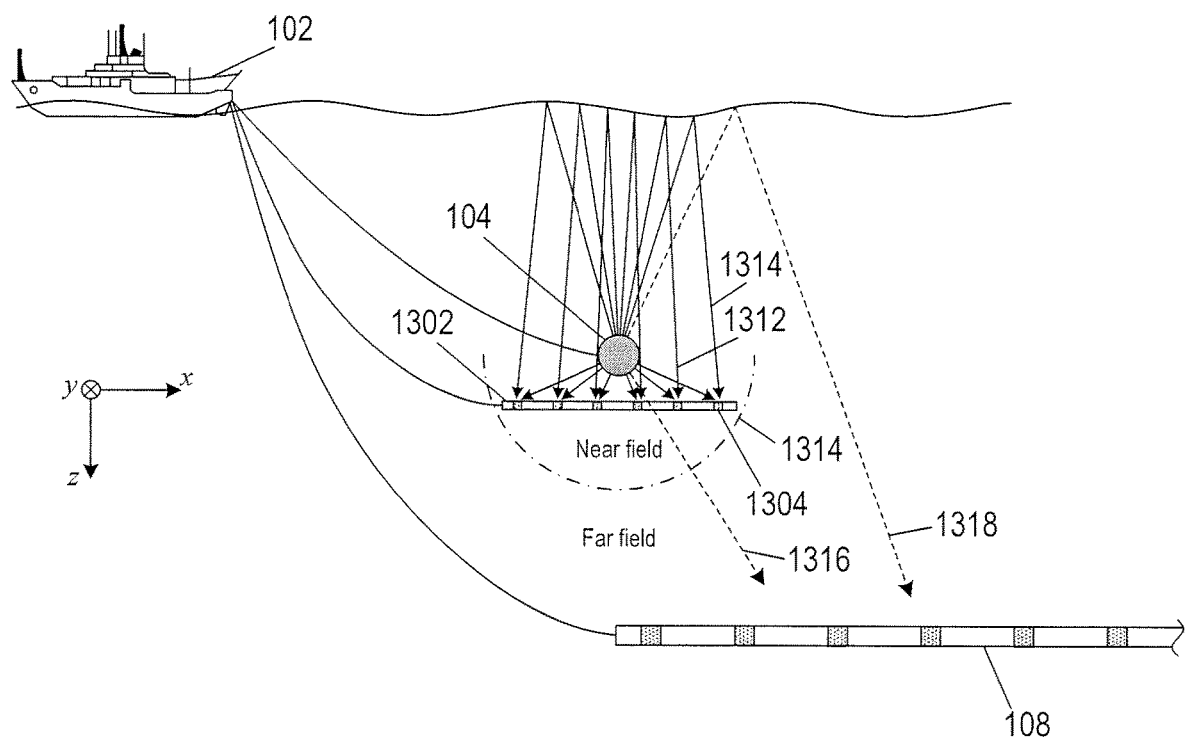
FIG. 13A shows a side-elevation view of a streamer of a source acquisition surface towed within the near field of a moving vibrational source.

FIG. 13A shows a side-elevation view of a streamer 1302 of a source acquisition surface towed within the near field of the moving vibrational source 104. The source acquisition surface comprises one or more streamers. Each streamer comprises spaced apart collocated pressure and particle motion sensors represented by shaded boxes, such as shaded box 1304. Curved dot-dashed line 1306 represents a notional boundary between the near field and the far field of the source 104. The near field 1308 corresponds to a region close to the source 104 where the signature of the source wavefield varies due to overlapping signatures of separate pressure waves generate by the marine vibrators of the vibrational source 104. By contrast, the far field 1310 represents a region away from the vibrational source 104 where the signature of the source wavefield is stable with distance from the vibrational source 104. The notional boundary is located at about $2d^2/\lambda$ from the center of the vibrational source 104, where d is a length dimension of the vibrational source 104, and A is a wavelength of the source wavefield generated by the vibrational source 104. Solid line ray paths, such as ray paths 1312 and 1314, represent portions of source wavefields that reach the receivers located along the streamer 1302. For example, ray path 1312 represents a portion of the source wavefield emitted from the moving vibrational source 104 that travels directly to the receiver 1304. Ray path 1314 represents a source ghost created by a portion of the source wavefield emitted from the vibrational source 104 that travels upward to the free surface and is reflected downward to the receiver 1304. The pressure and vertical velocity wavefields measured by the collocated pressure and particle motion sensors are direct incident wavefields comprising the direct source wavefield and the source ghost as represented by ray paths 1312 and 1314. Dash line ray paths 1316 and 1318 represent portions of the source wavefield that travel beyond the streamer 1302 to interact with the subterranean formation.

The streamers of the source acquisition surface may undulate due to water currents and weather conditions. The streamers may be curved to form a hemispherical-shaped, or curved, source acquisition surface located below the vibrational source 104 and within the near field of vibrational source 104. The curved shape of the source acquisition surface may enable the particle motion sensors to measure the radially expanding source wavefield normal to the wavefront of the source wavefield.

The direct incident pressure wavefield obtained using the source acquisition surface of FIG. 13A is denoted by $$\{p_{Inc}(\vec{x}_{Rm}, \vec{x}_{Sn}, t)\}_{q=1}^{Q} \quad (11a)$$

where
Q is the number of receivers of the source acquisition surface; and
$\vec{x}_{rq}$ is the coordinate location of a receiver of the source acquisition surface.

The direct incident normal velocity wavefield obtained using the source acquisition surface of FIG. 13A is denoted by $$\{v_{n,Inc}(\vec{x}_{Rm}, \vec{x}_{Sn}, t)\}_{q=1}^{Q} \quad (11b)$$

The direct incident pressure and normal velocity wavefields may be corrected for receiver motion. Receiver motion is corrected for a flat source acquisition surface by first transforming the direct incident pressure and normal velocity wavefields from the s-t domain to the w-t domain:

$$p_{Inc}(\vec{x}_{Rm}, \vec{x}_{Sn}, t) \rightarrow P_{Inc}(k_x, k_y, t | \vec{x}_{Sn})$$

$$v_{n,Inc}(\vec{x}_{Rm}, \vec{x}_{Sn}, t) \rightarrow V_{n,Inc}(k_x, k_y, t | \vec{x}_{Sn})$$

The direct incident pressure and normal velocity wavefields are then multiplied by the receiver motion correction operator:

$$P_{Inc}(k_x, k_y, t | \vec{x}_{Sn}) e^{-j(k_x \Delta x + k_y \Delta y)}$$

$$V_{n,Inc}(k_x, k_y, t | \vec{x}_{Sn}) e^{-j(k_x \Delta x + k_y \Delta y)}$$

The receiver motion corrected direct incident pressure and normal velocity wavefields are transformed from the w-t domain back to the s-t domain.

The direct incident normal velocity wavefield $v_{n,Inc}(\vec{x}_{Rm}, \vec{x}_{Sn}, t)$ is the normal-component with respect to the source acquisition surface 1302 of a three-dimensional velocity wavefield vector represented by ($v_{x,Inc}(\vec{x}_{Rm}, \vec{x}_{Sn}, t)$, $v_{y,Inc}(\vec{x}_{Rm}, \vec{x}_{Sn}, t)$, $v_{z,Inc}(\vec{x}_{Rm}, \vec{x}_{Sn}, t)$). The direct incident pressure wavefield and the direct incident normal vertical velocity wavefield may be transformed from the s-t domain to the s-f domain:

$$p_{Inc}(\vec{x}_{Rm}, \vec{x}_{Sn}, t) \rightarrow P_{Inc}(\vec{x}_{Rm}, \vec{x}_{Sn}, \omega)$$

$$v_{n,Inc}(\vec{x}_{Rm}, \vec{x}_{Sn}, t) \rightarrow V_{n,Inc}(\vec{x}_{Rm}, \vec{x}_{Sn}, \omega)$$

The direct incident vertical velocity wavefield may be extrapolated downward to the depth of the virtual planar separation level by applying a Kirchhoff-Helmholtz integral extrapolation given by:

$$\int_{S_{sep}} d\vec{\chi} \, [G(\vec{\chi}, z^I | \vec{x}_{Sn}) i\omega \rho V_{z,Inc}^+(\vec{\chi}, z^I | \vec{x}_{Sn}, \omega)] =$$
$$\int_{S_r} d\vec{n} \cdot [P_{Inc}(\vec{x}_{Rm}, \omega) \nabla G(\vec{\chi}, z^I, \vec{x}_{Sn}) -$$
$$G(\vec{\chi}, z^I | \vec{x}_{Sn}) i\omega \rho V_{n,Inc}(\vec{x}_{Rm}, \omega)] \quad (12)$$

where
$S_r$ is the source acquisition surface; and
G is the free-space Green's function.

The unknown quantity in Equation (12) is the direct incident downgoing velocity wavefield $V_{z,Inc}^+(\vec{\chi}, z^I | \vec{x}_{Sn}, \omega)$ at locations of the virtual planar separation level. Integral Equation (12) may be approximated by a matrix equation that can be solved for $V_{z,Inc}^+(\vec{\chi}, z^I | \vec{x}_{Sn}, \omega)$ to form the scaled direct incident downgoing vertical velocity wavefield matrix $V_{Inc}^+$.

In another implementation, the direct incident vertical velocity wavefield may be obtained from the pressure and vertical velocity wavefields recorded by receivers of the seismic data acquisition surface, OBCs, or ocean bottom nodes, located below the moving vibrational source. The direct incident vertical velocity wavefield may be obtained for time samples in a time window $0 \leq t < t_D$, where $t_D$ represents the time when wavefields that reach the receivers begin to record reflection events from the subterranean formation.

Figure 13B:
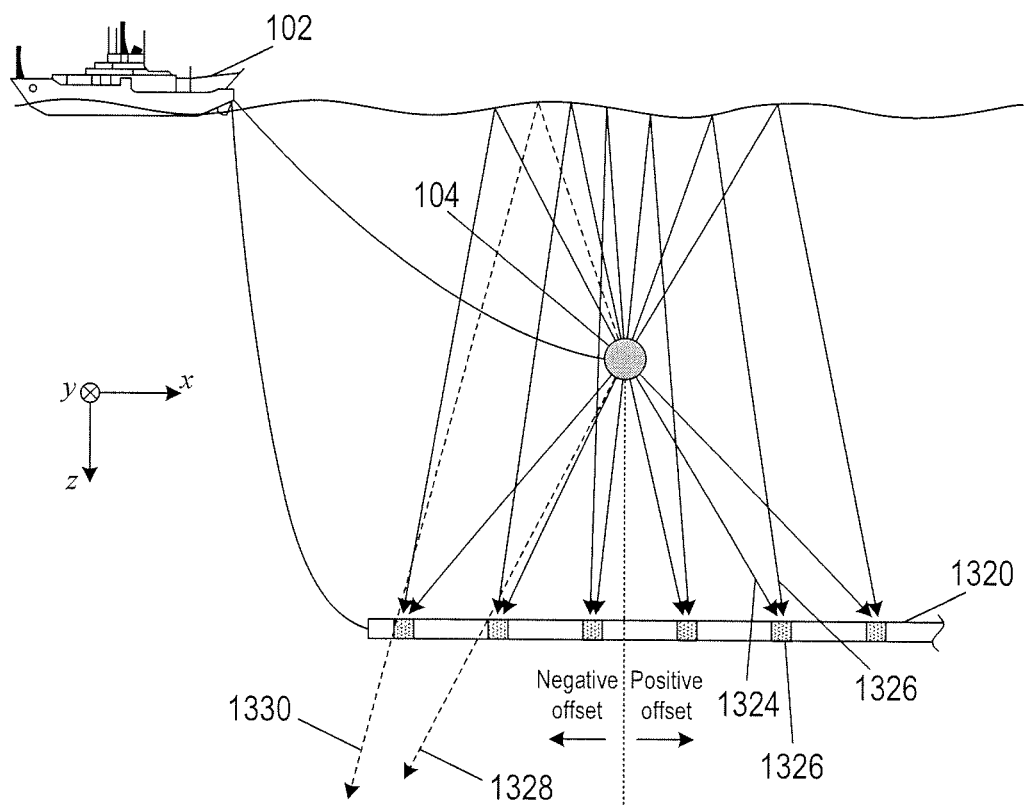
FIG. 13B shows a side-elevation view of a portion of a streamer located below a vibrational source.

FIG. 13B shows a side-elevation view of a streamer 1320 of a seismic data acquisition surface located below the vibrational source 104. To determine the direct incident velocity wavefields, a portion of the streamer 1320 is positioned below the vibration source 104. Solid line ray paths, such as ray paths 1324 and 1326, represent portions of source wavefields that reach the receivers located along the streamer 1320 and do not include reflections from the subterranean formation. For example, ray path 1324 represents a portion of the source wavefield emitted from the moving vibrational source 104 that travels directly to the receiver 1322. Ray path 1326 represents a portion of the source wavefield emitted from the vibrational source 1304 that travels upward to the free surface and is reflected downward to the receiver 1322. Dash line ray paths 1328 and 1330 represent portions of the source wavefield that travel beyond the receivers to interact with the subterranean formation. The collocated pressure and particle motion sensors record traces of pressure and velocity source wavefields.

The pressure wavefield obtained using the seismic data acquisition of surface of FIG. 13B is denoted by $$\{p(\vec{x}_{Rm}, \vec{x}_{Sn}, t)\}_{m=1}^{M} \quad (13a)$$

where M is the number of receivers of the source acquisition surface.

The vertical velocity wavefield obtained using the seismic data acquisition of surface of FIG. 13B is denoted by $$\{v_z(\vec{x}_{Rm}, \vec{x}_{Sn}, t)\}_{m=1}^{M} \quad (13b)$$

FIGS. 14A-17 and Equations (14)-(16) represent computational steps of wavefield separation that may be used to obtain the elements of the direct incident vertical velocity wavefield matrix $V_{Inc}^+$ based on the pressure and vertical velocity wavefields in Equations (13a) and (13b).

FIG. 14A shows pressure wavefield data represented as an M×N pressure wavefield matrix p 1402 formed from the pressure wavefield data recorded while activating N marine vibrators of the vibrational source. The pressure wavefield matrix elements $P(\vec{x}_{Rm}, \vec{x}_{Sn}, t)$ represent the pressure wavefield data in Equation (13a). FIG. 14B shows velocity wavefield data represented as an M×N velocity wavefield matrix v 1406 formed from velocity wavefield data recorded while activating N marine vibrators of the vibrational source. The vertical velocity wavefield matrix elements $v_z(\vec{x}_{Rm}, \vec{x}_{Sn}, t)$ represent the vertical velocity wavefield data in Equation (13b).

The pressure wavefield matrix p 1402 and the velocity wavefield matrix v 1406 may be used to calculate the scaled direct incident downgoing vertical velocity wavefield matrix $V_{Inc}^+$ of Equation (5)-(6). Traces of the pressure wavefield matrix p 1402 and traces of the velocity wavefield matrix v 1406 may be transformed from the s-t domain to the w-f domain. The transformation may be carried out, for example, using an FFT or a DFT with respect to time and the horizontal receiver coordinates ($x_R$, $y_R$). Following transformation of the pressure and vertical velocity wavefields from the s-t domain to the w-f domain, the pressure and vertical velocity wavefields may be corrected for receiver motion by multiplying by the receiver motion correction operator as described above with reference to Equations (11a) and (11b).

FIG. 15A shows an example transformation of the pressure wavefield matrix p 1402 in the s-t domain to a pressure wavefield matrix P 1502 to the w-f domain. Each pressure wavefield element of the pressure wavefield matrix p 1402 is transformed from the s-t domain to the w-f domain to obtain a corresponding pressure wavefield spectrum represented by an element of the pressure wavefield matrix P 1502 as follows:

$$p(\vec{x}_{Rm}, \vec{x}_{Sn}, t) \rightarrow P(k_x, k_y, \omega | z_{Rm}, \vec{x}_{Sn}) \tag{14}$$

For example, $P(k_x, k_y, \omega | z_{Rm}, \vec{x}_{Sn})$ 1504 is the pressure wavefield spectrum of the pressure wavefield $p(\vec{x}_{Rm}, \vec{x}_{Sn}, t)$ 1404.

FIG. 15B shows an example transformation of the velocity wavefield matrix v 1406 to a velocity wavefield matrix V 1506 in the w-f domain. Each velocity wavefield element of the velocity wavefield matrix v 1406 is transformed from the s-t domain to a corresponding velocity wavefield spectrum represented by an element of the velocity wavefield matrix V 1506 as follows:

$$v_z(\vec{x}_{Rm}, \vec{x}_{Sn}, t) \rightarrow V_z(k_x, k_y, \omega | z_{Rm}, \vec{x}_{Sn}) \tag{15}$$

For example, $V_z(k_x, k_y, \omega | z_{Rm}, \vec{x}_{Sn})$ 1508 is the velocity wavefield spectrum of the velocity wavefield $v_z(\vec{x}_{Rm}, \vec{x}_{Sn}, t)$ 1408.

The pressure wavefield matrix P 1502 and the velocity wavefield matrix V 1506 may be used to calculate the scaled direct incident downgoing vertical velocity wavefield matrix $V_{Inc}^+$ 804 as follows.

FIG. 16 illustrates calculation of the scaled direct incident downgoing vertical velocity wavefield matrix $V_{Inc}^+$ 804 from the pressure wavefield matrix P 1502 and the velocity wavefield matrix V 1506. Each element of the direct incident downgoing vertical velocity wavefield matrix $\hat{V}^+$ 1606 is computed from corresponding elements of the pressure wavefield matrix P 1502 and elements of the velocity wavefield matrix V 1506. For example, dashed-line directional arrows 1602 and 1604 represent calculating a downgoing vertical velocity wavefield element of the downgoing vertical velocity wavefield matrix $\hat{V}^+$ 1606 as follows:

$$V_z^+(k_x, k_y, \omega)|z_{Rm}, \vec{x}_{Sn}) = \tag{16}$$
$$\frac{1}{2}\left[V_z(k_x, k_y, \omega | z_{Rm}, \vec{x}_{Sn}) + \frac{k_z}{\omega\rho}P(k_x, k_y, \omega | z_{Rm}, \vec{x}_{Sn})\right]$$

The computation in Equation (16) removes the upgoing velocity wavefield and retains the downgoing vertical velocity wavefield, the source ghost, and the receiver ghost. The elements of the downgoing vertical velocity wavefield matrix are correlated with the complex conjugate of the far field nominal sweep signature, $\overline{S}(\omega)$, of the vibrational source to correlate (i.e., collapse) the sweep signal of the vibrational source into a short wavelet followed by transforming from the w-f domain to the s-t domain as follows:

$$V_z^+(k_x, k_y, \omega | z_{Rm}, \vec{x}_{Sn})\overline{S}(\omega) = \tilde{V}_z^+(k_x, k_y, \omega | z_{Rm},$$
$$\vec{x}_{Sn}) \rightarrow \tilde{v}_z^+(\vec{x}_{Rm}, \vec{x}_{Sn}, t)$$

where tilda "~" represents correlation with the far field nominal sweep signature of the vibrational source.

The far field nominal sweep signature, s(t), of the vibrational source is determined by summing the measured near field signals of the individual marine vibrators as measured by the near field pressure sensors described above with reference to FIG. 2 and transforming to the frequency domain to obtain the far field nominal sweep signature to the frequency domain $\overline{S}(w)$. Time windowing is applied by retaining $\tilde{v}_z^+(\vec{x}_{Rm}, \vec{x}_{Sn}, t)$ with time samples in the time window $0 \leq t < t_D$ and discarding $\tilde{v}_z^+(\vec{x}_{Rm}, \vec{x}_{Sn}, t)$ with time samples $t \geq t_D$. The resulting downgoing vertical velocity wavefield correlated with the far field nominal sweep signature is transformed to the s-f domain:

$$\tilde{v}_z^+(\vec{x}_{Rm}, \vec{x}_{Sn}, t) \rightarrow \tilde{V}_z^+(\vec{x}_{Rm}, \vec{x}_{Sn}, \omega)$$

The direct incident downgoing vertical velocity wavefield in the s-f domain is obtained by decorrelating the far field nominal sweep signature from the downgoing vertical velocity wavefield correlated with the far field nominal sweep signature:

$$\frac{\tilde{V}_z^+(\vec{x}_{Rm}, \vec{x}_{Sn}, \omega)}{\overline{S}(\omega)} = V_{z,Inc}^+(\vec{x}_{Rm}, \vec{x}_{Sn}, \omega)$$

In the s-t domain, the direct incident vertical velocity wavefield, $v_{z,Inc}^+(\vec{x}_{Rm}, \vec{x}_{Sn}, t)$, retains the amplitudes with time samples in the time window $0 \leq t < t_D$. The scaled direct incident downgoing vertical velocity wavefield elements of the scaled direct incident downgoing vertical velocity wavefield matrix $V_{Inc}^+$ 804 are obtained by multiplying the direct incident downgoing vertical velocity wavefield $V_{z,Inc}^+(\vec{x}_{Rm}, \vec{x}_{Sn}, \omega)$ by the scale factor $-2j\omega\rho$ and extrapolating upward from the receiver depth $z_R$ to corresponding locations on the virtual planar separation level at depth $z^l$, as follows:

$$-2j\omega\rho V_{z,Inc}^+(\vec{x}, z^l | \vec{x}_{Sn}, \omega) = -2j\omega\rho V_{z,Inc}^+(\vec{x}_{Rm},$$
$$\vec{x}_{Sn}, \omega)\exp(-ik_z(z_R - z^l)) \tag{17}$$

where $\exp(-ik_z(z_R - z^l))$ is an upward extrapolation operator.

In other implementations, elements of the scaled direct incident downgoing vertical velocity wavefield matrix $V_{Inc}^+$ of Equations (5)-(6) may be modelled by the bracket expression of the following integral relationship:

$$\int_{-\infty}^{\infty} dt e^{-j\omega t} \int_{-\infty}^{\infty} p^-(\vec{x}_R, t - \tau; \vec{x}_{Sn}(\tau), 0)s_n(\tau)d\tau = \tag{18}$$
$$\int_{S_{sep}} \left[\int_{-\infty}^{\infty} dt e^{-j\omega t} \int_{-\infty}^{\infty} d\tau 2\nabla p^+(\vec{x}, \tau; \vec{x}_{Sn}(\tau), 0)\frac{1}{2\pi}\int_{-\infty}^{\infty} d\omega e^{j\omega(-\tau+t)}\right]$$
$$P^{-+}(\vec{x}_R, \omega; \vec{x}, 0) \cdot \vec{n} d\vec{x}$$

where
$\tau$ is time;
$s_n(\tau)$ is the source signature of the source wavefield emitted by a marine vibrator;
$\vec{x}$ is a coordinate location in the body of water;

$$\nabla = \left(\frac{\partial}{\partial x}, \frac{\partial}{\partial y}, \frac{\partial}{\partial z}\right)$$

gradient operator;

$\nabla p^+(\vec{x}, \tau; \vec{x}_{Sn}(\tau), 0)$ is the gradient of the downgoing pressure wavefield; and $\vec{n}$ is a unit length normal vector to the virtual planar separation level.

A derivation of Equation (18) is provided below in the APPENDIX. The source signature $s_n(\tau)$ may be derived from measurement of the vibrator plate motion of the n-th marine vibrator of the vibrational source for a given sweep signal. The integral expression $\int_{-\infty}^{\infty} dt e^{-j\omega t}$ on the left of the bracketed expression of Equation (18) is a Fourier transform operator from the time domain to the frequency domain. The bracketed expression on the right-hand side of Equation (18) is an operator applied by an integral equation to the subsurface reflectivity wavefield $p^{-+}(\vec{x}_R, \omega; \vec{x}, 0)$. For a given runtime t, the third integral expression within the bracketed expression of Equation (18) is a time-shifted delta function (i.e., a time-shifted sin c function for bandlimited data):

$$\delta(-\tau + t) = \frac{1}{2\pi} \int_{-\infty}^{\infty} d\omega e^{j\omega(-\tau + t)} \quad (19)$$

Equation (18) shows the up going wavefield $p^-(\vec{x}_R, t-\tau; \vec{x}_{Sn}, 0)$ with source motion modelled in the s-f domain related to the operator (i.e., bracketed expression) applied to the subsurface reflection wavefield $p^{-+}(\vec{x}_R, \omega; \vec{x}, 0)$. Based on a fundamental property of the delta function, the time shifted delta function multiplied by the source wavefield and integrated over $\tau$ extracts the source wavefield at the time t. As a result, a source signature sample value, $s_n(\tau=t)$, is injected at time t and at the corresponding nominal spatial location $\vec{x}_{Sn}(\tau=t)$ of the n-th marine vibrator of the vibrational source. Numerical evaluation of the surface integral in Equation (18) at the discrete time samples generally leads to off grid spatial locations. Injection of the source signature $s_n(\tau=t)$ is performed by using a spatial sin c function at the depth (i.e., $z_{Sn}$) of the nominal spatial location $\vec{x}_{Sn}(\tau=t)$ of actual recorded traces of pressure wavefield data. The injected source signatures are then extrapolated from the depth of the nominal spatial location (i.e., $z_{Sn}$), and the corresponding source ghost level, down to the virtual planar separation level $S_{sep}$ using the gradient of a free-space Green's function to obtain the gradient of pressure wavefield at the virtual planar separation level. Instead of the free-space Green's function, a time domain finite-difference approach may be used to maintain higher media flexibility.

Figure 17A:
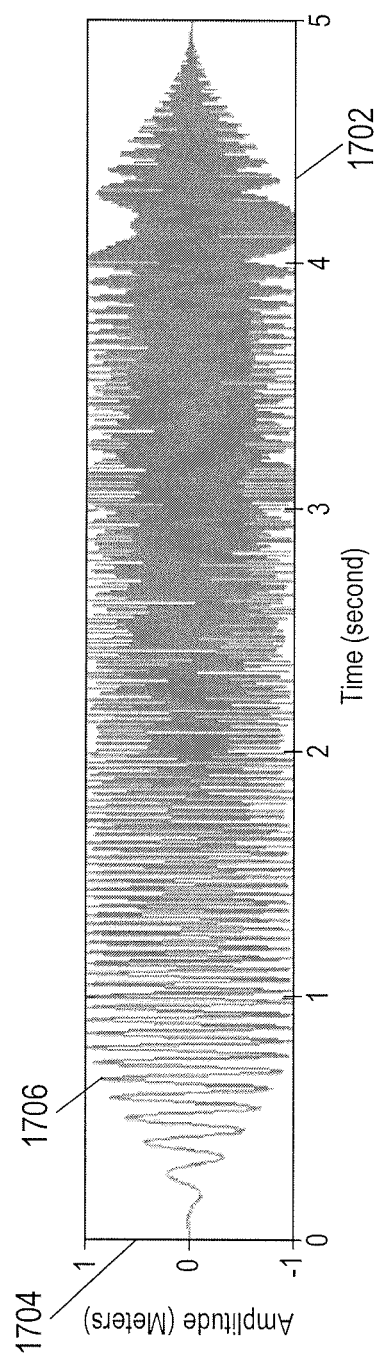
FIG. 17A shows a plot of a source signature of a marine vibrator in the time domain.
Figure 17B:
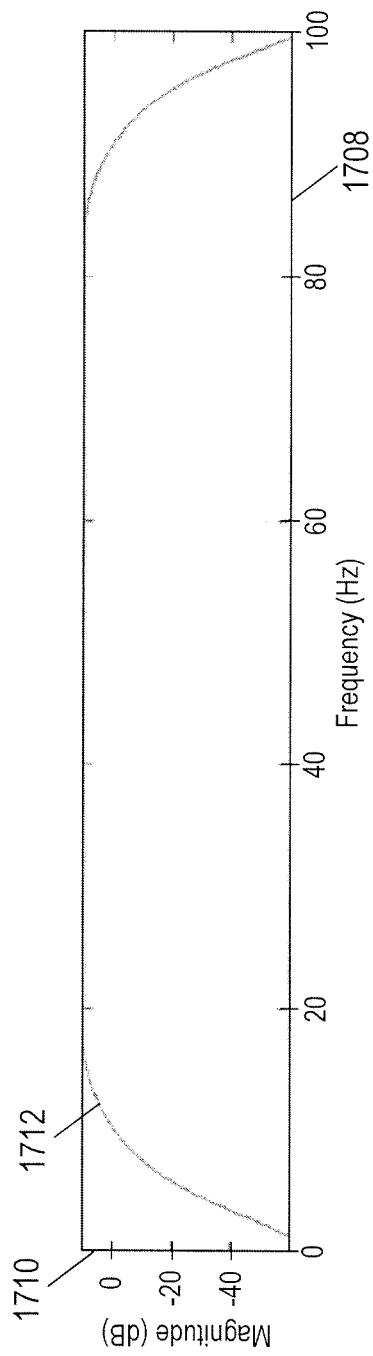
FIG. 17B shows a plot of a frequency spectrum of a marine vibrator.

FIG. 17A shows a plot of a source signature of a marine vibrator in the time domain. Horizontal axis 1702 represents time. Vertical axis 1704 represents a normalized amplitude range for the source signature. Curve 1706 represents the rapidly oscillating amplitude of the marine vibrator activated over a five second period, revealing how the amplitude gradually increases over about one second, vibrates at a high frequency and sustained amplitude for about three seconds, and decreases to zero over about one second. FIG. 17B shows a plot of a frequency spectrum for the source signature of the marine vibrator. Horizontal axis 1708 represents a range of frequencies. Vertical axis 1710 represents a range of magnitudes in dBs. Curve 1712 represents the magnitude of frequencies generated by the marine vibrator over a broad range of frequencies ranging from about 2 Hz to about 100 Hz. The source signature shown in FIG. 17A is for illustrative purposes only. Implementations may employ marine vibrators having different characteristics and duration the example illustrated.

Figure 18A:
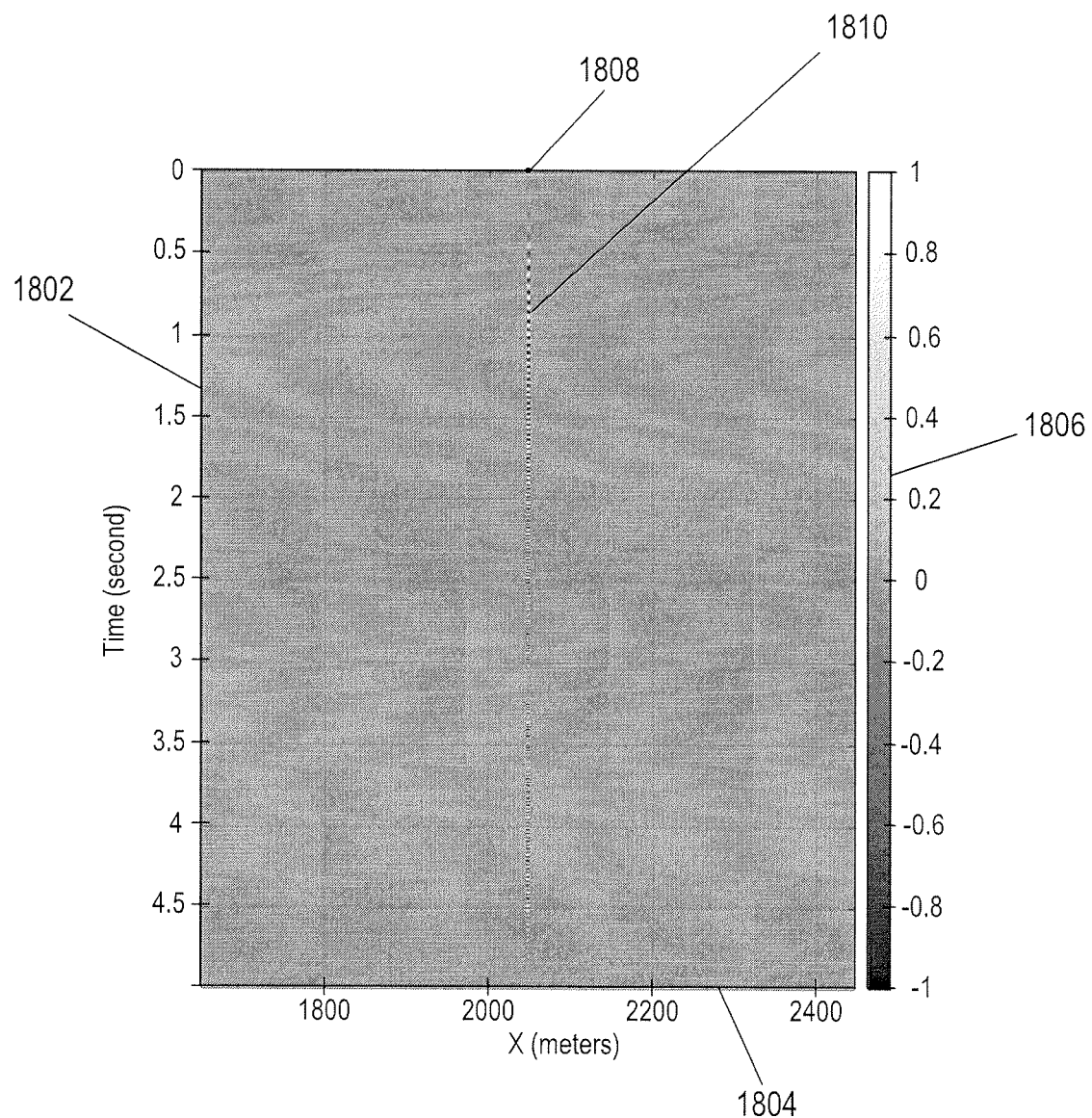
FIGS. 18A-18B show modelled source signatures of a marine vibrator at different survey vessel speeds.
Figure 18B:
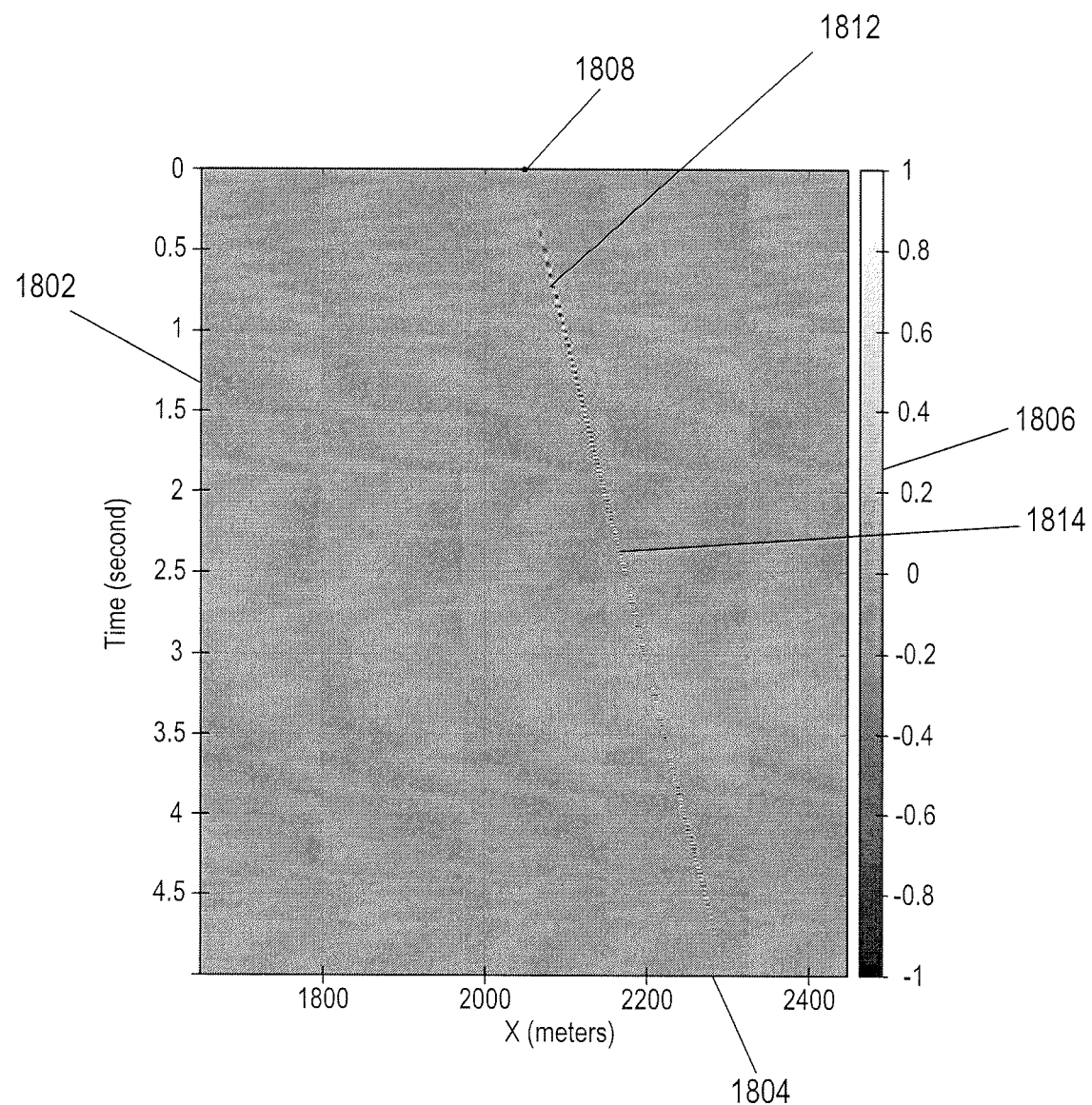

FIGS. 18A-18B show modelled source signatures of a marine vibrator at different survey vessel speeds. In FIGS. 18A-18B, vertical axis 1802 represents the duration for activating the marine vibrator (five seconds). Horizontal axis 1804 represents distance (or horizontal injection location). Each plot includes a gray scale normalized amplitude bar 1806 that represents the amplitude of the source signatures. A source signature is injected at the location 1808 in each of FIGS. 18A-18B at time sample $t_0=0$. For every time sample $t_l$ along the time axis 1802, the source signature is injected at a location given by l×speed$_{vessel}$±sampling rate, where l is the sampling index, speed$_{vessel}$ is the speed of the survey vessel, and sampling rate is the number of samples recorded per second. FIG. 18A shows the source signature represented by amplitude pattern 1810 for a stationary survey vessel (i.e., speed of zero meters per second). Because the survey vessel is not moving (i.e., speed$_{vessel}$=0), the source signature remains stationary at the location 1808 for the activation duration of five seconds. FIG. 18B shows the source signature represented by amplitude pattern 1812 for a sweep injection with the marine vibrator moving at 50 meters per second, which is an exaggerated vessel speed used here for illustration only. The amplitude pattern 1812 is laterally dislocated from the injection location 1808 with increasing time. Because the nominal location of the source signature typically falls between traces of seismic data, a shifting operation is performed using a discrete shifting operator (i.e., spatial sine function). As shown in FIG. 18B, the largest values of the spatially shifted sine function occur around the center 1814.

Figure 18C:
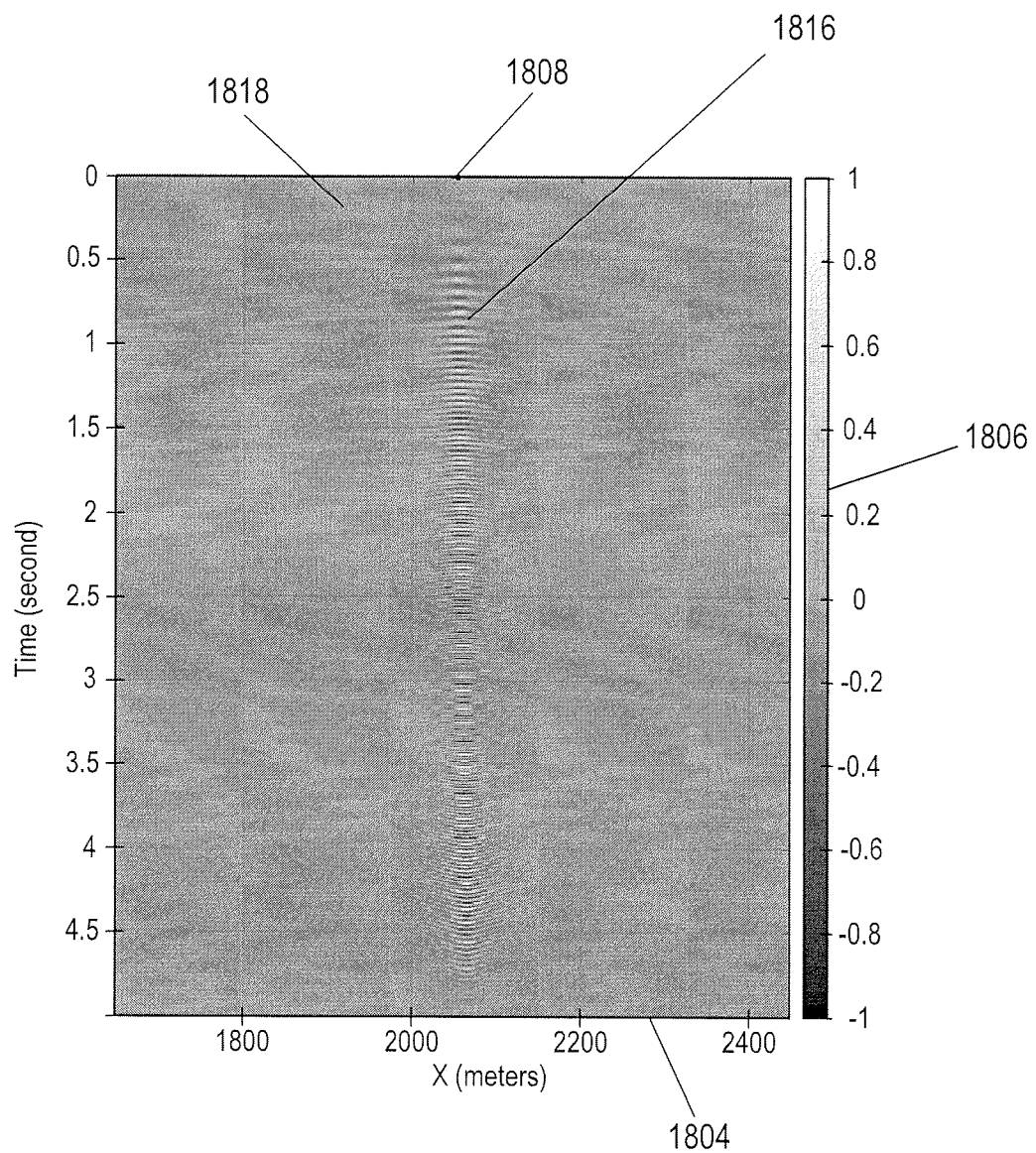
FIG. 18C shows a modelled gradient of a downgoing pressure wavefield at a virtual planar separation level.

FIG. 18C shows a modelled gradient of a downgoing pressure wavefield at the virtual planar separation level. In FIG. 18C, vertical axis 1812 represents the duration of the runtime of the direct downgoing wavefield. The gradient of the downgoing pressure wavefield $\nabla p+(\vec{x}, \tau; \vec{x}_{Sn}(\tau), 0)$ in Equation (18) is represented by amplitude pattern 1816 for a sweep injection by a marine vibrator at the injection location 1808 with the marine vibrator moving at a typical vessel speed of about 2.67 meters per second. The gradient of the pressure wavefield includes propagation, which is exhibited by the v-shaped pattern of the first arrival 1818. The gradient may be transformed from the s-t domain to the s-f domain by the Fourier transform represented in Equation (18) to obtain the gradient of the downgoing pressure wavefield in the s-f domain, $\nabla P^+(\vec{x}, \vec{x}_{Sn}, \omega)$.

For points in the virtual planar separation level, the following identify relates the vertical velocity wavefield to the gradient of the pressure wavefield in the s-f domain:

$$j\omega\rho V_z(\vec{x}, z^l, \vec{x}_{Sn}, \omega) = \nabla P(\vec{x}, z^l | \vec{x}_{Sn}, \omega) \cdot \vec{n} \quad (20)$$

Substitution of the identity of Equation (20) into the gradient of the downgoing pressure wavefield in Equation (18) gives the direct incident downgoing vertical velocity wavefield in the s-f domain:

$$V^+_{z,Inc}(\vec{x}, z^l | \vec{x}_{Sn}, \omega) = \frac{1}{2j\omega\rho} \quad (21a)$$

$$\int_{-\infty}^{\infty} dt e^{-j\omega t} \int_{-\infty}^{\infty} d\tau 2\nabla p^+(\vec{x}, z^l, \tau; \vec{x}_{Sn}(\tau), 0) \frac{1}{2\pi} \int_{-\infty}^{\infty} d\omega e^{j\omega(-\tau+t)}$$

The direct incident downgoing vertical velocity wavefield of Equation (21a) may be approximated by $$V_{z,Inc}^{+}(\vec{x}, z^I | \vec{x}_{Sn}, \omega) = \qquad (21b)$$

$$\frac{1}{2j\omega\rho\pi} \sum_{t=0}^{T} \sum_{\tau=0}^{T} \sum_{\omega=0}^{\Omega} e^{-j\omega t} \nabla p^{+}(\vec{x}, z^I, \tau; \vec{x}_{Sn}(\tau), 0) e^{j\omega(-\tau+t)} \Delta t \Delta \tau \Delta \omega$$

where $\Omega$ is the maximum frequency of the frequency domain;

$\Delta t$ and $\Delta \tau$ are time sample spacings in the time domain; and $\Delta \omega$ is frequency spacing in the frequency domain.

Computing the Subsurface Reflectivity Wavefield Using Plane Wave Spectral Division For a flat free surface approximation of the free surface and repeatable marine vibrators (i.e., identical marine vibrators at the same depth), the direct incident downgoing vertical velocity wavefield is translation invariant with respect to the horizontal coordinates of the virtual planar separation level. In other words, the general location $\vec{x}$ and the coordinates of a vibrational source may be translated within the virtual planar separation level by $\vec{\chi}_R - \vec{x}$ without changing the value of the direct incident downgoing vertical velocity wavefield as follows:

$$V_{z,Inc}^{+}(\vec{x}_S, z^I, \vec{x}, \omega) \equiv V_{z,Inc}^{+}(\vec{x}, z^I | \vec{\chi}_S, z_S, \omega) =$$
$$V_{z,Inc}^{+}(\vec{\chi}_R, z^I | \vec{\chi}_S + \vec{\chi}_R - \vec{x}, z_S, \omega) \qquad (22)$$

Substituting the translated direct incident velocity wavefield of Equation (22) into Equation (2) equates the upgoing pressure wavefield with the subsurface reflectivity wavefield convolved with the direct incident downgoing vertical velocity wavefield:

$$P^{-}(\vec{x}_R, \vec{x}_S, \omega) = \qquad (23)$$
$$-2i\omega\rho \int_{-\infty}^{\infty} P^{-+}(\vec{x}_R | \vec{X}, z^I, \omega) V_{z,Inc}^{+}(\vec{X}_R, z^I | \vec{X}_S + \vec{X}_R - \vec{X}, z_S, \omega) d_{\vec{X}}$$

Applying Parseval's identity, Equation (23) may be rewritten as $$P^{-}(\vec{x}_R, \vec{x}_S, \omega) = \qquad (24)$$
$$-\frac{2j\omega\rho}{(2\pi)^2} \int_{-\infty}^{\infty} P^{-+}(\vec{x}_R | \vec{\kappa}, \omega) V_{z,Inc}^{+}(\vec{X}_R, z^I | \vec{\kappa}, z_S, \omega) \exp[j\vec{\kappa}(\vec{X}_S + \vec{X}_R)] d_{\vec{\kappa}}$$

where $\vec{\kappa}$ is a wavevector that lies in the virtual planar separation level.

Applying a Fourier transform from the space domain to the wavenumber domain with respect to $\vec{\chi}_S$ and changing the order of integration gives $$P^{-}(\vec{x}_R, \vec{\kappa}_S, \omega) = -\frac{2j\omega\rho}{(2\pi)^2} \int_{-\infty}^{\infty} \{A \times B\} d\vec{\kappa} \qquad (25)$$

where $A = P^{-+}(\vec{x}_R | \vec{\kappa}, z^I, \omega) V_{z,Inc}^{+}(\vec{x}_R, z^I | \vec{\kappa}, z_S, \omega) \exp[j\vec{\kappa} \vec{x}_R];$ $B = \int_{-\infty}^{\infty} d\vec{\chi}_S \exp[j\vec{\chi}_S (\vec{\kappa} - \vec{\kappa}_S)];$ and $\vec{\kappa}_S$ is the marine vibrator wavevector that lies in the virtual planar separation level.

In Equation (25), the integral over the exponential is a delta function:

$$\delta(\vec{\kappa} - \vec{\kappa}_S) = \frac{1}{(2\pi)^2} \int_{-\infty}^{\infty} d\vec{\chi}_S \exp[j\vec{\chi}_S (\vec{\kappa} - \vec{\kappa}_S)] \qquad (26)$$

By the delta function in Equation (26), Equation (25) reduces to $$P^{-}(\vec{x}_R, \vec{\kappa}_S, \omega) = -2j\omega\rho P^{-+}(\vec{x}_R, \vec{\kappa}_S, z^I, \omega)$$
$$V_{z,Inc}^{+}(\vec{x}_R, z^I | \vec{\kappa}_S, z_S, \omega) \exp[k \vec{\kappa}_S \vec{x}_R] \qquad (27)$$

The subsurface reflectivity wavefield may then be obtained by spectral division (i.e., deconvolution) of the upgoing pressure wavefield by the direct incident downgoing vertical velocity wavefield:

$$P^{-+}(\vec{x}_R | \vec{\kappa}_S, z^I, \omega) = \frac{-1}{2j\omega\rho} \frac{\exp[-j\vec{\kappa}_S \vec{x}_R] P^{-}(\vec{x}_R | \vec{\kappa}_S, z_S, \omega)}{V_{z,Inc}^{+}(\vec{X}_R, z^I | \vec{\kappa}, z_S, \omega)} \qquad (28)$$

The exponential $\exp[-j \vec{\kappa}_S \vec{x}_R]$ accounts for shifting the result of receiver spectral division $(P^{-}(\vec{x}_R | \vec{\kappa}_S, z_S, \omega)/V_{Inc}^{+}(\vec{x}_R, z^I | \vec{\kappa}_S, z_S, \omega))$ to a correct receiver location.

Equation (28) represents deconvolution of the upgoing pressure wavefield by the direct incident downgoing vertical velocity wavefield. The subsurface reflectivity wavefield $P^{-+}(\vec{x}_R | \vec{\kappa}_S, z^I, \omega)$ may be transformed to the space-time domain using an inverse fast or discrete Fourier transform to obtain a trace of upgoing pressure wavefield data, denoted by $p^{-+}(\vec{x}_R | \vec{\kappa}_S, z^I, t)$. The subsurface reflectivity wavefield trace, $p^{-+}(\vec{x}_R | \vec{\kappa}_S, z^I, t)$, is source-motion corrected, deghosted, and designatured.

Traces of the subsurface reflectivity wavefield in the space-time domain may be selected to form gathers of upgoing pressure wavefield data in different domains with source-motion correction and attenuated source ghosts and signatures. The gathers may be further processed, for example, according to steps 605-607 of FIG. 6 to obtain high-resolution images of the subterranean formation without Doppler shifting due to vibrational source motion and without contamination from source ghosts and source signatures by one or more computer processors.

The various implementations of methods and systems for correcting source motion effects in recorded seismic data are described above with reference to a vibrational source comprised of an array of marine vibrators may also be used to attenuate source motion effects in recorded seismic data produced by a moving impulsive source comprised of an array of airguns. For example, a continuous source wavefield may be produced by individually firing the airguns according to a randomized firing sequence as the impulsive source moves through the body of water, creating similar Doppler-related effects in the recorded seismic data as described above. Processes and systems described above may also be used to generate images of a subterranean formation from seismic data recorded in a marine survey of the subterranean formation using a moving impulsive source.

FIGS. 19-25 are example flow diagrams of computational operations that may be performed to execute source-motion correcting, deghosting, and designaturing of recorded seismic data. In the following description of FIGS. 19-25, the term "source" refers to a vibrational source or an impulsive source and the term "source element" refers to a marine vibrator or an airgun. Persons having skill in the art will understand that computer instructions may be devised to enable one or more processors to perform the computations described in the above paragraphs to implement the steps that are textually expressed in FIGS. 19-25.

Figure 19:
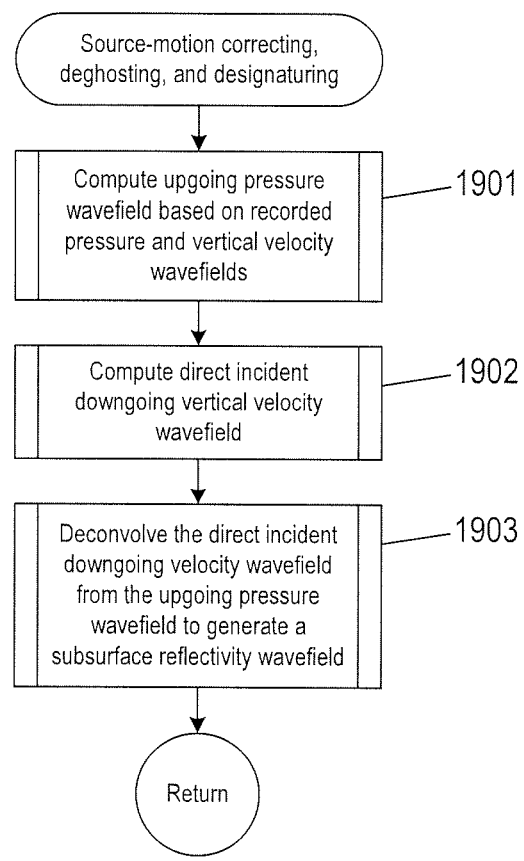
FIG. 19 is a flow diagram illustrating an example implementation of "source-motion correcting, deghosting, and designaturing of recorded seismic data" step referred to in FIG. 6.

FIG. 19 is a flow diagram illustrating an example implementation of the "source-motion correcting, deghosting, and designaturing of recorded seismic data" step referred to in block 603 of FIG. 6. In block 1901, a "compute upgoing pressure wavefield based on recorded pressure and vertical velocity wavefields" procedure is performed. In block 1902, a "compute direct incident downgoing vertical velocity wavefield" procedure is performed. In block 1903, a "deconvolve the direct incident downgoing vertical velocity wavefield from the upgoing pressure wavefield to generate a subsurface reflectivity wavefield" procedure is performed.

Figure 20:
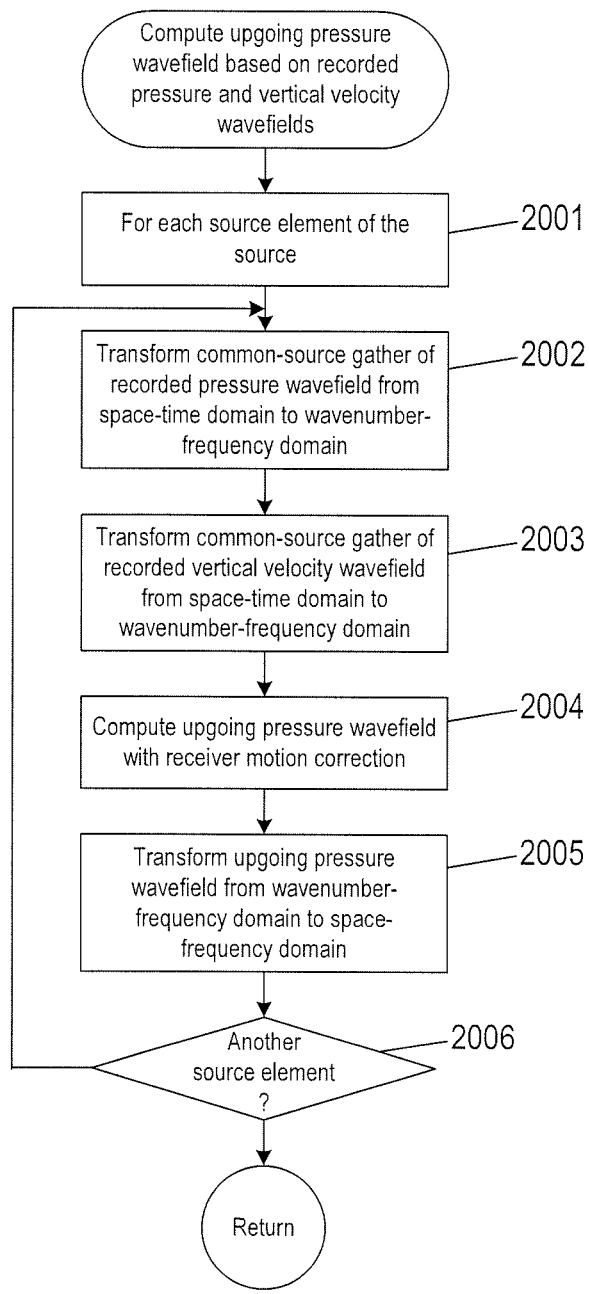
FIG. 20 is a flow diagram illustrating an example implementation of the "compute upgoing pressure wavefield based on recorded pressure and vertical velocity wavefields" step referred to in FIG. 19.

FIG. 20 is a flow diagram illustrating an example implementation of the "compute upgoing pressure wavefield based on recorded pressure and vertical velocity wavefields" step referred to in bock 1901 of FIG. 19. A loop beginning with block 2001 repeats the computational operations represented by blocks 2002-2005 for each source. In block 2002, a common-source gather of the recorded pressure wavefield is transformed from the s-t domain to the w-f domain as described above with reference to Equation (7). In block 2003, a common-source gather of the recorded vertical velocity wavefield is transformed from the s-t domain to the w-f domain as described above with reference to Equation (8). In block 2004, a receiver-motion corrected upgoing pressure wavefield in the w-f domain is computed as described above with reference to Equation (9). In block 2005, the upgoing pressure wavefield is transformed from the w-f domain to the s-f domain as described above with reference to Equation (10). In a decision block 2006, blocks 2002-2005 are repeated for another source.

Figure 21:
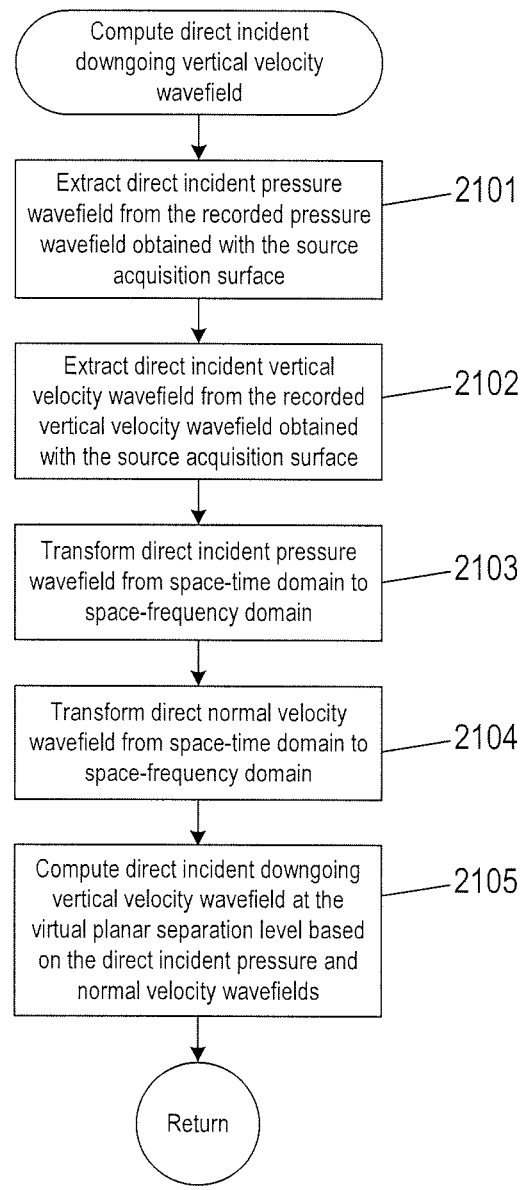
FIG. 21 is a flow diagram of the "compute direct incident downgoing vertical velocity wavefield" step referred to in FIG. 19.

FIG. 21 is a flow diagram of the "compute direct incident downgoing vertical velocity wavefield" step referred to in block 1902 of FIG. 19. In block 2101, the direct incident pressure wavefield is extracted from the recorded pressure wavefield as described above with reference to FIG. 13A. In block 2102, the direct incident normal velocity wavefield is extracted from the recorded vertical velocity wavefield as described above with reference FIG. 13A. In block 2103, the direct incident pressure wavefield is transformed from the s-t domain to the s-f domain. In block 2104, the direct incident normal velocity wavefield is transformed from the s-t domain to the s-f domain. In block 2105, the direct incident downgoing vertical velocity wavefield is computed based on the direct incident pressure wavefield and the direct incident normal velocity wavefield as described above with reference to Equation (12).

Figure 22:
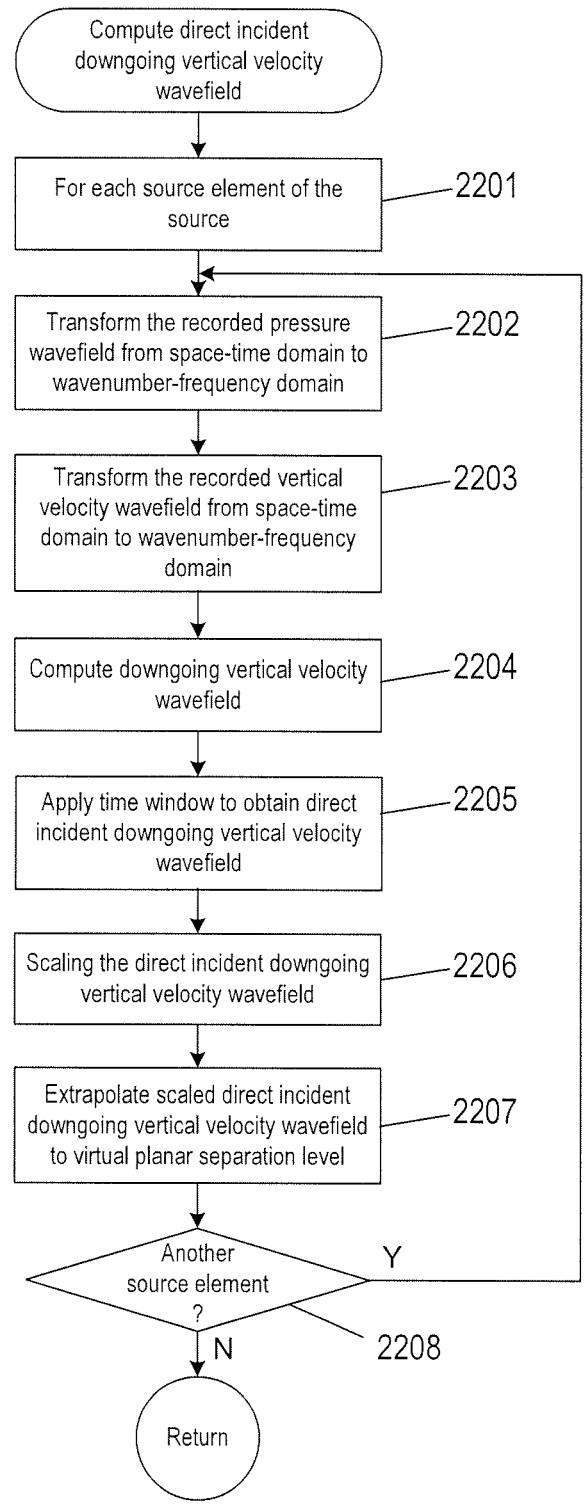
FIG. 22 is a flow diagram of the "compute direct incident downgoing vertical velocity wavefield" step referred to in FIG. 19.

FIG. 22 is a flow diagram of the "compute direct incident downgoing vertical velocity wavefield" step referred to in block 1902 of FIG. 19. A loop beginning with block 2201 repeats the computational operations represented by blocks 2202-2207 for each source. In block 2202, the recorded pressure wavefield is transformed from the s-t domain to the w-f domain as described above with reference to Equation (14). In block 2203, the recorded vertical velocity wavefield is transformed from the s-t domain to the w-f domain as described above with reference to Equation (15). In block 2204, the downgoing vertical velocity wavefield is computed as described above with reference to Equation (16). In block 2205, a time window is applied to the downgoing vertical velocity wavefield to obtain the direct incident downgoing vertical velocity wavefield. In block 2206, the direct incident downgoing vertical velocity wavefield is scaled. In block 2207, the direct incident downgoing vertical velocity wavefield is extrapolated to the virtual planar separation level according to Equation (17). In a decision block 2209, blocks 2202-2207 are repeated for another source.

Figure 23:
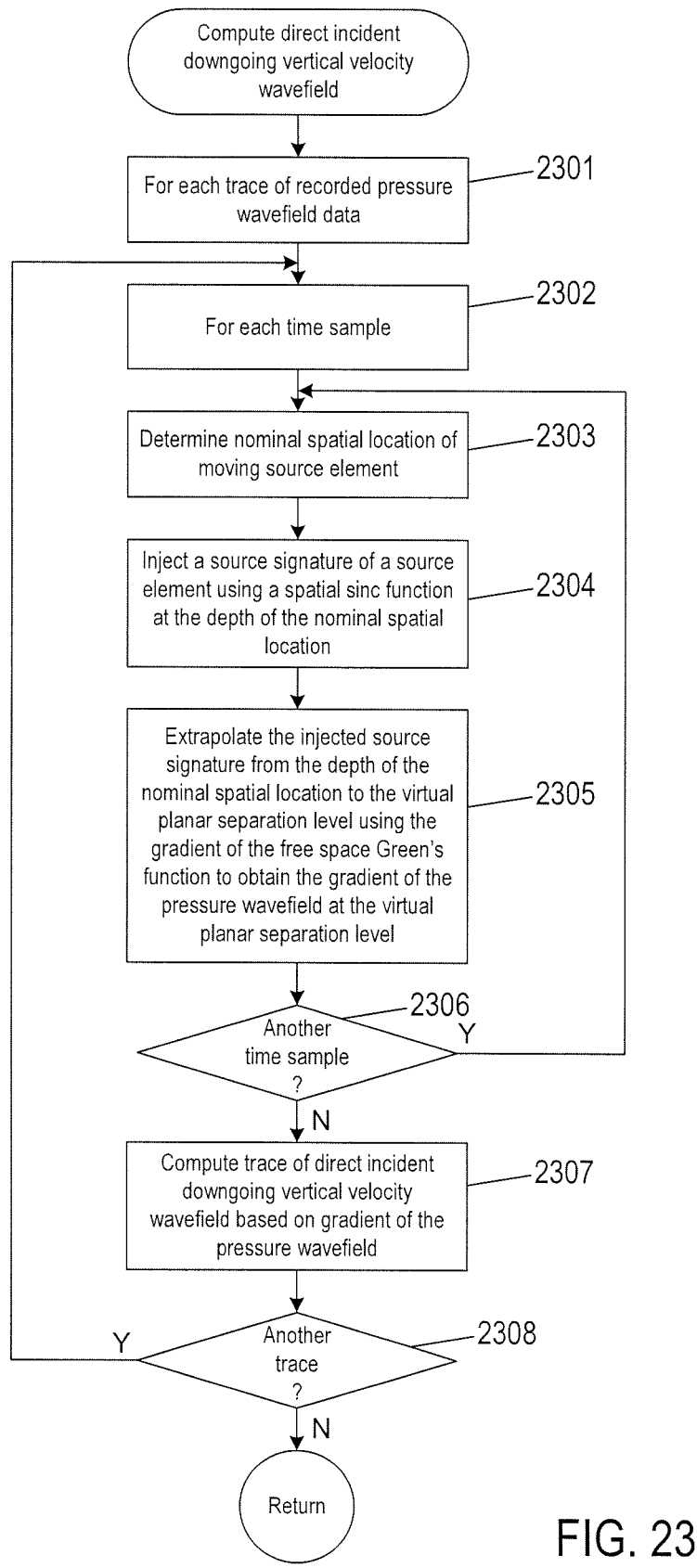
FIG. 23 is a flow diagram of the "compute direct incident downgoing vertical velocity wavefield" step referred to in FIG. 19.

FIG. 23 is a flow diagram of the "compute direct incident vertical downgoing velocity wavefield" step referred to in block 1902 of FIG. 19. A loop beginning with block 2301 repeats the computational operations represented by blocks 2302-2308 for each receiver location of the direct incident downgoing vertical velocity wavefield. A loop beginning with block 2302 repeats the computational operations represented by blocks 2303-2306 for each time sample of a source signature. In block 2303, the nominal spatial location of the source elements of the moving source associated with the trace is determined. In block 2304, a source signature sample value of the source is injected using a spatial sine function at the depth of the nominal spatial location. In block 2305, the injected source signature sample value is extrapolated from the depth of the nominal spatial location and from the corresponding depth of a source ghost to the virtual planar separation level using the gradient of the free space Green's function to obtain the gradient of the downgoing pressure wavefield at the virtual planar separation level. In decision block 2306, the computational operations represented by blocks 2303-2305 are repeated for another time sample of source signature. In block 2307, a trace of the directed incident downgoing velocity wavefield is computed based on the gradient of the downgoing pressure wavefield according to Equation (21b). In decision block 2308, the computational operations represented by blocks 2302-2307 are repeated for another receiver location of the direct incident downgoing vertical velocity wavefield.

Figure 24:
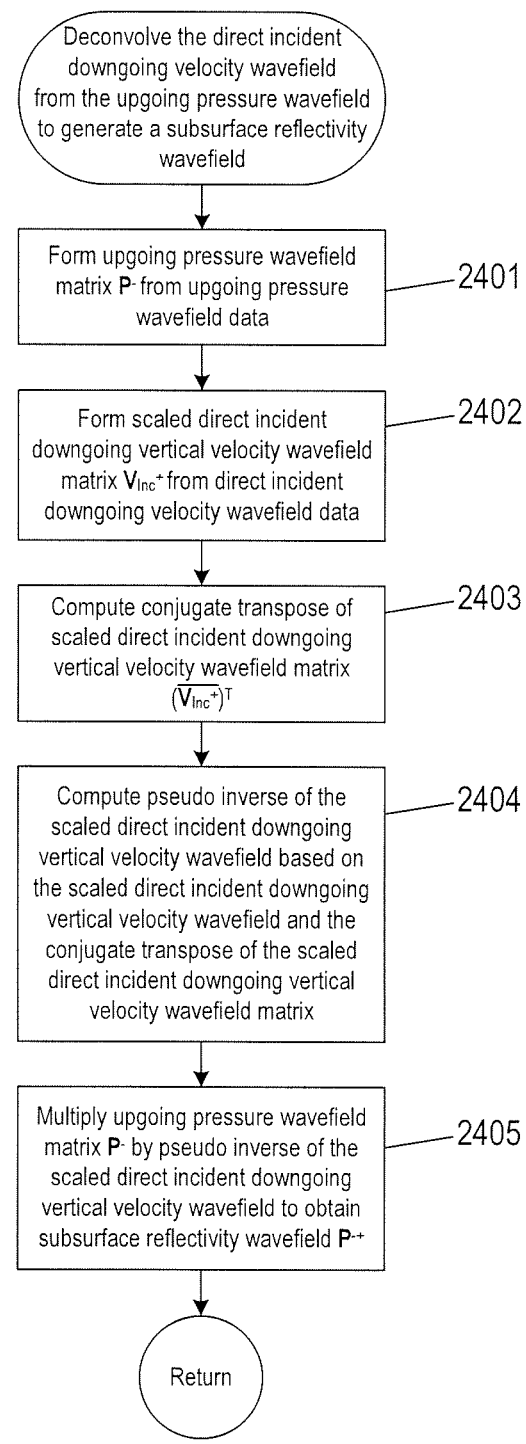
FIG. 24 is a flow diagram of the "deconvolve the direct incident downgoing velocity wavefield from the upgoing pressure wavefield to generate a subsurface reflectivity wavefield" step referred to in FIG. 19.

FIG. 24 is a flow diagram of the "deconvolving the upgoing pressure wavefield by the direct incident downgoing vertical velocity wavefield to generate a subsurface reflectivity wavefield" step referred to in block 1903 of FIG. 19. In block 2401, an upgoing pressure wavefield matrix is formed from the upgoing pressure wavefields computed for each receiver in block 1901 of FIG. 19. In block 2402, a scaled directed incident downing velocity wavefield matrix is formed from the direct incident downgoing vertical velocity wavefields computed for each receiver in block 1902 of FIG. 19. In block 2403, a conjugate transpose of the scaled direct incident downing velocity wavefield matrix is computed as described above with reference to Equation (6). In block 2404, a pseudo inverse of the scaled directed incident downgoing vertical velocity wavefield matrix is computed based on the scaled direct incident downgoing vertical velocity wavefield and the conjugate transpose of the scaled direct incident downing velocity wavefield matrix as described above with reference to Equation (6). In block 2405, the upgoing pressure wavefield matrix is multiplied by the pseudo inverse of the scaled directed incident downgoing velocity wavefield matrix to obtain the subsurface reflectivity wavefield as described above with reference to Equation (6).

Figure 25:
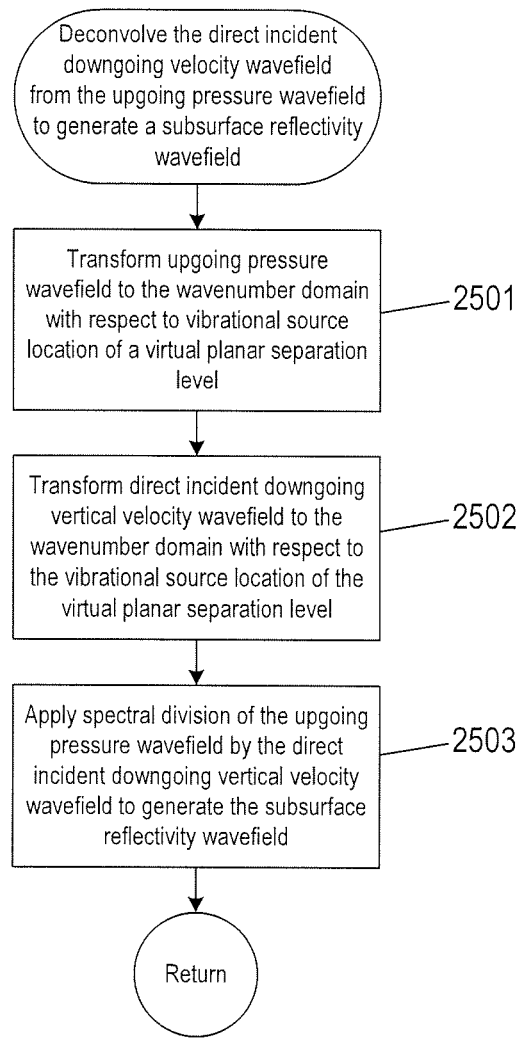
FIG. 25 is a flow diagram of the "deconvolve the direct incident downgoing velocity wavefield from the upgoing pressure wavefield to generate a subsurface reflectivity wavefield" step referred to in FIG. 19.

FIG. 25 is a flow diagram of the "deconvolving the upgoing pressure wavefield by the direct incident downgoing vertical velocity wavefield to generate a subsurface reflectivity wavefield" step referred to in block 1903 of FIG. 19. In block 2501, the upgoing pressure wavefield is transformed from the space domain to the wavenumber domain with respect to the coordinates of the vibrational source in the virtual planar separation level. In block 2502, the direct incident downgoing vertical velocity wavefield is transformed from the space domain to the wavenumber domain with respect to the location of the vibrational source in the virtual planar separation level. In block 2503, spectral division of the upgoing pressure wavefield by the direct incident downgoing vertical velocity wavefield is applied to generate the subsurface reflectivity wavefield.

Figure 26:
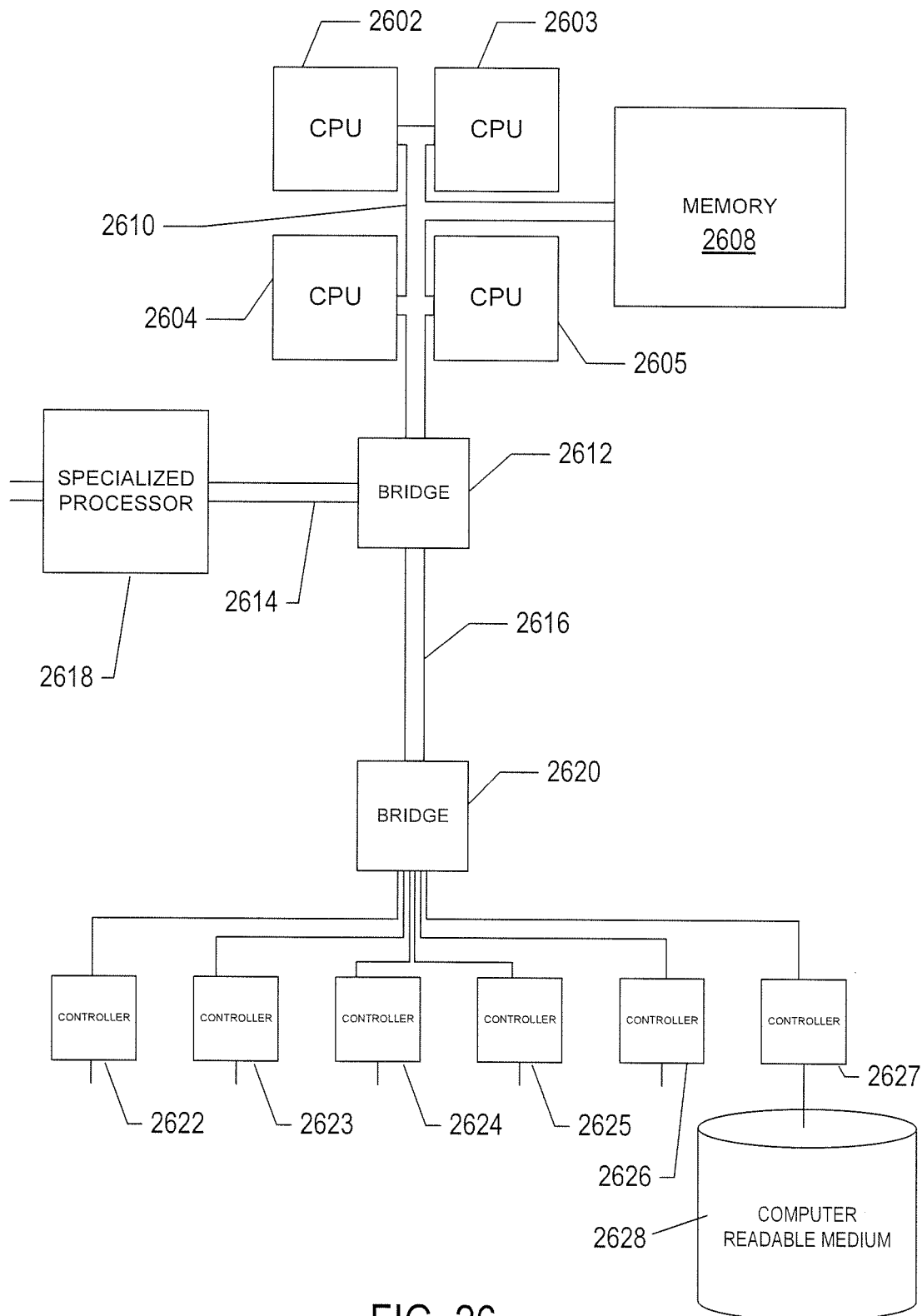
FIG. 26 shows an example computer system that may be used to execute an efficient process for generating an image of subterranean formation according to methods described herein and therefore represents a geophysical-analysis data-processing system.

FIG. 26 shows an example computer system that may be used to execute an efficient process according to the processes described herein for generating an image of subterranean formation and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 2602-2605, one or more electronic memories 2608 interconnected with the CPUs by a CPU/memory-subsystem bus 2610 or multiple busses, a first bridge 2612 that interconnects the CPU/memory-subsystem bus 2610 with additional busses 2614 and 2616, or other types of high-speed interconnection media, including multiple, high-speed serial interconnects. The busses or serial interconnections, in turn, may connect the CPUs and memory with specialized processors, such as a graphics processor 2618, and with one or more additional bridges 2620, which are interconnected with high-speed serial links or with multiple controllers 2622-2627, such as controller 2627, that provide access to various different types of computer-readable media, such as one or more of computer-readable medium 2628, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2628 may be any fixed or removable data-storage device, including electronic memory, optical or magnetic disk drive, a magnetic tape drive, USB drive, flash memory and other such data-storage device. The computer-readable medium 2628 can be used to store machine-readable instructions that encode the computational methods described above and can be used to store encoded data, during store operations, and from which encoded data can be retrieved, during read operations, by computer systems, data-storage systems, and peripheral devices.

The processes and systems disclosed herein may be used to manufacture a geophysical data product indicative of certain properties of a subterranean formation. A geophysical data product may be manufactured by using the processes and systems described herein to generate geophysical data and storing the geophysical data in a computer-readable medium 2628. The geophysical data may be pressure data, vertical velocity data, upgoing and downgoing wavefields, deblended wavefield with attenuated source ghost and source signature, and any image of a subterranean formation computed using the processes and systems described herein. The geophysical data product may be produced offshore (i.e., by equipment on the survey vessel 102) or onshore (i.e., at a computing facility on land), or both.

APPENDIX

This APPENDIX presents a derivation of Equation (2). The wave equation for a vibrational source moving at a constant speed in an acoustic medium is given by:

$$\nabla^2 p(\vec{x}_R, \vec{x}_S, t) - \frac{1}{c^2} \frac{\partial^2 p(\vec{x}_R, \vec{x}_S, t)}{\partial t^2} = s(t)\delta(x_S - vt)\delta(y_S)\delta(z_S) \quad (1A)$$

where $\vec{x}_R = (x_R, y_R, z_R)$ is the coordinate location of the receiver;
$\vec{x}_S = (x_S, y_S, z_S)$ is the coordinate location of the source;
$p(\vec{x}_R, t)$ is the pressure wavefield measured at the receiver location $\vec{x}_R$;
c is the speed of sound in the body of water;
t is time;
v is the speed of the moving vibrational source; and
s(t) is the source signature of the vibrational source at time t.

For a stationary source, an equivalent wave equation is obtained by setting v=0. Because vibrational source motion is recorded in the source signature, the vibrational source may either be moving or stationary in the following derivation of Equation (2).

Figure 27B:
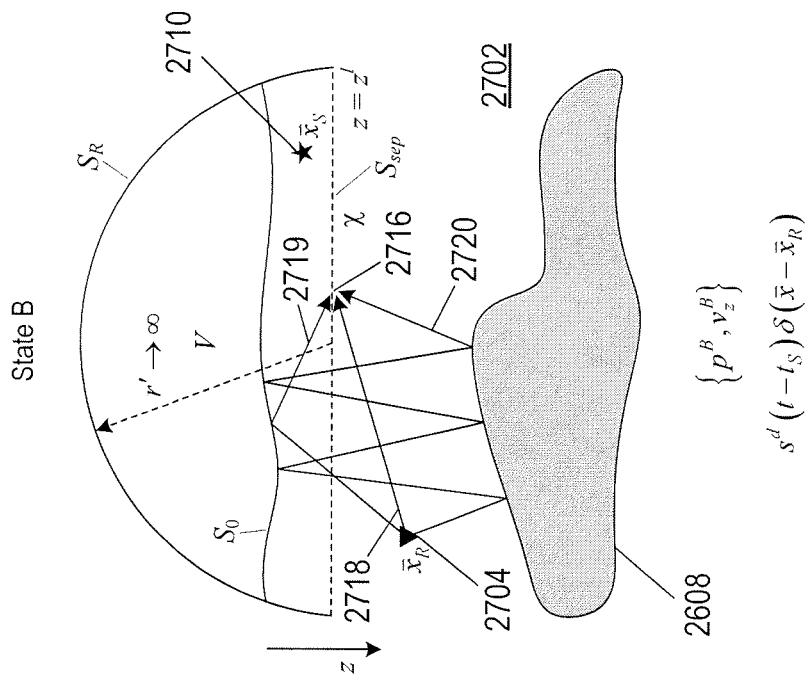
FIGS. 27A-27B show side-elevation views of two states of an acoustic model identified as State A and State B.
Figure 27A:
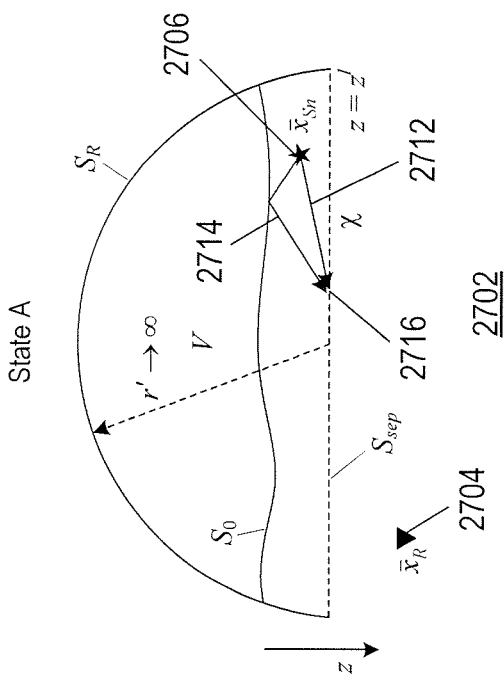

FIGS. 27A and 27B show side-elevation views of two states identified as State A and State B, respectively, of an acoustic model. States A and B represent states in an acoustic model employing Rayleigh's reciprocity theorem. (See Fokkema, J. T. and P. M. van den Berg, *Seismic applications of acoustic reciprocity*, pp. 95-105, Elsevier Science Publication Co. Inc., 1993.) The hemispherical volume is defined by a semicircular boundary denoted by $S_R$ and a virtual planar separation level denoted by $S_{sep}$ that extend in the xy-plane. FIGS. 27A-27B also show a vertical plane cross-sectional view of a three-dimensional hemispherical volume denoted by V with a radius r'. The hemispherical volume encloses a portion of a body of water 2702 with a free surface denoted by $S_0$. Points along the virtual planar separation level $S_{sep}$ are denoted by $(\vec{x}, z')$, where $\vec{x} = (x, y)$ and $z'$ is the depth of the virtual planar separation level below the free surface $S_0$. A receiver 2704 is located in the body of water 2702 outside hemispherical volume at coordinate location $\vec{x}_R$.

In FIG. 27A, the pressure and vertical velocity wavefields are denoted by $p^A$ and $v_z^A$, respectively, where the superscript "A" denotes the State A. An i-th marine vibrator 2706 of a vibrational source is located within the hemispherical volume at coordinate location $\vec{x}_{Sn}$. The source signature of the n-th marine vibrator is $s_n(t-t_S)\delta(\vec{x} - \vec{x}_{Sn}(t))$, where t is time, $t_S$ is the time when the marine vibrator is activated, $\vec{x}_{Sn}(t)$ is the coordinate location of the marine vibrator at time t, and $\vec{x}$ is a general coordinate location. Ray paths 2712 and 2714 represent propagation of different portions of a source wavefield generated by the marine vibrator 2706. Ray path 2712 represents a portion of the source wavefield that travels directly to a point 2716 on the virtual planar separation level $S_{sep}$. Bent ray path 2714 represents a portion of the source wavefield reflected from the free surface $S_0$ to the point 2716.

In FIG. 27B, shaded region 2708 represents a subterranean formation located outside the hemispherical volume. A vibrational source 2710 is located within the hemispherical volume at coordinate location $\vec{x}$. The pressure and vertical velocity wavefields are denoted by $p^B$ and $v_z^B$, respectively, where the superscript "B" denotes the State B. The source signature of a source wavefield generated by a monopole point source at the receiver 2704 is $s^d(t-t_S)\delta(\vec{x}-\vec{x}_R)$. Ray paths 2718-2720 represents propagation of different portions of a source wavefield generated at the receiver 2704. Ray path 2718 represents a portion of the source wavefield that travels directly to the point 2716. Ray path 2719 represents a portion of the source wavefield that is first reflected from the free surface $S_0$ before reaching the point 2716. Ray path 2720 represents a portion of the source wavefield that is reflected twice from the free surface and three times from the subterranean formation 2708 before reaching the point 2716.

The pressure and vertical velocity wavefields in the States A and B are related using Rayleigh's reciprocity theory in the time domain. Beginning with a vector operation of wavefields in the States A and B where all wavefields obey Equation (1A) with $p^A \nabla \tilde{p}^B - \tilde{p}^B \nabla p^A$ and applying Gauss' theorem:

$$\int_V [p^A(\vec{x}, t^A; \vec{x}_{Sn}(t^A), t_S^A)\delta(t^B - t_S^B)\delta(\vec{x} - \vec{x}_R) - \tilde{p}^B(\vec{x}, t^B; \vec{x}_R, t_S^B)s_n(t^A - t_S^A)\delta(\vec{x} - \vec{x}_{Sn}(t^A))]dV + \quad (2A)$$

$$\int_V \frac{1}{c^2}\left[p^A(\vec{x}, t^A; \vec{x}_{Sn}(t^A), t_S^A)\frac{\partial^2 \tilde{p}^B(\vec{x}, t^B; \vec{x}_R, t_S^B)}{\partial t^{B2}} - \tilde{p}^B(\vec{x}, t^B; \vec{x}_R, t_S^B)\frac{\partial^2 p^A(\vec{x}, t^A; \vec{x}_{Sn}(t^A), t_S^A)}{\partial t^{A2}}\right]dV =$$

$$\int_S [p^A(\vec{x}, t^A; \vec{x}_{Sn}(t^A), t_S^A)\nabla \tilde{p}^B(\vec{x}, t^B; \vec{x}_R, t_S^B) - \tilde{p}^B(\vec{x}, t^B; \vec{x}_R, t_S^B)\nabla p^A(\vec{x}, t^A; \vec{x}_{Sn}(t^A), t_S^A)] \cdot \vec{n}dS$$

where
S is the surface enclosing the hemispherical volume (i.e., $S=S_R+S_{sep}$);
$\vec{n}$ is a unit normal vector to the surface S;
$\tilde{p}^B$ is the time-reversed pressure wavefield in the State B;
$t^A$ is time in the State A;
$t_S^A$ is the time when the source is activated in the State A;
$t^B$ is time in the State B; and
$t_S^B$ is the time when the source is activated in the State B.

The pressure wavefield is time reversed in Equation (2A) because source-receiver reciprocity for time varying wavefields is different from stationary fields. The pressure wavefield in State B begins with time reversal. After applying source-receiver reciprocity as described below, the pressure wavefield in State B is reversed to propagate forward propagation in time. Using properties of the delta function:

$$-\tilde{p}^B(\vec{x}_{Sn}(t^A), t^B; \vec{x}_R, t_S^B)s_n(t^A - t_S^A) \times \quad (3A)$$

$$\int_V \frac{1}{c^2}\left[p^A(\vec{x}, t^A; \vec{x}_{Sn}(t^A), t_S^A)\frac{\partial^2 \tilde{p}^B(\vec{x}, t^B; \vec{x}_R, t_S^B)}{\partial t^{B2}} - \tilde{p}^B(\vec{x}, t^B; \vec{x}_R, t_S^B)\frac{\partial^2 p^A(\vec{x}, t^A; \vec{x}_{Sn}(t^A), t_S^A)}{\partial t^{A2}}\right]dV =$$

$$\int_S [p^A(\vec{x}, t^A; \vec{x}_{Sn}(t^A), t_S^A)\nabla \tilde{p}^B(\vec{x}, t^B; \vec{x}_R, t_S^B) - \tilde{p}^B(\vec{x}, t^B; \vec{x}_R, t_S^B)\nabla p^A(\vec{x}, t^A; \vec{x}_{Sn}(t^A), t_S^A)] \cdot \vec{n}dS$$

Sommerfeld's radiation condition reduces the surface integral on the right-hand side of Equation (3A) to a surface integral over the virtual planar separation level and expresses the wavefield on the virtual planar separation level upgoing and downgoing components. As shown in FIG. 27A, there are no upgoing wavefields in the State A. As a result, the first term of the surface integral of the Equation (3A) is zero. Applying source-receiver reciprocity in State B, shifting to forward time, and using the identity $$\tilde{p}^B(\vec{x}_{Sn}(t^A), t^B; \vec{x}_R, t_S^B) = p^B(\vec{x}_R, t^B - t_S^B; \vec{x}_{Sn}(t^A), 0)$$

reduces Equation (3A) to:

$$-p^B(\vec{x}_R, t^B - t_S^B; \vec{x}_{Sn}(t^A), 0)s_n(t^A - t_S^A) + \quad (4A)$$

$$\int_V \frac{1}{c^2}\left[p^A(\vec{x}, t^A; \vec{x}_{Sn}(t^A), t_S^A)\frac{\partial^2 p^B(\vec{x}_R, t^B - t_S^B; \vec{x}, 0)}{\partial t^{B2}} - p^B(\vec{x}, t^B - t_S^B; \vec{x}, 0)\frac{\partial^2 p^A(\vec{x}, t^A; \vec{x}_{Sn}(t^A), t_S^A)}{\partial t^{A2}}\right]dV =$$

$$-2\int_{S_{sep}} p^{B+}(\vec{x}_R, t^B - t_S^B; \vec{x}, 0)\nabla p^{A+}(\vec{x}, t^A; \vec{x}_{Sn}(t^A), t_S^A) - \cdot \vec{n}d\vec{x}$$

where
$p^{B+}(\vec{x}_R, t^B - t_S^B; \vec{x}, 0)$ is the downgoing pressure wavefield in State B; and
$p^{A+}(\vec{x}, t^A; \vec{x}_{Sn}(t^A), t_S^A)$ is the downgoing pressure wavefield in State A.

The volume integral in Equation (4A) vanishes as result of causality (See C. H. Chapman, *Fundamentals of Seismic Wave Propagation*, pp. 59-61, Cambridge University Press, 2004):

$$-p^B(\vec{x}_R, t^B - t_S^B; \vec{x}_{Sn}(t^A), 0) s_n(t^A - t_S^A) =$$
$$\int_{S_{sep}} -2p^{B+}(\vec{x}_R, t^B - t_S^B; \vec{x}, 0) \nabla p^{A+}(\vec{x}, t^A;$$
$$\vec{x}_{Sn}(t^A), t_S^A) \cdot \vec{n} \, d\vec{x} \quad (5A)$$

In order to represents time evolution of the combined states of Equation (4A), the following time substitutions are applied $$t = t^A + t^B - t_S^B$$

$$\tau = t^A$$

$$t_S^A = 0 \quad (6A)$$

Applying Rayleigh's reciprocity theorem to the pressure wavefield in State B interchanges the source of the source wavefield from the coordinate location of the receiver to the point on the virtual planar separation level.

Figure 28A:
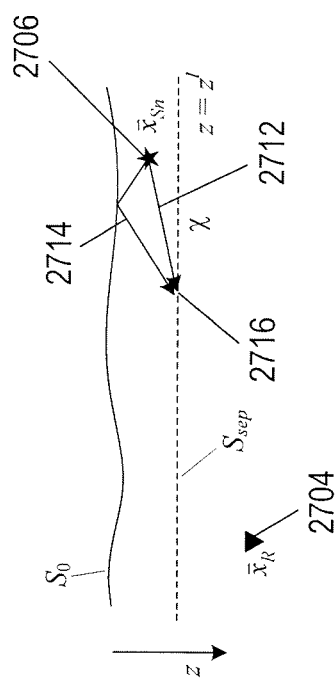
FIGS. 28A-28B show States A and B after applying Rayleigh's reciprocity theorem to the wavefields in State B.
Figure 28B:
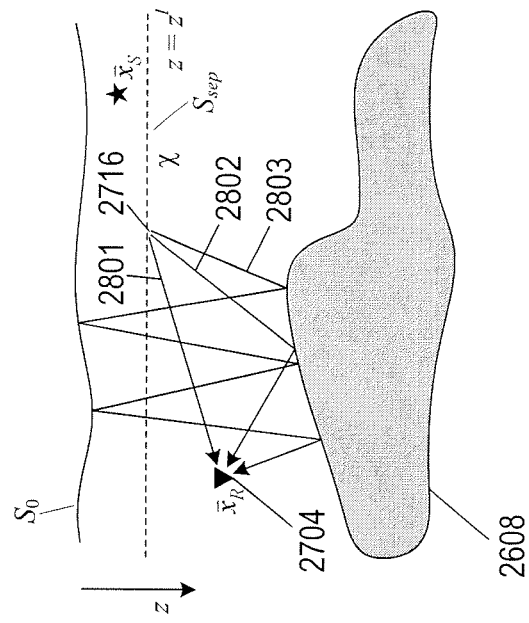

FIGS. 28A-28B show States A and B after applying Rayleigh's reciprocity theorem to the wavefields in State B. In FIG. 28A, ray paths 2712 and 2714 represents portions of a downgoing source wavefield that propagate downward to the point 2616 along the virtual planar separation level $S_{sep}$. In FIG. 28B, applying Rayleigh's reciprocity theorem interchanges the monopole source of the source wavefield from the coordinate location of the receiver, as shown in FIG. 27B, to the point 2716 on the virtual planar separation level $S_{sep}$. Ray paths 2801-2803 represents propagation of different portions of a source wavefield generated by a virtual monopole source at the point 2716. Ray path 2801 represents a portion of the source wavefield that travels directly to the receiver 2704. Ray path 2802 represents a portion of the source wavefield that is first reflected from the subterranean formation 2708 before reaching the receiver 2704. Ray path 2803 represents a portion of the source wavefield that is reflected twice from the free surface and three times from the subterranean formation 2708 before reaching the receiver 2704.

Substituting Equations (6A) into Equation (5A), followed by integrating over time $\tau$ from $-\infty$ to $\infty$, gives:

$$-\int_{-\infty}^{\infty} p^B(\vec{x}_R, t - \tau; \vec{x}_{Sn}(\tau), 0) s_n(\tau) d\tau = \quad (7A)$$
$$-\int_{-\infty}^{\infty} \int_{S_{sep}} -2 p^{B+}(\vec{x}_R, t - \tau; \vec{x}, 0) \nabla p^{A+}(\vec{x}, \tau; \vec{x}_{Sn}(\tau), 0) \cdot \vec{n} \, d\vec{x} \, d\tau$$

Taking the upgoing wavefields on the receiver side in State B gives:

$$-\int_{-\infty}^{\infty} p^{B-}(\vec{x}_R, t - \tau; \vec{x}_{Sn}(\tau), 0) s_n(\tau) d\tau = \quad (8A)$$
$$-\int_{-\infty}^{\infty} \int_{S_{sep}} -2 p^{B-+}(\vec{x}_R, t - \tau; \vec{x}, 0) \nabla p^{A+}(\vec{x}, \tau; \vec{x}_{Sn}(\tau), 0) \cdot \vec{n} \, d\vec{x} \, d\tau$$

where
$p^{B-}(\vec{x}_R, t-\tau; \vec{x}_{Sn}(\tau), 0)$ is the upgoing pressure wavefield in State B; and
$p^{B-+}(\vec{x}_R, t-\tau; \vec{x}, 0)$ is the receiver-side downgoing and source-side upgoing pressure wavefield in State B.

Applying a Fourier transform to both sides of Equation (8A) gives $$-\int_{-\infty}^{\infty} dt e^{-j\omega t} \int_{-\infty}^{\infty} p^{B-}(\vec{x}_R, t - \tau; \vec{x}_{Sn}(\tau), 0) s_n(\tau) d\tau = \quad (9A)$$

$$\int_{S_{sep}} \left[ \int_{-\infty}^{\infty} dt e^{-j\omega t} \int_{-\infty}^{\infty} d\tau 2 \nabla p^{A+}(\vec{x}, \tau; \vec{x}_{Sn}(\tau), 0) \frac{1}{2\pi} \int_{-\infty}^{\infty} d\omega e^{j\omega(-\tau+t)} \right] \times$$

$$P^{B-+}(\vec{x}_R, \omega; \vec{x}, 0) \cdot \vec{n} d\vec{x}$$

The integral expression $\int_{-\infty}^{\infty} dt e^{-j\omega t}$ on the left and right-hand sides of Equation (9A) is a Fourier transform operator from the time domain to the frequency domain of the measured upgoing data. Equation (9A) corresponds to Equation (18) above with the state designations A and B removed. The integral expression $$\frac{1}{2\pi} \int_{-\infty}^{\infty} d\omega e^{j\omega(-\tau+t)}$$

is a time-shifted delta function. Using the Identity $$j\omega \rho V_z = \nabla P \cdot \vec{n}$$

Equation (9A) reduces to $$p^{B-}(\vec{x}_R, \omega; \vec{x}_{Sn}) S_n(\omega) = \quad (10A)$$
$$-2j\omega\rho \int_{S_{sep}} V_{z,Inc}^{A+}(x, \omega; x_{Sn}) P^{B-+}(\vec{x}_R, \omega; \vec{x}, 0) d\vec{x}$$

where $$V_{z,Inc}^{A+}(x, \omega; x_{Sn}) =$$
$$\frac{1}{2j\omega\rho} \int_{-\infty}^{\infty} dt e^{-j\omega t} \int_{-\infty}^{\infty} d\tau 2 \nabla p^{A+}(\vec{x}, \tau; \vec{x}_{Sn}(\tau), 0) \frac{1}{2\pi} \int_{-\infty}^{\infty} d\omega e^{j\omega(-\tau+t)}$$

represents the direct incident downgoing vertical velocity wavefield in w-f domain in State A. This wavefield may be obtained by applying a Fourier transform to the wavefield measured by near field velocity sensors just below the sources, or it may be modeled using the above expression. Equation (2) above is obtained by dropping the state labels A and B in Equation (10A).

Figure 29A:
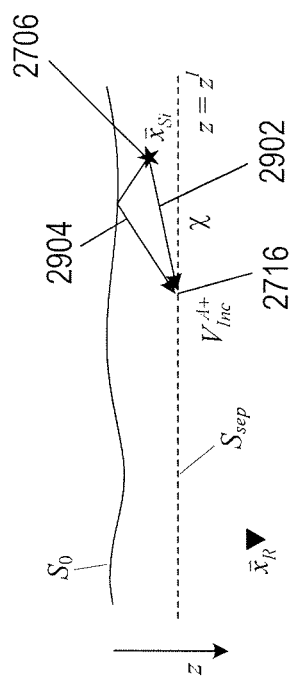
FIGS. 29A-29B show ray paths of wavefields in the States A and B.
Figure 29B:
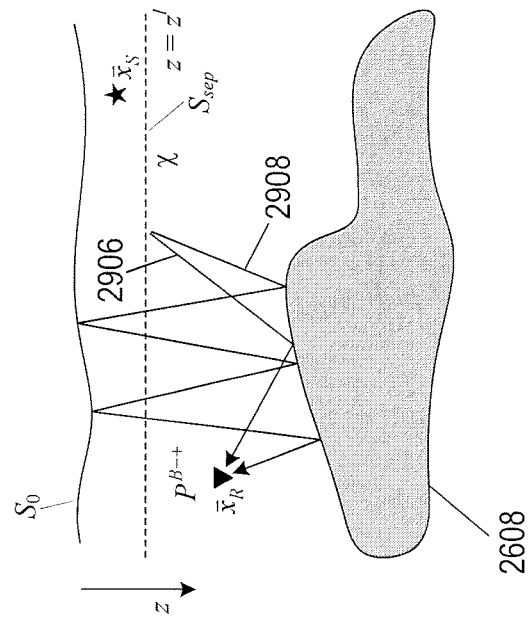

FIGS. 29A-29B show ray paths of wavefields in States A and B of Equation (10A). In FIG. 29A, ray paths 2902 and 2904 represent portions of a direct incident downgoing vertical velocity wavefield that propagate downward from marine vibrator 2706 to the point 2716 along the virtual planar separation level $S_{sep}$. Ray path 2902 represents a portion of the direct incident downgoing vertical velocity wavefield that travels directly to the point 2716. Bent ray path 2904 represents a portion of the direct incident downgoing vertical velocity wavefield reflected from the free surface $S_0$ to the point 2716. In FIG. 29B, ray paths 2906 and

2908 represent propagation of different portions of the subsurface reflectivity wavefield reflected from the subterranean formation 2708. Ray path 2906 represents a portion of the subsurface reflectivity wavefield reflected from the subterranean formation 2708 before reaching the receiver 2704. Ray path 2908 represents a portion of the subsurface reflectivity wavefield reflected twice from the free surface and three times from the subterranean formation 2708 before reaching the receiver 2704.

Equation (10A) holds for each marine vibrator of the vibrational source, and may also be given for a source array comprising N source elements, as follows:

$$\sum_{i=1}^{N} P^{-}(\vec{x}_R, \omega; \vec{x}_{Si}) S_n(\omega) = \tag{11A}$$
$$2j\omega\rho \int_{S_{sep}} \sum_{i=1}^{N} V_{z,Inc}^{+}(x, \omega; x_{Si}) P^{-+}(\vec{x}_R, \omega; \vec{x}, 0) d\vec{x}$$

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a computer-implemented process for generating an image of a subterranean formation using marine seismic data recorded during a survey in which a moving vibrational source has been activated in a body of water above the subterranean formation and reflected wavefields from the subterranean formation have been recorded as pressure data and vertical velocity data by receivers located in the body of water, the specific improvement comprising:
    computing an up-going pressure wavefield from the recorded pressure data and recorded vertical velocity data;
    computing a direct incident downgoing vertical velocity wavefield that represents source motion effects, source signature, and source ghost of the moving vibrational source;
    deconvolving the upgoing pressure wavefield by the direct incident downgoing vertical velocity wavefield to generate a subsurface reflectivity wavefield; and
    generating an image of the subterranean formation based on the subsurface reflectivity wavefield, thereby enhancing resolution of the image by attenuating the source-motion effects, source signature, and source ghost of the moving vibration source.

2. The process of claim 1 wherein computing the up-going pressure wavefield comprises:
    for each source,
        transforming the recorded pressure data from the space-time domain to the wavenumber-frequency domain;
        transforming the recorded vertical velocity data from the space-time domain to the wavenumber-frequency domain;
        computing the upgoing pressure wavefield based on the pressure data and the vertical velocity data in the wavenumber-frequency domain; and
        transforming the upgoing pressure wavefield from the wavenumber-frequency domain to the space-frequency domain.

3. The process of claim 1 wherein computing the direct incident downgoing vertical velocity wavefield comprises:
    transforming the recorded pressure data from the space-time domain to the wavenumber-frequency domain;
    transforming the recorded vertical velocity data from the space-time domain to the wavenumber-frequency domain;
    computing a downgoing vertical velocity wavefield based on the pressure data and the vertical velocity data;
    applying a time window to the downgoing vertical velocity wavefield to obtain direct incident downgoing vertical velocity wavefield;
    scaling the direct incident downgoing vertical velocity wavefield; and
    extrapolating the direct incident downgoing vertical velocity wavefield from receiver depth to depth of a virtual planar separation level located between the receiver depth and depth of the moving vibrational source.

4. The process of claim 1 wherein computing the direct incident downgoing vertical velocity wavefield comprises:
    extracting a direct incident pressure wavefield from pressure data recorded by pressure sensors of a source acquisition surface located within the near field of the moving vibrational source;
    extracting a direct incident vertical velocity wavefield from vertical velocity data recorded by particle motion sensors of the source acquisition surface;
    transforming the direct incident pressure wavefield from the space-time domain to the wavenumber-frequency domain;
    transforming the direct incident vertical velocity wavefield from the space-time domain to the wavenumber-frequency domain; and
    computing the direct incident downgoing vertical velocity wavefield at the depth of a virtual planar separation level based on the direct incident pressure wavefield and the direct incident vertical velocity wavefield.

5. The process of claim 1 wherein computing the direct incident downgoing vertical velocity wavefield comprises:
    for each receiver location,
        for each time sample of a source signature,
            injecting a source signature sample value of a source using a spatial sine function at the depth of the nominal spatial location, and
            extrapolating the injected source signature sample value from the depth of the nominal spatial location and from a depth of a source ghost location to the virtual planar separation level using a gradient of a free space Green's function to obtain a gradient of the pressure wavefield at the virtual planar separation level; and
        computing a trace of the direct incident downgoing vertical velocity wavefield based on the gradient of the pressure wavefield.

6. The process of claim 1 wherein deconvolving the upgoing pressure wavefield by the direct incident downgoing vertical velocity wavefield to generate the subsurface reflectivity wavefield comprises:
    forming an upgoing pressure wavefield matrix from the upgoing pressure wavefields computed for each receiver;

forming a scaled directed incident downing velocity wavefield matrix from the direct incident downgoing vertical velocity wavefields computed for each receiver;

computing a conjugate transpose of the scaled direct incident downing velocity wavefield matrix;

computing a pseudo inverse of the scaled directed incident downgoing velocity wavefield matrix based on the scaled direct incident downgoing vertical velocity wavefield and conjugate transpose of the scaled direct incident downing velocity wavefield matrix; and multiplying the upgoing pressure wavefield matrix by the pseudo inverse of the scaled directed incident downgoing velocity wavefield matrix to generate the subsurface reflectivity wavefield.

7. The process of claim 1 wherein deconvolving the upgoing pressure wavefield by the direct incident downgoing vertical velocity wavefield to generate the subsurface reflectivity wavefield comprises:

transforming the upgoing pressure wavefield from the space domain to the wavenumber domain with respect to horizontal coordinates of the vibrational source in a virtual planar separation level;

transforming the direct incident downgoing vertical velocity wavefield from the space domain to the wavenumber domain with respect to the horizontal coordinates; and applying spectral division of the upgoing pressure wavefield by the direct incident downgoing vertical velocity wavefield to generate the subsurface reflectivity wavefield.

8. A computer system for computing an image of a subterranean formation, the system comprising:

one or more processors;

one or more data-storage devices; and machine-readable instructions stored in the one or more data-storage devices that when executed using the one or more processors controls the system to perform the operations comprising:

computing an up-going pressure wavefield from pressure data and vertical velocity data recorded in a marine survey of the subterranean formed performed using a moving vibrational source;

computing a direct incident downgoing vertical velocity wavefield that represents source motion effects, source signature, and source ghost of the moving vibrational source;

computing a subsurface reflectivity based on the upgoing pressure wavefield and the direct incident downgoing vertical velocity wavefield; and generating an image of the subterranean formation based on the subsurface reflectivity wavefield.

9. The computer system of claim 8 wherein computing the up-going pressure wavefield comprises:

for each source, transforming the recorded pressure data from the space-time domain to the wavenumber-frequency domain;

transforming the recorded vertical velocity data from the space-time domain to the wavenumber-frequency domain;

computing the upgoing pressure wavefield based on the pressure data and the vertical velocity data in the wavenumber-frequency domain; and transforming the upgoing pressure wavefield from the wavenumber-frequency domain to the space-frequency domain.

10. The computer system of claim 8 wherein computing the direct incident downgoing vertical velocity wavefield comprises:

transforming the recorded pressure data from the space-time domain to the wavenumber-frequency domain;

transforming the recorded vertical velocity data from the space-time domain to the wavenumber-frequency domain;

computing the downgoing vertical velocity wavefield based on the pressure data and the vertical velocity data;

applying a time window to the downgoing vertical velocity wavefield to obtain direct incident downgoing vertical velocity wavefield;

scaling the direct incident downgoing vertical velocity wavefield; and extrapolating the direct incident downgoing vertical velocity wavefield from receiver depth to depth of a virtual planar separation level located between the receiver depth and depth of the moving vibrational source.

11. The computer system of claim 8 wherein computing the direct incident downgoing vertical velocity wavefield comprises:

extracting a direct incident pressure wavefield from pressure wavefield recorded by pressure sensors of a source acquisition surface located within the near field of the moving vibrational source;

extracting a direct incident vertical velocity wavefield from vertical velocity wavefield recorded by particle motion sensors of the source acquisition surface;

transforming the direct incident pressure wavefield from the space-time domain to the wavenumber-frequency domain;

transforming the direct incident vertical velocity wavefield from the space-time domain to the wavenumber-frequency domain; and computing the direct incident downgoing vertical velocity wavefield at the depth of a virtual planar separation level based on the direct incident pressure wavefield and the direct incident vertical velocity wavefield.

12. The computer system of claim 8 wherein computing the direct incident downgoing vertical velocity wavefield comprises:

for each receiver location, for each time sample of a source signature, injecting a source signature sample value of a source using a spatial sine function at the depth of the nominal spatial location, and extrapolating the injected source signature sample value from the depth of the nominal spatial location and from a depth of a source ghost location to the virtual planar separation level using a gradient of a free space Green's function to obtain a gradient of the pressure wavefield at the virtual planar separation level; and computing a trace of the direct incident downgoing vertical velocity wavefield based on the gradient of the pressure wavefield.

13. The computer system of claim 8 wherein computing the subsurface reflectivity based on the upgoing pressure wavefield and the direct incident downgoing vertical velocity wavefield comprises:

forming an upgoing pressure wavefield matrix from the upgoing pressure wavefields computed for each receiver;

forming a scaled directed incident downing velocity wavefield matrix from the direct incident downgoing vertical velocity wavefields computed for each receiver;

computing a conjugate transpose of the scaled direct incident downing velocity wavefield matrix;

computing a pseudo inverse of the scaled directed incident downgoing velocity wavefield matrix based on the scaled direct incident downgoing vertical velocity wavefield and the conjugate transpose of the scaled direct incident downing velocity wavefield matrix; and multiplying the upgoing pressure wavefield matrix by the pseudo inverse of the scaled directed incident downgoing velocity wavefield matrix to generate the subsurface reflectivity wavefield.

14. The computer system of claim 8 wherein computing the subsurface reflectivity based on the upgoing pressure wavefield and the direct incident downgoing vertical velocity wavefield comprises:

transforming the upgoing pressure wavefield from the space domain to the wavenumber domain with respect to horizontal coordinates of the vibrational source in a virtual planar separation level;

transforming the direct incident downgoing vertical velocity wavefield from the space domain to the wavenumber domain with respect to the horizontal coordinates; and applying spectral division of the upgoing pressure wavefield by the direct incident downgoing vertical velocity wavefield to generate the subsurface reflectivity wavefield.

15. A non-transitory computer-readable medium encoded with machine-readable instructions for enabling one or more processors of a computer system to generate an image of a subterranean formation by performing operations comprising:

computing an up-going pressure wavefield from pressure data and vertical velocity data recorded in a marine survey performed using a moving vibrational source;

computing a direct incident downgoing vertical velocity wavefield that represents source motion effects, source signature, and source ghost of the moving vibrational source;

computing a subsurface reflectivity based on the upgoing pressure wavefield and the direct incident downgoing vertical velocity wavefield; and generating an image of the subterranean formation based on the subsurface reflectivity wavefield.

16. The medium of claim 15 wherein computing the up-going pressure wavefield comprises:

for each source,
transforming the recorded pressure data from the space-time domain to the wavenumber-frequency domain;
transforming the recorded vertical velocity data from the space-time domain to the wavenumber-frequency domain;
computing the upgoing pressure wavefield based on the pressure data and the vertical velocity data in the wavenumber-frequency domain; and
transforming the upgoing pressure wavefield from the wavenumber-frequency domain to the space-frequency domain.

17. The medium of claim 15 wherein computing the direct incident downgoing vertical velocity wavefield comprises:

transforming the recorded pressure data from the space-time domain to the wavenumber-frequency domain;
transforming the recorded vertical velocity data from the space-time domain to the wavenumber-frequency domain;
computing the downgoing vertical velocity wavefield based on the pressure data and the vertical velocity data;
applying a time window to the downgoing vertical velocity wavefield to obtain direct incident downgoing vertical velocity wavefield;
scaling the direct incident downgoing vertical velocity wavefield; and
extrapolating the direct incident downgoing vertical velocity wavefield from receiver depth to depth of a virtual planar separation level located between the receiver depth and depth of the moving vibrational source.

18. The medium of claim 15 wherein computing the direct incident downgoing vertical velocity wavefield comprises:

extracting a direct incident pressure wavefield from pressure wavefield recorded by pressure sensors of a source acquisition surface located within the near field of the moving vibrational source;
extracting a direct incident vertical velocity wavefield from vertical velocity wavefield recorded by particle motion sensors of the source acquisition surface;
transforming the direct incident pressure wavefield from the space-time domain to the wavenumber-frequency domain;
transforming the direct incident vertical velocity wavefield from the space-time domain to the wavenumber-frequency domain; and
computing the direct incident downgoing vertical velocity wavefield at the depth of a virtual planar separation level based on the recorded direct incident pressure wavefield and the recorded direct incident vertical velocity wavefield.

19. The medium of claim 15 wherein computing the direct incident downgoing vertical velocity wavefield comprises:

for each receiver location,
for each time sample of a source signature,
injecting a source signature sample value of a source using a spatial sine function at the depth of the nominal spatial location, and
extrapolating the injected source signature sample value from the depth of the nominal spatial location and from a depth of a source ghost location to the virtual planar separation level using a gradient of a free space Green's function to obtain a gradient of the pressure wavefield at the virtual planar separation level; and
computing a trace of the direct incident downgoing vertical velocity wavefield based on the gradient of the pressure wavefield.

20. The medium of claim 15 wherein computing the subsurface reflectivity based on the upgoing pressure wavefield and the direct incident downgoing vertical velocity wavefield comprises:

forming a upgoing pressure wavefield matrix from the upgoing pressure wavefields computed for each receiver;
forming a scaled directed incident downing velocity wavefield matrix from the direct incident downgoing vertical velocity wavefields computed for each receiver;
computing a conjugate transpose of the scaled direct incident downing velocity wavefield matrix;

computing a pseudo inverse of the scaled directed incident downgoing velocity wavefield matrix based on the scaled direct incident downgoing vertical velocity wavefield and the conjugate transpose of the scaled direct incident downing velocity wavefield matrix; and
multiplying the upgoing pressure wavefield matrix by the pseudo inverse of the scaled directed incident downgoing velocity wavefield matrix to generate the subsurface reflectivity wavefield.

21. The medium of claim 15 wherein computing the subsurface reflectivity based on the upgoing pressure wavefield and the direct incident downgoing vertical velocity wavefield comprises:
transforming the upgoing pressure wavefield from the space domain to the wavenumber domain with respect to horizontal coordinates of the vibrational source in a virtual planar separation level;
transforming the direct incident downgoing vertical velocity wavefield from the space domain to the wavenumber domain with respect to the horizontal coordinates; and
applying spectral division of the upgoing pressure wavefield by the direct incident downgoing vertical velocity wavefield to generate the subsurface reflectivity wavefield.

22. Apparatus for generating an image of a subterranean formation from recorded pressure data and recorded vertical velocity data obtained in a marine survey of the subterranean formation using a moving vibrational source, the apparatus comprising:
means for computing an up-going pressure wavefield from the recorded pressure data and recorded vertical velocity data;
means for computing a direct incident downgoing vertical velocity wavefield that represents source motion effects, source signature, and source ghost of the moving vibrational source;
means for deconvolving the upgoing pressure wavefield by the direct incident downgoing vertical velocity wavefield to generate a subsurface reflectivity wavefield; and
means for generating an image of the subterranean formation based on the subsurface reflectivity wavefield.

23. The apparatus of claim 22 wherein the means for computing the up-going pressure wavefield comprises:
for each source,
transforms the recorded pressure data from the space-time domain to the wavenumber-frequency domain;
transforms the recorded vertical velocity data from the space-time domain to the wavenumber-frequency domain;
computes the upgoing pressure wavefield based on the pressure data and the vertical velocity data in the wavenumber-frequency domain; and
transforms the upgoing pressure wavefield from the wavenumber-frequency domain to the space-frequency domain.

24. The apparatus of claim 22 wherein the means for computing the direct incident downgoing vertical velocity wavefield comprises:
transforms the recorded pressure data from the space-time domain to the wavenumber-frequency domain;
transforms the recorded vertical velocity data the space-time domain to the wavenumber-frequency domain;
computes the downgoing vertical velocity wavefield based on the pressure data and the vertical velocity data;
applies a time window to the downgoing vertical velocity wavefield to obtain direct incident downgoing vertical velocity wavefield;
scales the direct incident downgoing vertical velocity wavefield; and
extrapolates the direct incident downgoing vertical velocity wavefield from receiver depth to depth of a virtual planar separation level located between the receiver depth and depth of the moving vibrational source.

25. The apparatus of claim 22 wherein the means for computing the direct incident downgoing vertical velocity wavefield comprises:
extracts a direct incident pressure wavefield from pressure data recorded by pressure sensors of a source acquisition surface located within the near field of the moving vibrational source;
extracts a direct incident vertical velocity wavefield from vertical velocity data recorded by particle motion sensors of the source acquisition surface;
transforms the recorded direct incident pressure wavefield from the space-time domain to the wavenumber-frequency domain;
transforms the recorded direct incident vertical velocity wavefield from the space-time domain to the wavenumber-frequency domain; and
computes the direct incident downgoing vertical velocity wavefield at depth of a virtual planar separation level based on the recorded direct incident pressure wavefield and the recorded direct incident vertical velocity wavefield.

26. The apparatus of claim 22 wherein the means for computing the direct incident downgoing vertical velocity wavefield comprises:
for each receiver location,
for each time sample of a source signature,
injects a source signature sample value of a source using a spatial sine function at the depth of the nominal spatial location, and
extrapolates the injected source signature sample value from the depth of the nominal spatial location and from a depth of a source ghost location to the virtual planar separation level using a gradient of a free space Green's function to obtain a gradient of the pressure wavefield at the virtual planar separation level; and
computes a trace of the direct incident downgoing vertical velocity wavefield based on the gradient of the pressure wavefield.

27. The apparatus of claim 22 wherein the means for deconvolving the upgoing pressure wavefield by the direct incident downgoing vertical velocity wavefield to generate the subsurface reflectivity wavefield comprises:
forms an upgoing pressure wavefield matrix from the upgoing pressure wavefields computed for each receiver;
forms a scaled directed incident downing velocity wavefield matrix from the direct incident downgoing vertical velocity wavefields computed for each receiver;
computes a conjugate transpose of the scaled direct incident downing velocity wavefield matrix;
computes a pseudo inverse of the scaled directed incident downgoing velocity wavefield matrix based on the scaled direct incident downgoing vertical velocity wavefield and conjugate transpose of the scaled direct incident downing velocity wavefield matrix; and
multiplies the upgoing pressure wavefield matrix by the pseudo inverse of the scaled directed incident downgoing velocity wavefield matrix to generate the subsurface reflectivity wavefield.

28. The apparatus of claim 22 wherein the means for deconvolving the upgoing pressure wavefield by the direct incident downgoing vertical velocity wavefield to generate the subsurface reflectivity wavefield comprises:
  transforms the upgoing pressure wavefield from the space domain to the wavenumber domain with respect to horizontal coordinates of the vibrational source in a virtual planar separation level;
  transforms the direct incident downgoing vertical velocity wavefield from the space domain to the wavenumber domain with respect to the horizontal coordinates; and
  applies spectral division of the upgoing pressure wavefield by the direct incident downgoing vertical velocity wavefield to generate the subsurface reflectivity wavefield.

29. A method for manufacturing a geophysical data product, the method comprising:
  obtaining pressure data and vertical velocity data that was recorded during a marine survey that employed a moving vibrational source;
  computing an up-going pressure wavefield from the recorded pressure data and recorded vertical velocity data;
  computing a direct incident downgoing vertical velocity wavefield that represents source motion effects, source signature, and source ghost of the moving vibrational source;
  deconvolving the upgoing pressure wavefield by the direct incident downgoing vertical velocity wavefield to generate a subsurface reflectivity wavefield;
  generating an image of the subterranean formation based on the subsurface reflectivity wavefield; and
  storing the image in a non-transitory computer-readable medium.

\* \* \* \* \*

UNITED STATES PATENT AND TRADEMARK OFFICE
CERTIFICATE OF CORRECTION

PATENT NO. : 11,327,195 B2
APPLICATION NO. : 16/577182
DATED : May 10, 2022
INVENTOR(S) : Walter Sollner et al.

It is certified that error appears in the above-identified patent and that said Letters Patent is hereby corrected as shown below:

In the Specification

In Column 4, Line 25 delete the word "Hilteiinan" and insert the word -- Hilterman --.

In Column 9, Line 55 delete the word "faun" and insert the word -- form --.

In Column 13, Line 1 delete the expression "j=√-1" and insert the expression -- $j = \sqrt{-1}$ --.

In Column 13, Line 33 delete the expression "$P^{-+}(\vec{x}_R, |\vec{\chi}, z^l, \omega)$," and insert the expression -- $P^{-+}(\vec{x}_R | \vec{\chi}, z^l, \omega)$ --.

In Column 14, Line 22 delete the expression "$P^{-+}(\vec{x}_R, \vec{\chi}, z^l, \omega)$," and insert the expression -- $P^{-+}(\vec{x}_R | \vec{\chi}, z^l, \omega)$ --.

In Column 14, Line 28 delete the expression "$P^{-+}(\vec{x}_R, \vec{\chi}, z^l, \omega)$," and insert the expression -- $P^{-+}(\vec{x}_R | \vec{\chi}, z^l, \omega)$ --.

In Column 14, Line 33 delete the expression "$P^{-+}(\vec{x}_R, \vec{\chi}, z^l, \omega)$," and insert the expression -- $P^{-+}(\vec{x}_R | \vec{\chi}, z^l, \omega)$ --.

Signed and Sealed this
Twenty-second Day of October, 2024

Katherine Kelly Vidal
*Director of the United States Patent and Trademark Office*

In Column 15, Lines 5-9, Eq. (4) delete the expression

"$P^-(\vec{x}_R, \vec{x}_{Sn}, \omega) \approx$ $-2j\omega\rho \sum_{\vec{\chi}_k \in S_{sep}} P^{-+}(\vec{x}_R | \vec{\chi}_k, z^l, \omega) V^+_{z,Inc}(\vec{\chi}_k, z^l | \vec{x}_{Sn}, \omega) \Delta\vec{\chi}$ ,, and insert the expression $P^-(\vec{x}_{Rm}, \vec{x}_{Sn}, \omega) \approx$ -- $-2j\omega\rho \sum_{\vec{\chi}_k \in S_{sep}} P^{-+}(\vec{x}_{Rm} | \vec{\chi}_k, z^l, \omega) V^+_{z,Inc}(\vec{\chi}_k, z^l | \vec{x}_{Sn}, \omega) \Delta\vec{\chi}$ --.

In Column 15, Line 46 insert -- . -- after "$\omega$)".

In Column 15, Line 47 delete "$V^+_{Inc}$" and insert -- $V^+_{Inc}$ --.

In Column 15, Line 51 after "$P^{-+}$" insert -- , --.

In Column 15, Line 54 delete "$P^-(\vec{x}_{Rm}; \vec{x}_{Sn}, \omega)$," and insert -- $P^-(\vec{x}_{Rm}, \vec{x}_{Sn}, \omega)$ --.

In Column 15, Lines 55-56 delete "$-2i\omega\rho V^+_{z,Inc}(\vec{\chi}_{Sn}, z^l | \vec{x}_{Sn}, \omega)$," and insert -- $-2i\omega\rho V^+_{z,Inc}(\vec{\chi}_k, z^l | \vec{x}_{Sn}, \omega)$ --.

In Column 16, Line 11 delete "$p^{-+}(\vec{x}_{Rm}, \vec{\chi}_k, z^l, t)$," and insert -- $p^{-+}(\vec{x}_{Rm} | \vec{\chi}_k, z^l, t)$ --.

In Column 16, Line 12 delete "$p^{-+}(\vec{x}_{Rm}, \vec{\chi}_k, z^l, t)$," and insert -- $p^{-+}(\vec{x}_{Rm} | \vec{\chi}_k, z^l, t)$ --.

In Column 16, Line 28 delete "(5) (6)" and insert -- (5)-(6) --.

In Column 17, Line 5 delete "P" and insert -- p --.

In Column 18, Line 58 delete "A" and insert -- λ --.

In Column 19, Lines 65-66, in the integral of Eq. (12) delete "$\int_{S_r} d\vec{n}$" and insert -- $\int_{S_r} dS\vec{n}$ --.

In Column 20, Line 33 delete "1304" and insert -- 104 --.

CERTIFICATE OF CORRECTION (continued)

In Column 20, Line 60 delete "$P(\vec{x}_{Rm}, \vec{x}_{Sn}, t)$" and insert --$p(\vec{x}_{Rm}, \vec{x}_{Sn}, t)$--.

In Column 21, Line 56-57, in Eq. (16) delete "$V_z^+(k_x, k_y, \omega)|z_{Rm}, \vec{x}_{Sn})$" and insert --$V_z^+(k_x, k_y, \omega|z_{Rm}, \vec{x}_{Sn})$--.

In Column 23, Line 19 delete "$p^{-+}(\vec{x}_R, \omega; \vec{x}, 0)$" and insert --$P^{-+}(\vec{x}_R, \omega; \vec{x}, 0)$--.

In Column 23, Line 41 delete "sin c" and insert -- sinc --.

In Column 24, Line 14 delete "$l \times speed_{vessel} \pm sampling\ rate$" and insert -- $l \times speed_{vessel} \div sampling\ rate$ --.

In Column 24, Line 32 delete "sine" and insert -- sinc --.

In Column 24, Line 33 delete "sine" and insert -- sinc --.

In Column 24, Lines 53-54, Eq. (20) delete
"$j\omega\rho V_z(\vec{\chi}, z^l, \vec{x}_{Sn}, \omega) = \nabla P(\vec{\chi}, z^l|\vec{x}_{Sn}, \omega) \cdot \vec{n}$" and insert
--$j\omega\rho V_z(\vec{\chi}, z^l|\vec{x}_{Sn}, \omega) = \nabla P(\vec{\chi}, z^l|\vec{x}_{Sn}, \omega) \cdot \vec{n}$--.

In Column 25, Line 27, Eq. (22) delete
"$V_{z,Inc}^+(\vec{\chi}, z^l, \vec{x}_S, \omega) \equiv V_{z,Inc}^+(\vec{\chi}, z^l|\vec{\chi}_S, z_S, \omega) = V_{z,Inc}^+(\vec{\chi}_R, z^l|\vec{\chi}_S + \vec{\chi}_R - \vec{\chi}, z_S, \omega)$" and insert
--$V_{z,Inc}^+(\vec{\chi}, z^l|\vec{x}_S, \omega) \equiv V_{z,Inc}^+(\vec{\chi}, z^l|\vec{\chi}_S, z_S, \omega) = V_{z,Inc}^+(\vec{\chi}_R, z^l|\vec{\chi}_S + \vec{\chi}_R - \vec{\chi}, z_S, \omega)$--.

In Column 26, Line 14, in Eq. (27) delete "$-2j\omega\rho P^{-+}(\vec{x}_R, \vec{\kappa}_S, z^l, \omega)$" and insert --$-2j\omega\rho P^{-+}(\vec{x}_R|\vec{\kappa}_S, z^l, \omega)$--.

In Column 26, Line 15, in Eq. (27) delete "$exp[k\vec{\kappa}_S\vec{\chi}_R]$" and insert --$exp[j\vec{\kappa}_S\vec{\chi}_R]$--.

In Column 28, Line 20 delete "sine" and insert -- sinc --.

In Column 32, Lines 61-67, in Eq. (4A) delete "$- \cdot \vec{n}dS$" and insert --$\cdot \vec{n}dS$--.

CERTIFICATE OF CORRECTION (continued)
U.S. Pat. No. 11,327,195 B2

In Column 33, Lines 53-54, in Eq. (7A) delete the expression

" $- \int_{-\infty}^{\infty} p^B(\vec{x}_R, t - \tau; \vec{x}_{Sn}(\tau), 0) s_n(\tau) d\tau =$
$- \int_{-\infty}^{\infty} \int_{S_{sep}} -2p^{B+}(\vec{x}_R, t - \tau; \vec{x}, 0) \nabla p^{A+}(\vec{x}, \tau; \vec{x}_{Sn}(\tau), 0) \cdot \vec{n} d\vec{\chi} d\tau$ " and insert the expression -- $- \int_{-\infty}^{\infty} p^B(\vec{x}_R, t - \tau; \vec{x}_{Sn}(\tau), 0) s_n(\tau) d\tau = \int_{-\infty}^{\infty} \int_{S_{sep}} -2p^{B+}(\vec{x}_R, t - \tau; \vec{x}, 0) \nabla p^{A+}(\vec{x}, \tau; \vec{x}_{Sn}(\tau), 0) \cdot \vec{n} d\vec{\chi} d\tau$ --.

In Column 33, Lines 63-66, in Eq. (8A) delete the expression

" $- \int_{-\infty}^{\infty} p^{B-}(\vec{x}_R, t - \tau; \vec{x}_{Sn}(\tau), 0) s_n(\tau) d\tau =$
$- \int_{-\infty}^{\infty} \int_{S_{sep}} -2p^{B-+}(\vec{x}_R, t - \tau; \vec{x}, 0) \nabla p^{A+}(\vec{x}, \tau; \vec{x}_{Sn}(\tau), 0) \cdot \vec{n} d\vec{\chi} d\tau$ "

and insert the expression

-- $- \int_{-\infty}^{\infty} p^{B-}(\vec{x}_R, t - \tau; \vec{x}_{Sn}(\tau), 0) s_n(\tau) d\tau =$
$\int_{-\infty}^{\infty} \int_{S_{sep}} -2p^{B-+}(\vec{x}_R, t - \tau; \vec{x}, 0) \nabla p^{A+}(\vec{x}, \tau; \vec{x}_{Sn}(\tau), 0) \cdot \vec{n} d\vec{\chi} d\tau$ --.

In Column 34, Lines 9-12, in Eq. (9A) delete the expression

" $- \int_{-\infty}^{\infty} dt e^{-i\omega t} \int_{-\infty}^{\infty} p^{B-}(\vec{x}_R, t - \tau; \vec{x}_{Sn}(\tau), 0) s_n(\tau) d\tau =$
$\int_{S_{sep}} \left[ \int_{-\infty}^{\infty} dt e^{-j\omega t} \int_{-\infty}^{\infty} d\tau 2 \nabla p^{A+}(\vec{x}, \tau; \vec{x}_{Sn}(\tau), 0) \frac{1}{2\pi} \int_{-\infty}^{\infty} d\omega e^{j\omega(-\tau + t)} \right]$
$P^{B-+}(\vec{x}_R, \omega; \vec{x}, 0) \cdot \vec{n} d\vec{\chi}$ "

and insert the expression

-- $\int_{-\infty}^{\infty} dt e^{-i\omega t} \int_{-\infty}^{\infty} p^{B-}(\vec{x}_R, t - \tau; \vec{x}_{Sn}(\tau), 0) s_n(\tau) d\tau =$
$\int_{S_{sep}} \left[ \int_{-\infty}^{\infty} dt e^{-j\omega t} \int_{-\infty}^{\infty} d\tau 2 \nabla p^{A+}(\vec{x}, \tau; \vec{x}_{Sn}(\tau), 0) \frac{1}{2\pi} \int_{-\infty}^{\infty} d\omega e^{j\omega(-\tau + t)} \right]$
$P^{B-+}(\vec{x}_R, \omega; \vec{x}, 0) \cdot \vec{n} d\vec{\chi}$ --.

In the Claims

In Column 36, Claim 5, Line 49 delete "sine" and insert -- sinc --.

In Column 38, Claim 12, Line 49 delete "sine" and insert -- sinc --.

In Column 40, Claim 19, Line 43 delete "sine" and insert -- sinc --.

In Column 40, Claim 20, Line 59 delete "a" and insert -- an --.

In Column 42, Claim 26, Line 37 delete "sine" and insert -- sinc --.